United States Patent
Tunget

(10) Patent No.: US 9,518,426 B2
(45) Date of Patent: Dec. 13, 2016

(54) ROTARY STICK, SLIP AND VIBRATION REDUCTION DRILLING STABILIZERS WITH HYDRODYNAMIC FLUID BEARINGS AND HOMOGENIZERS

(71) Applicant: Bruce A. Tunget, Aberdeen (GB)

(72) Inventor: Bruce A. Tunget, Aberdeen (GB)

( * ) Notice: Subject to any disclaimer, the term of this patent is extended or adjusted under 35 U.S.C. 154(b) by 253 days.

(21) Appl. No.: 14/365,563

(22) PCT Filed: Dec. 17, 2012

(86) PCT No.: PCT/US2012/000580
§ 371 (c)(1),
(2) Date: Jun. 13, 2014

(87) PCT Pub. No.: WO2013/089810
PCT Pub. Date: Jun. 20, 2013

(65) Prior Publication Data
US 2015/0252621 A1    Sep. 10, 2015

(30) Foreign Application Priority Data

Dec. 16, 2011 (GB) .................................. 1121741.1
Dec. 16, 2011 (GB) .................................. 1121743.7

(51) Int. Cl.
| | |
|---|---|
| *E21B 4/00* | (2006.01) |
| *E21B 7/06* | (2006.01) |
| *E21B 10/32* | (2006.01) |
| *E21B 17/10* | (2006.01) |
| *F16C 32/06* | (2006.01) |

(52) U.S. Cl.
CPC .................. *E21B 4/003* (2013.01); *E21B 7/06* (2013.01); *E21B 10/322* (2013.01); *E21B 17/1078* (2013.01); *F16C 32/0629* (2013.01)

(58) Field of Classification Search
CPC ............ E21B 4/00; E21B 4/003; E21B 10/32; E21B 10/322; E21B 17/10; E21B 17/1078; E21B 7/06; F16C 32/06; F16C 32/0629
See application file for complete search history.

(56) References Cited

U.S. PATENT DOCUMENTS

| | | | |
|---|---|---|---|
| 5,803,193 A | 9/1998 | Krueger et al. | |
| 5,901,798 A | 5/1999 | Herrera et al. | |
| 6,460,635 B1 | 10/2002 | Kalsi et al. | |

(Continued)

FOREIGN PATENT DOCUMENTS

WO    WO00/40833    7/2000

*Primary Examiner* — Yong-Suk (Philip) Ro

(57) ABSTRACT

An apparatus and method comprise a hydrodynamic bearing disposed about a shaft and within a bore of a wall with at least one periphery arced wall radially extending from and arranged about the circumference of an outer wall of a conduit shaft housing, which is disposed about at least one inner wall that is adjacent to at least one associated hydrodynamic profiled wall. The associated hydrodynamic profiled wall is rotatable by or about said shaft to displace fluid axially along said at least one inner wall, which is anchored by combined frictional engagements within the bore to force fluid between at least two of said walls and the rotating shaft to form a pressurized cushion. In use, this pressurized cushion lubricates and dampens rotational shocks and vibrations with the shearing of said frictional engagements when bearing said rotating shaft within said subterranean bore.

74 Claims, 25 Drawing Sheets

(56) References Cited

U.S. PATENT DOCUMENTS

| | | | |
|---|---|---|---|
| 6,837,621 B1* | 1/2005 | Sakamoto | E21B 4/003 384/97 |
| 7,055,631 B2 | 6/2006 | Mitchell et al. | |
| 2007/0177831 A1 | 8/2007 | Shibahara | |
| 2009/0242276 A1* | 10/2009 | Hummes | E21B 4/003 175/57 |
| 2011/0198132 A1 | 8/2011 | Tverlid | |

* cited by examiner

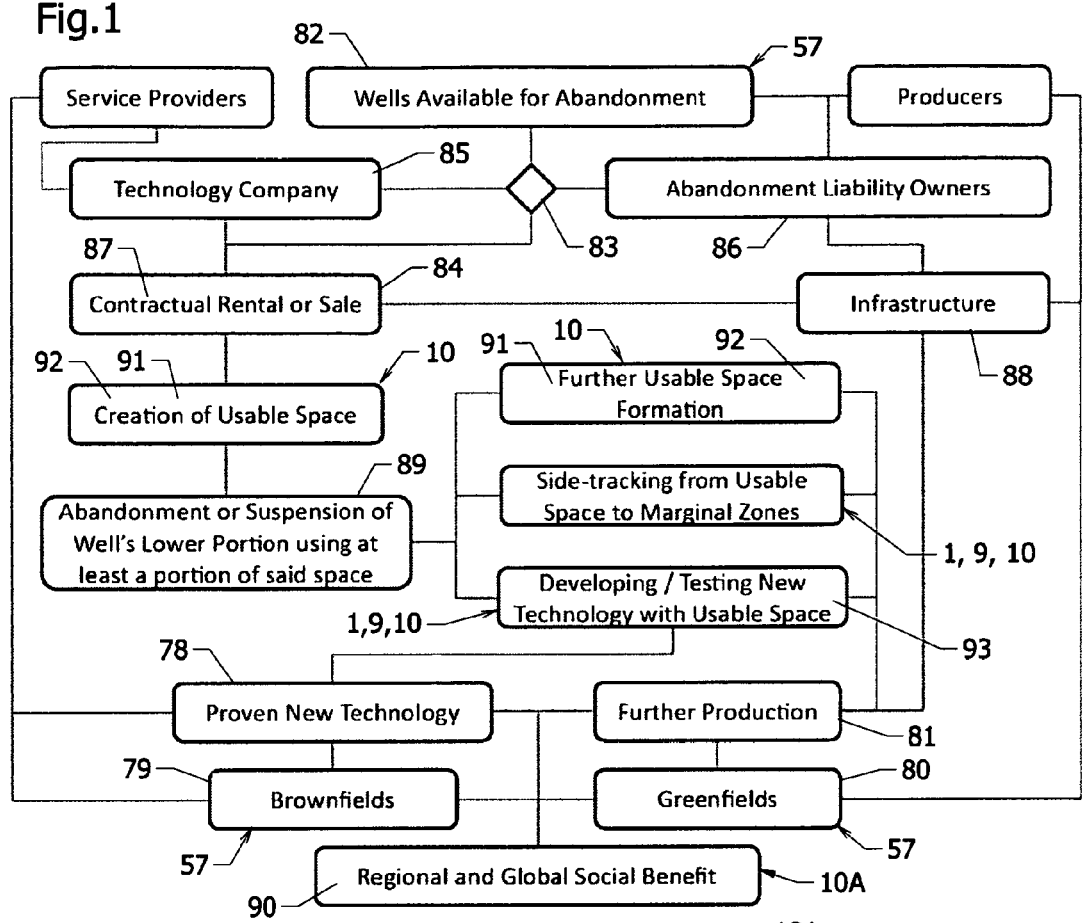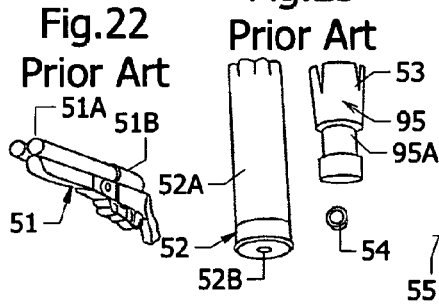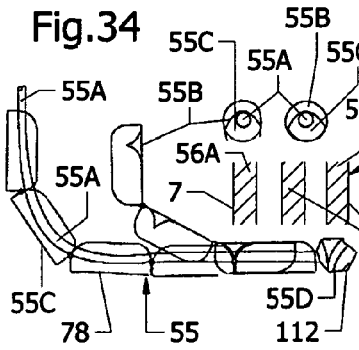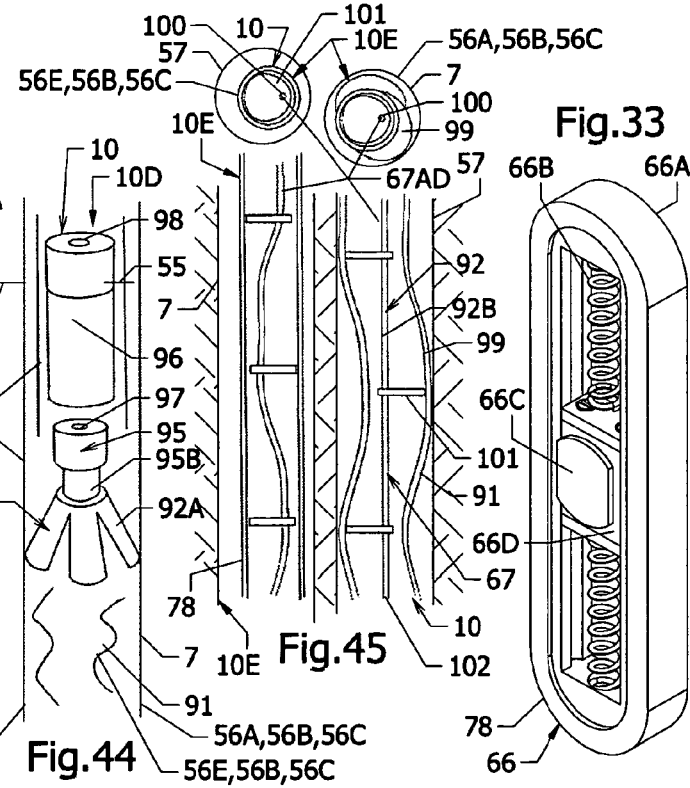

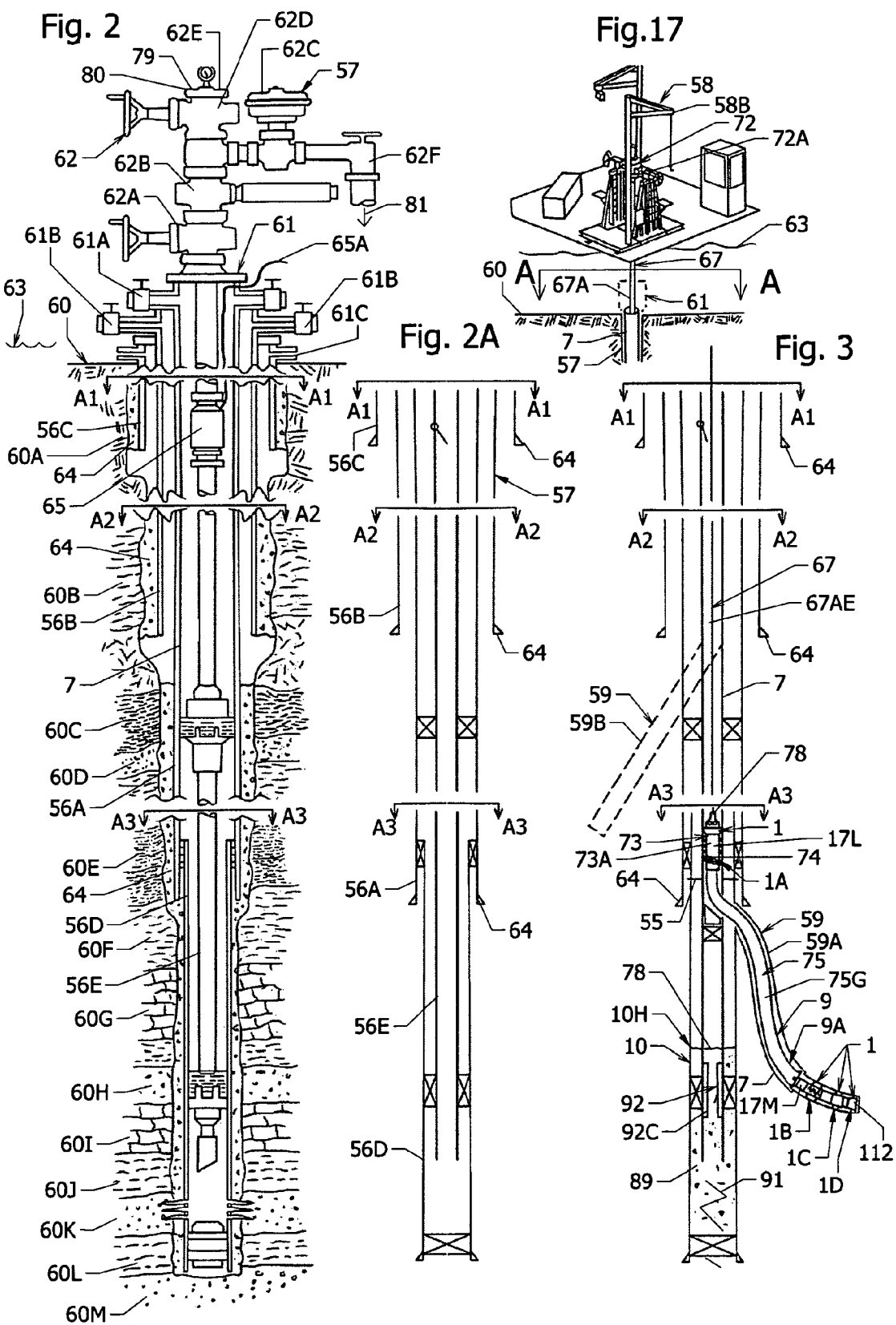

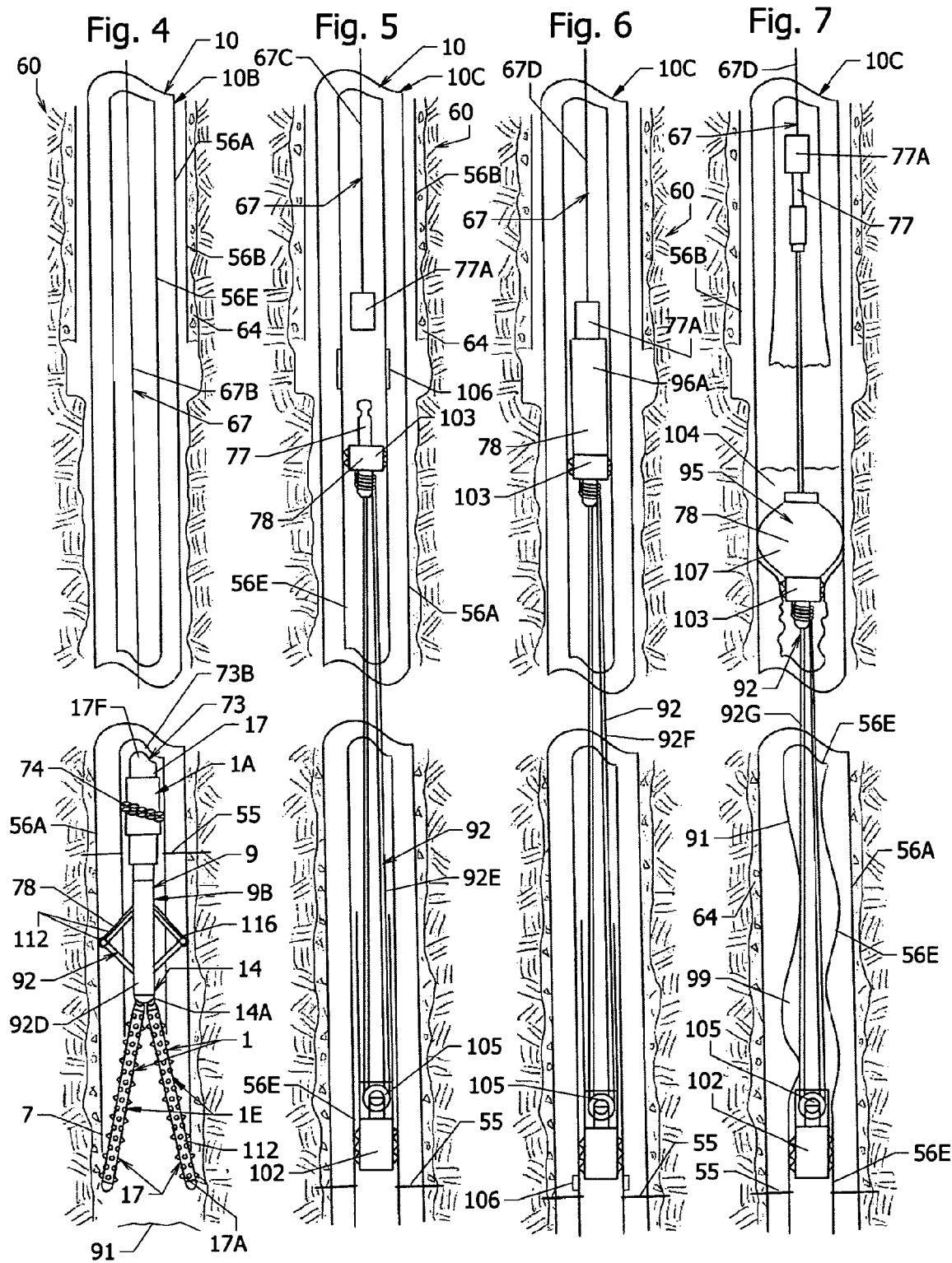

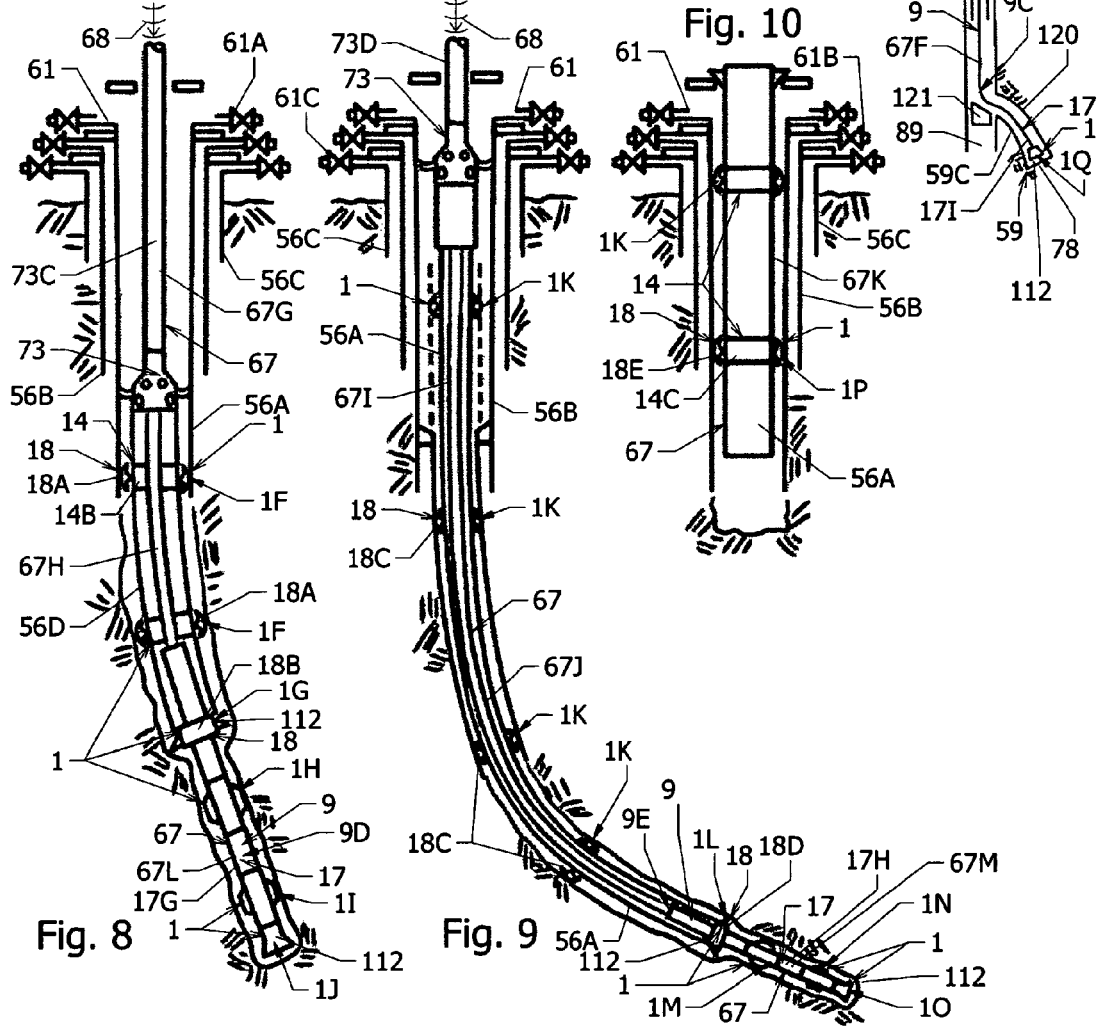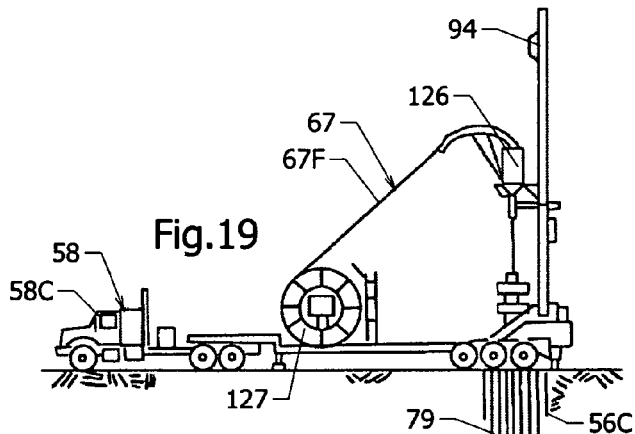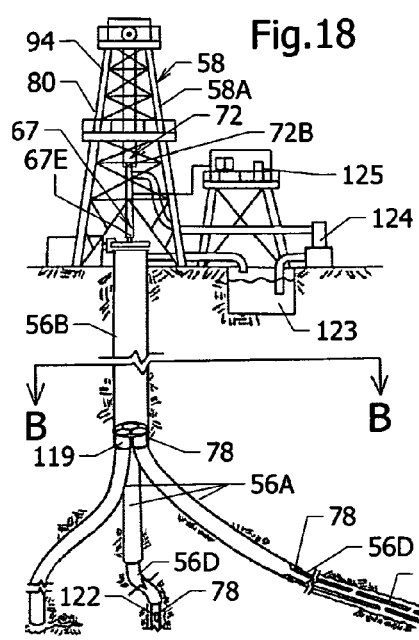

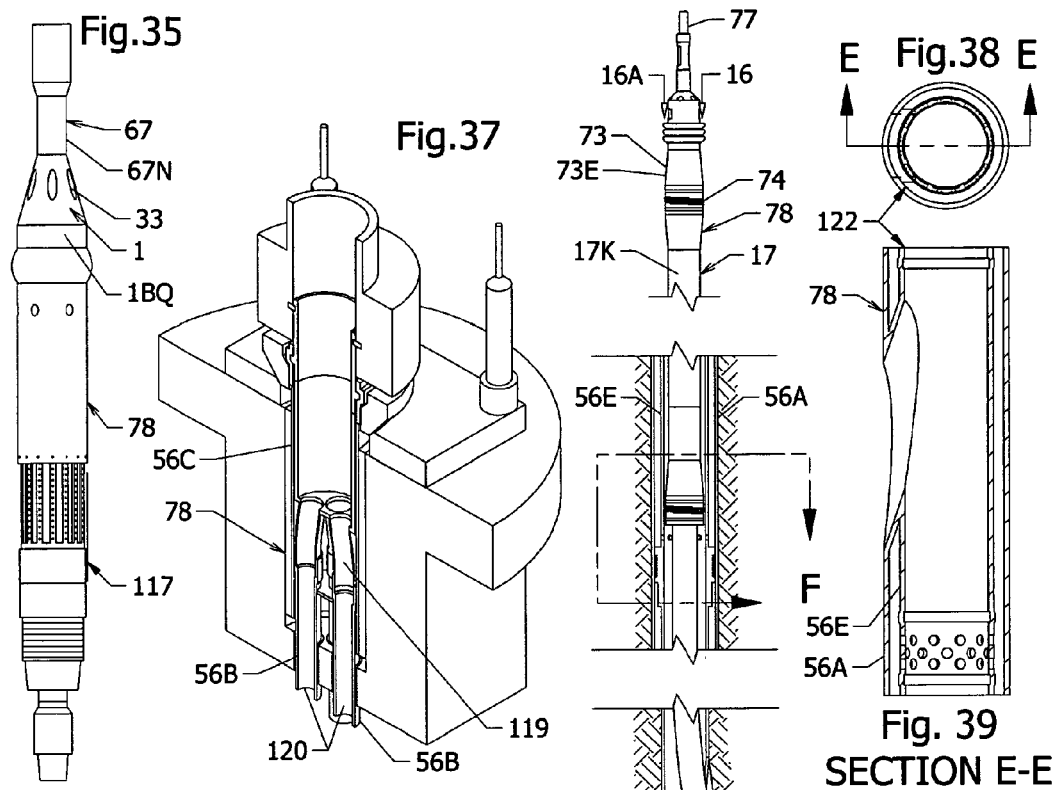
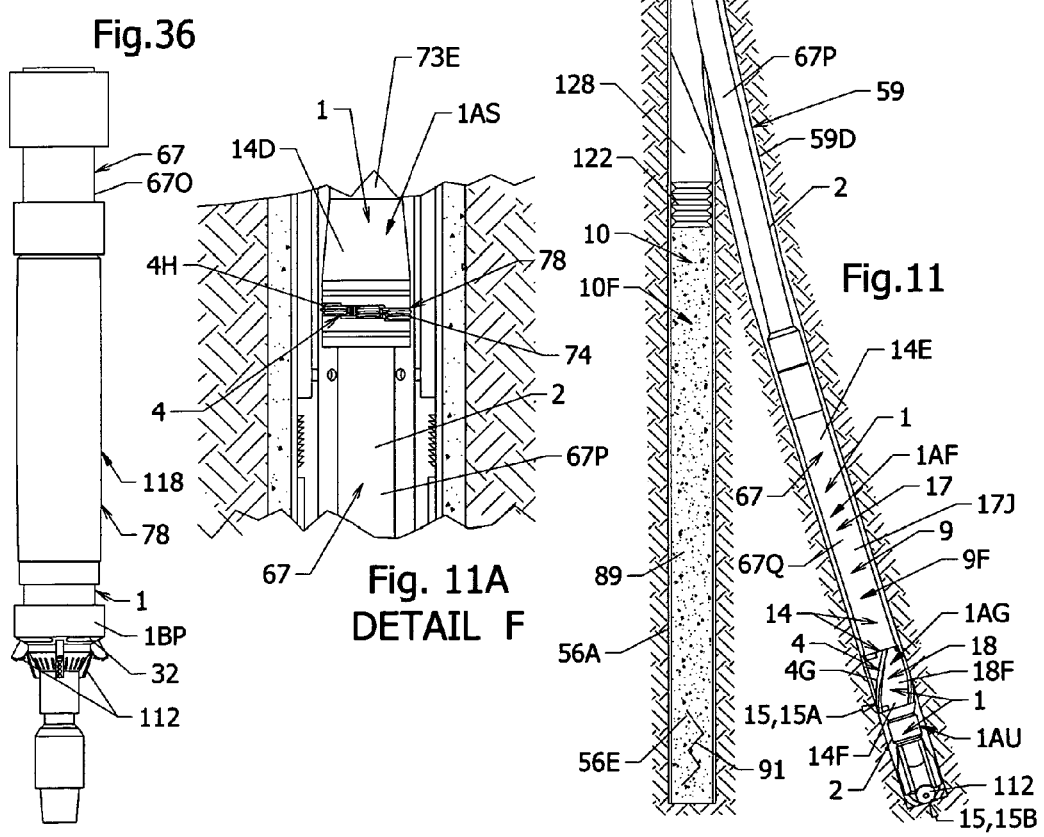

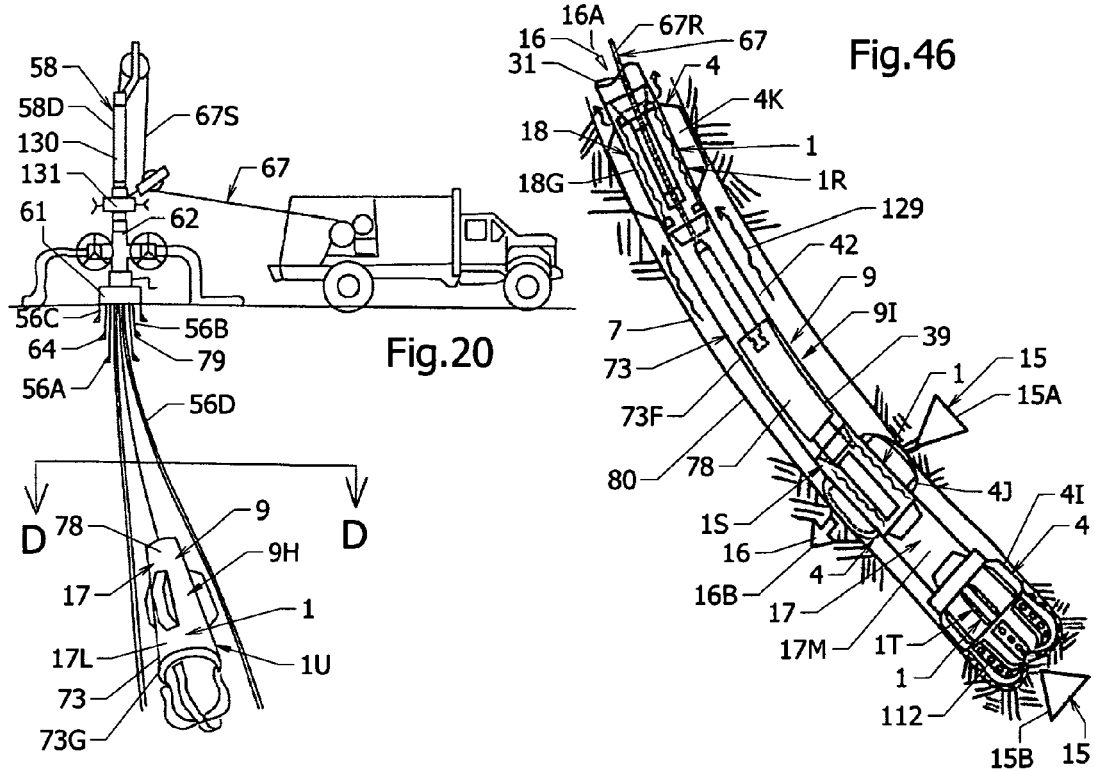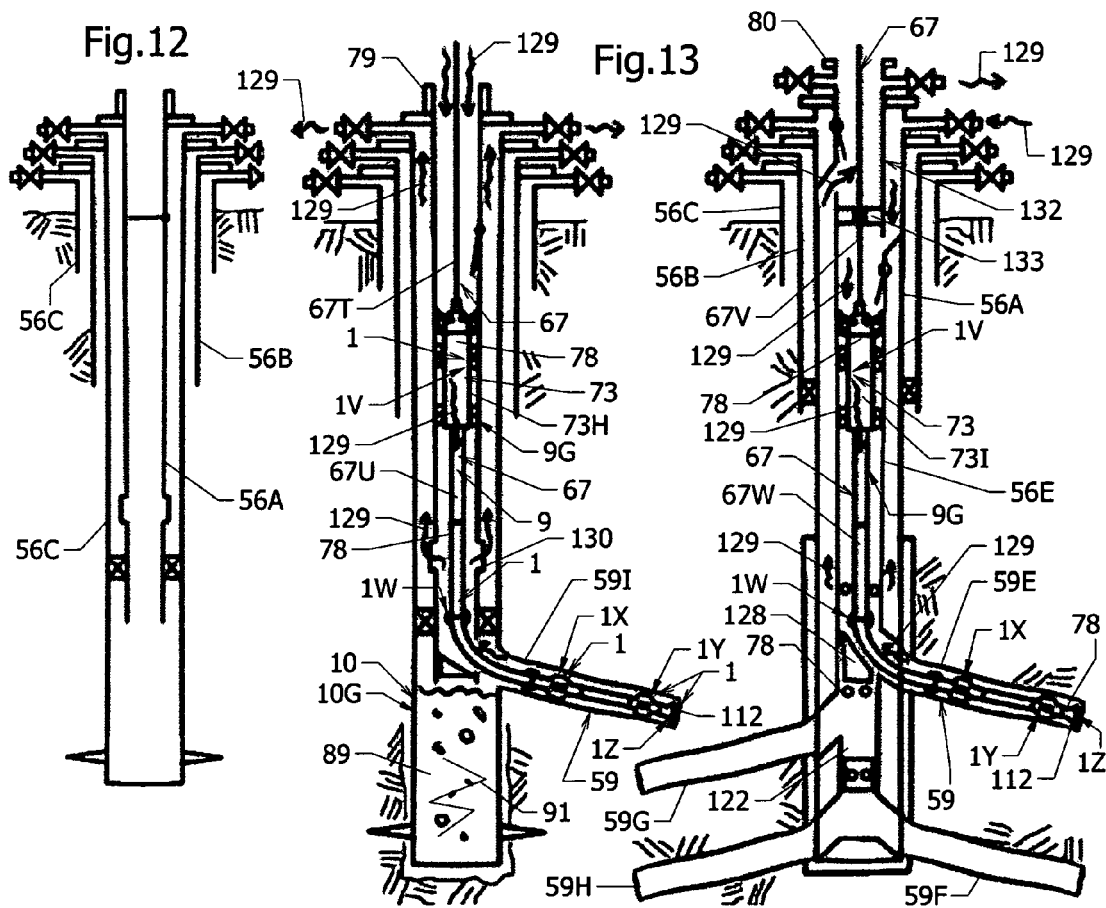

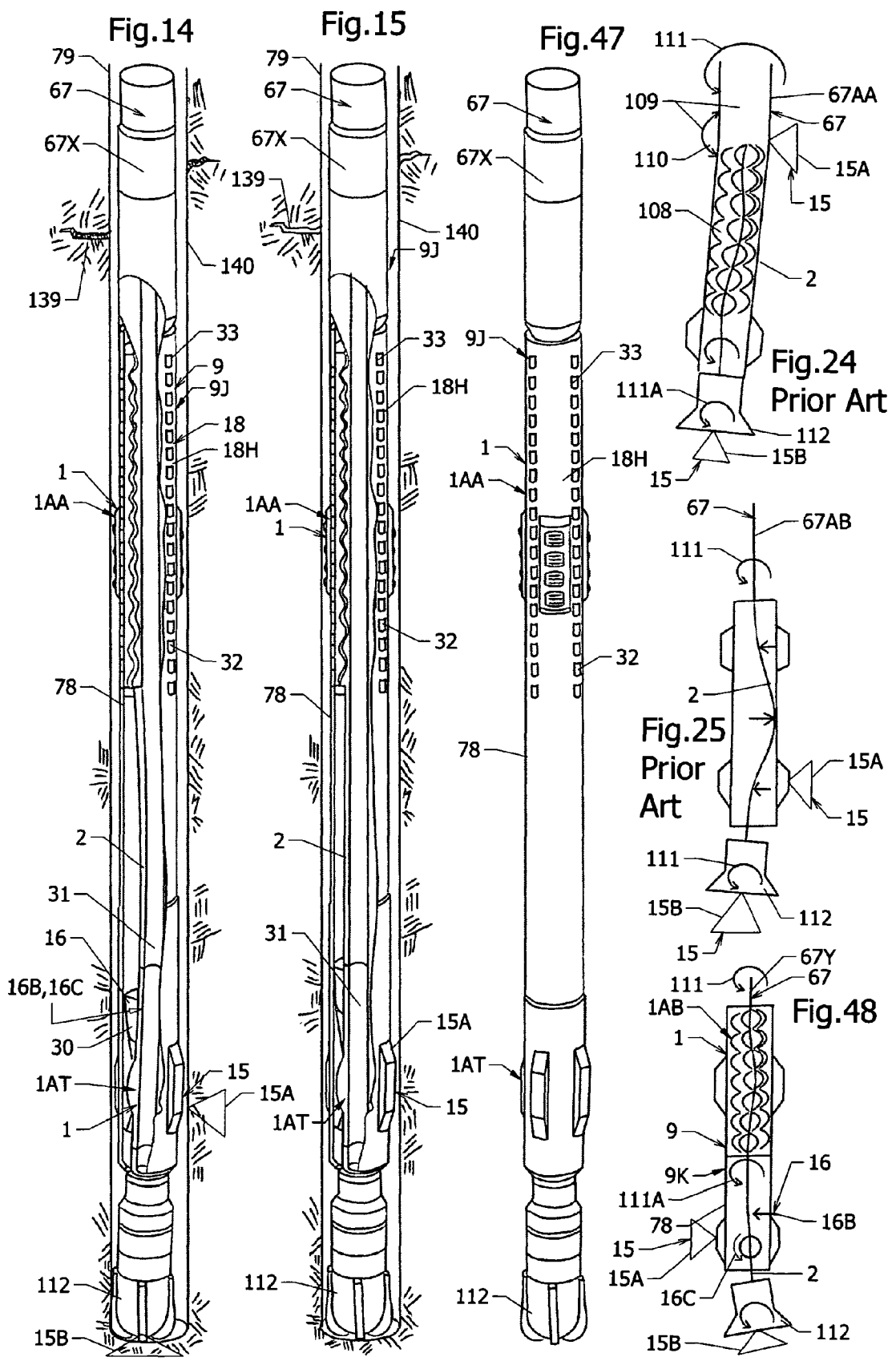

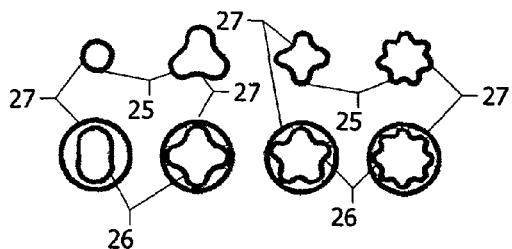
Fig.26 Prior Art
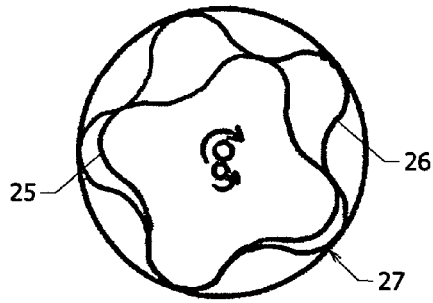
Fig.27 Prior Art
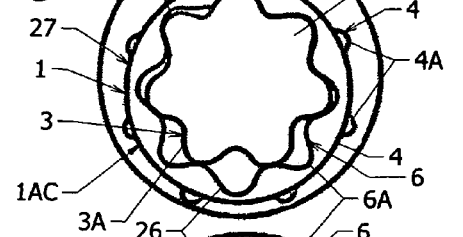
Fig.49
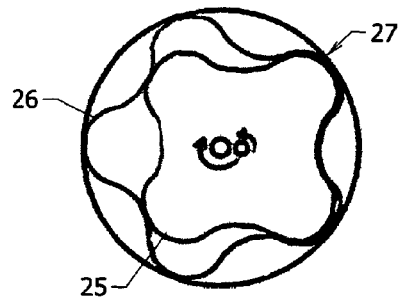
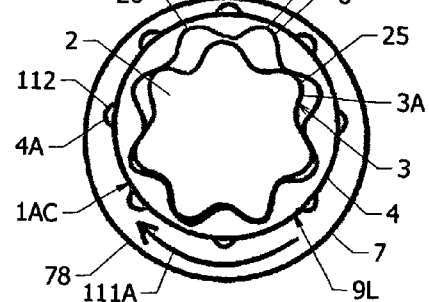
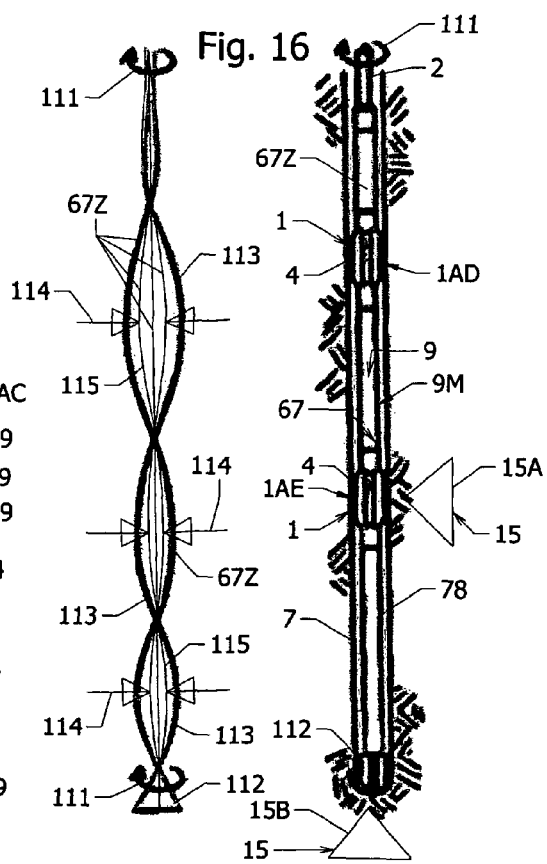
Fig. 16
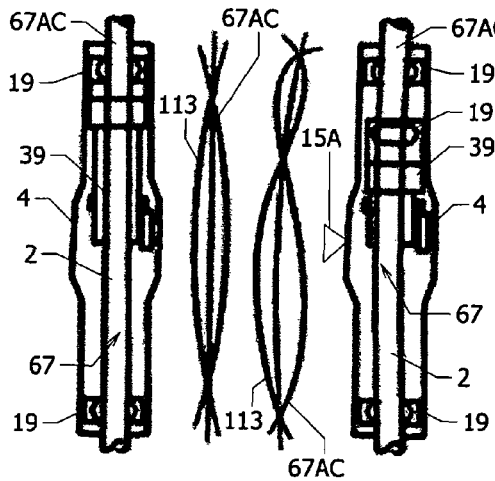
Fig.28 Prior Art

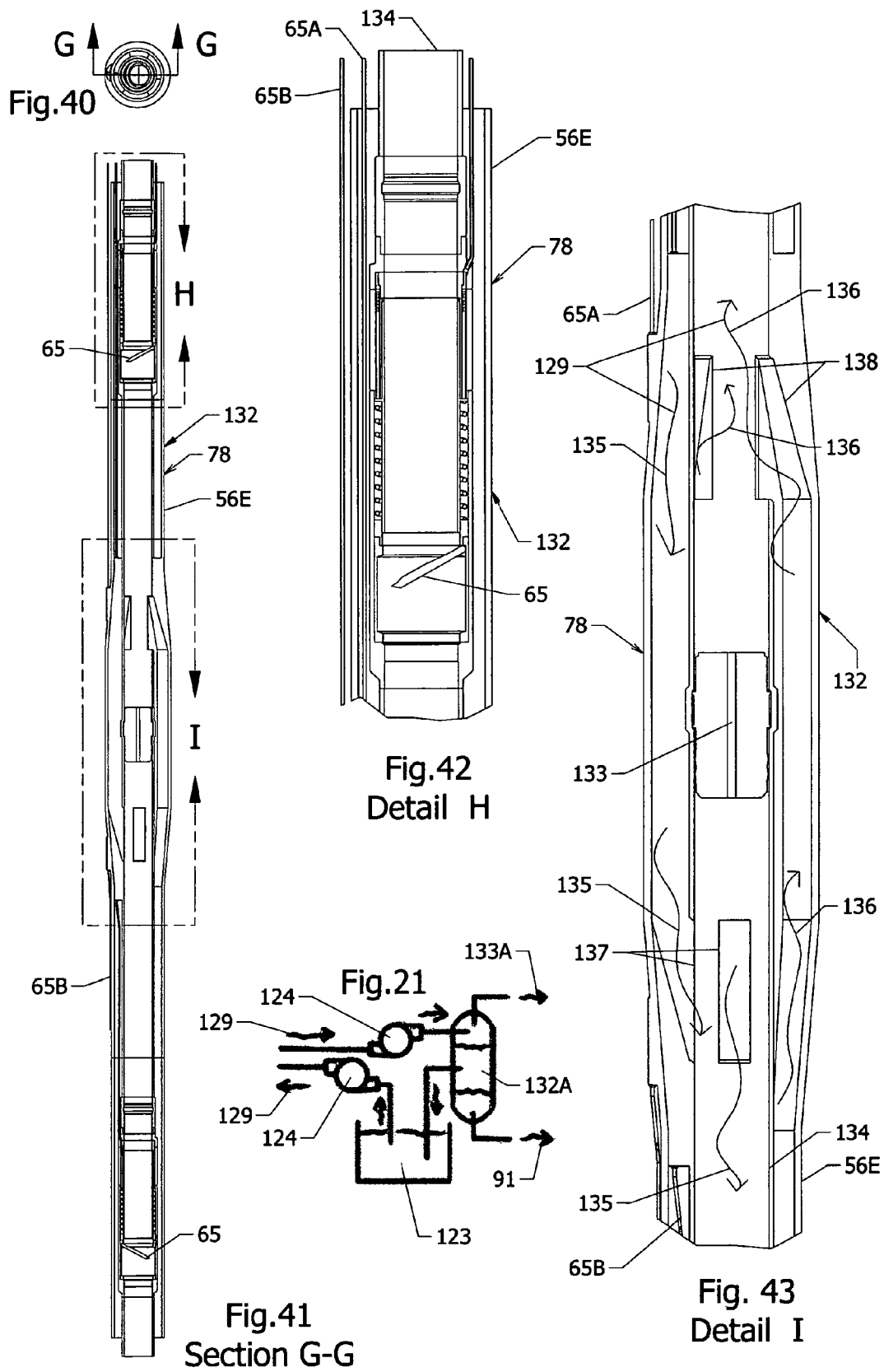

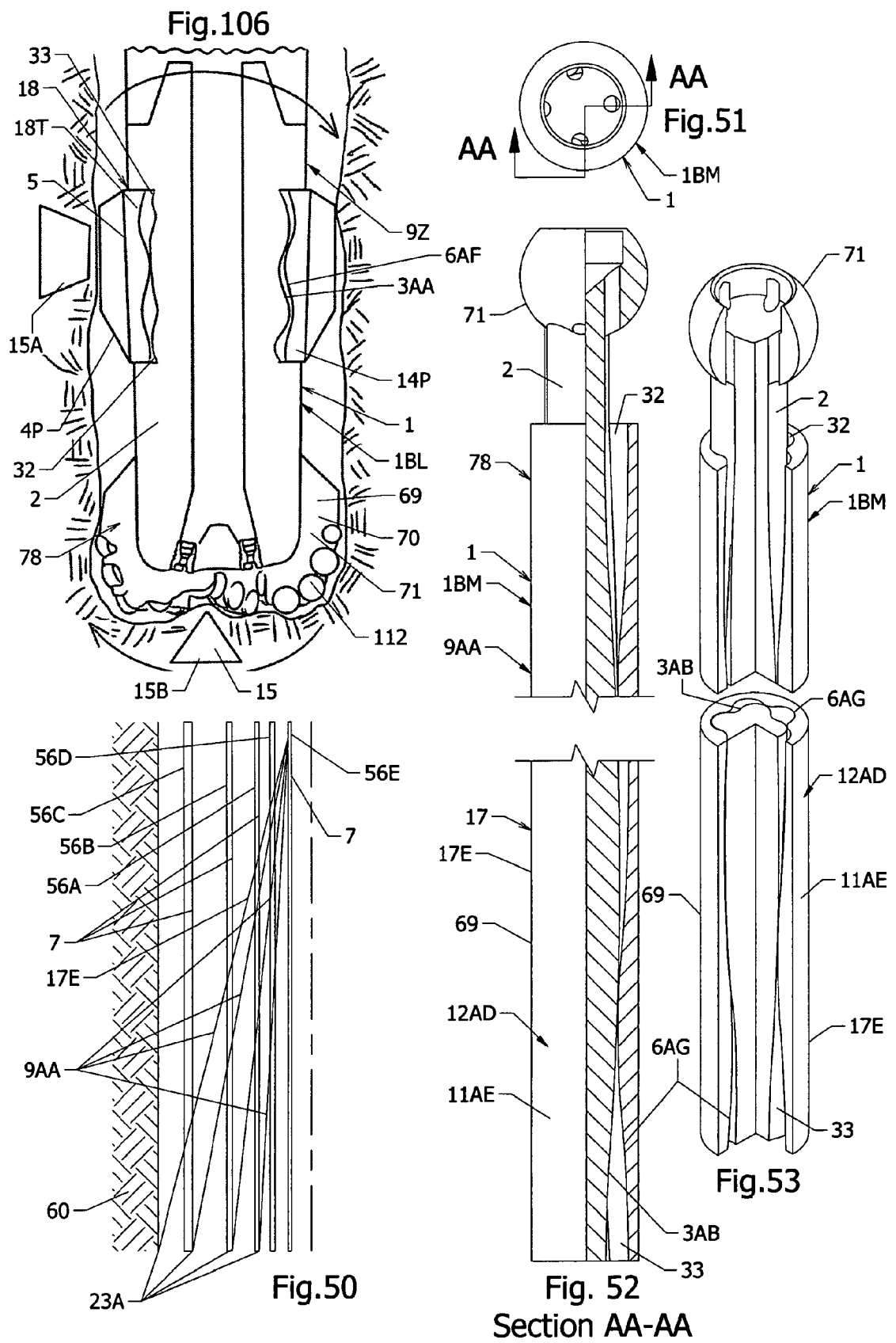

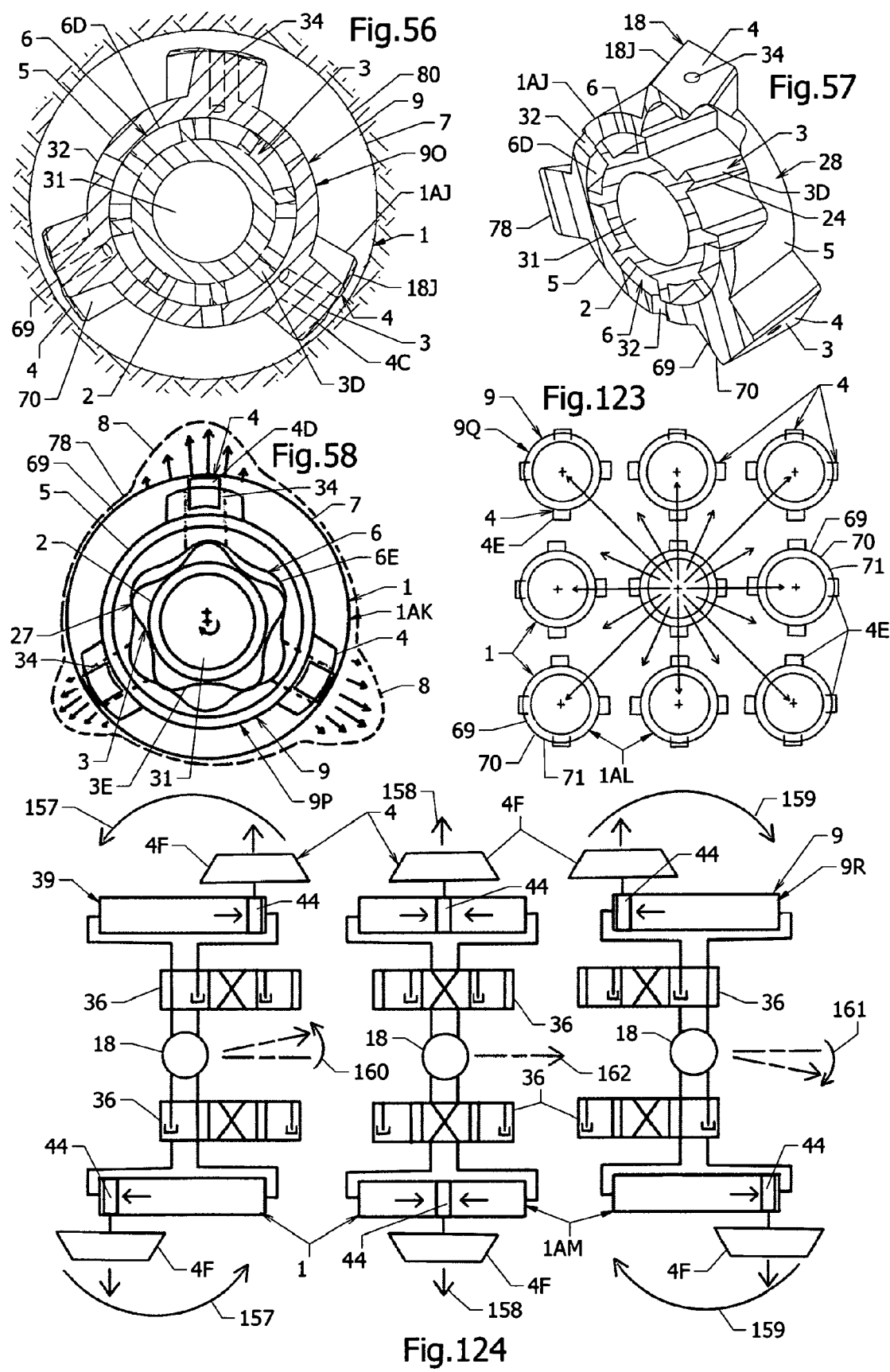

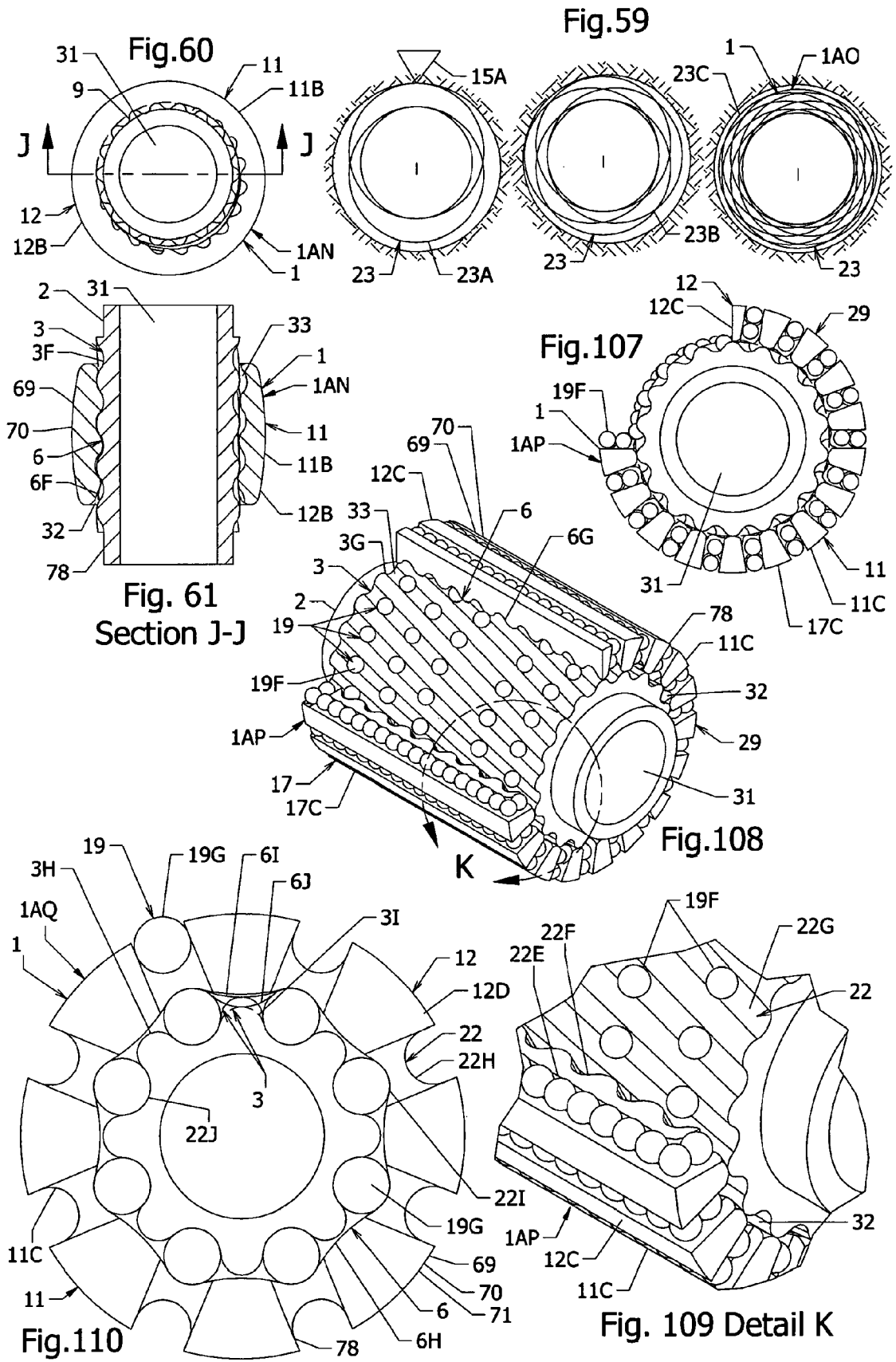

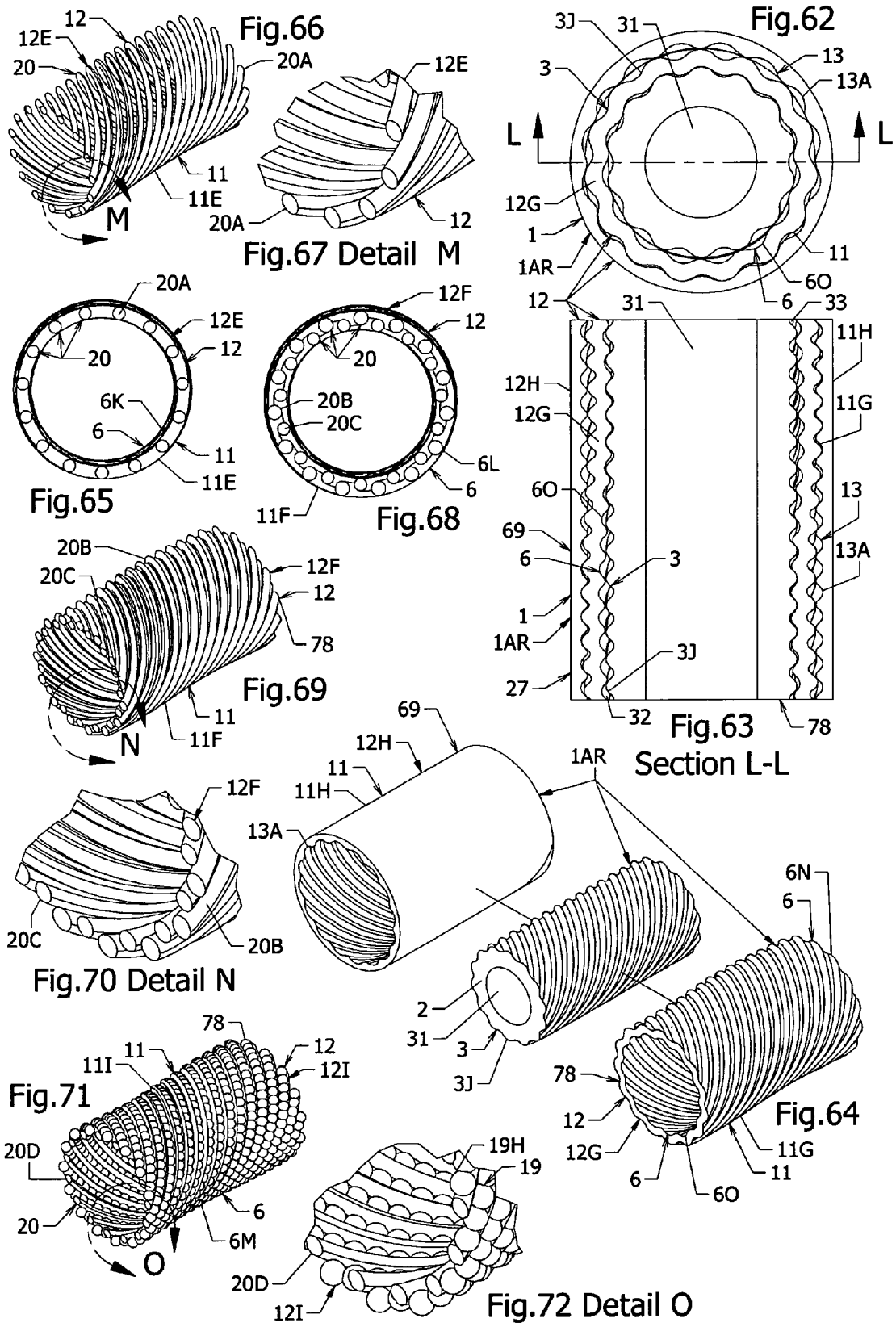

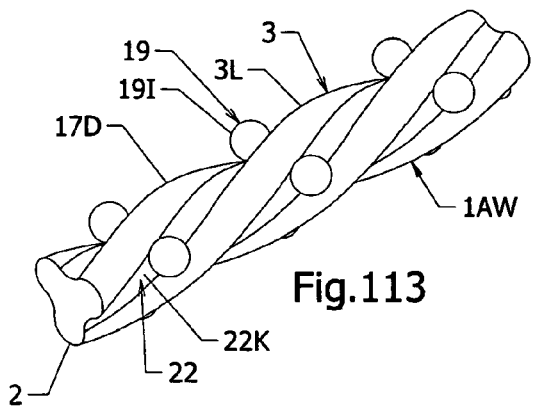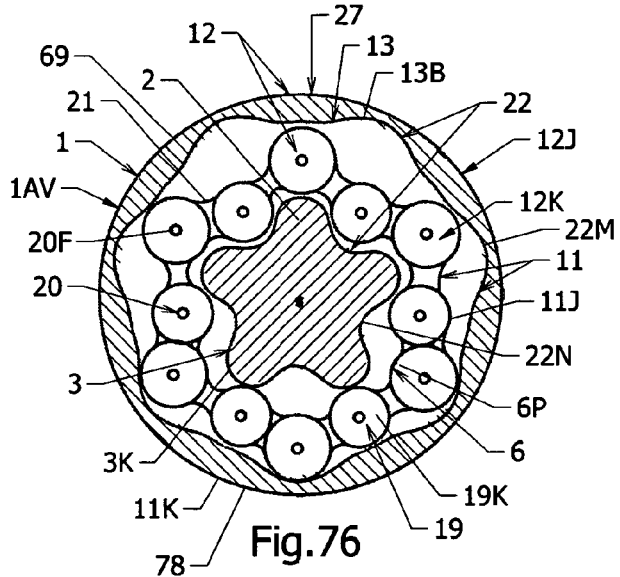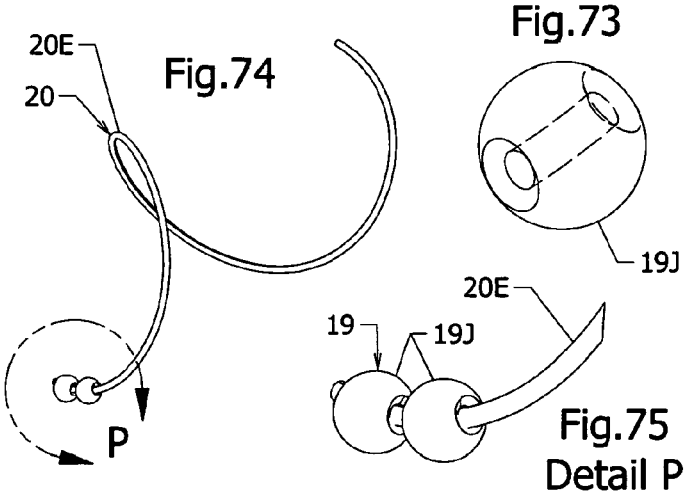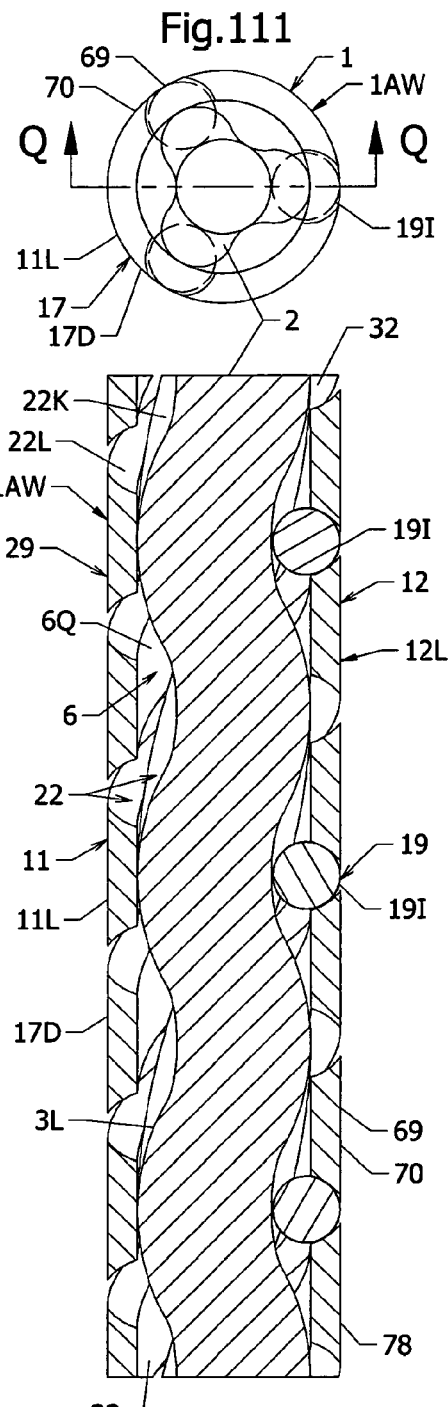

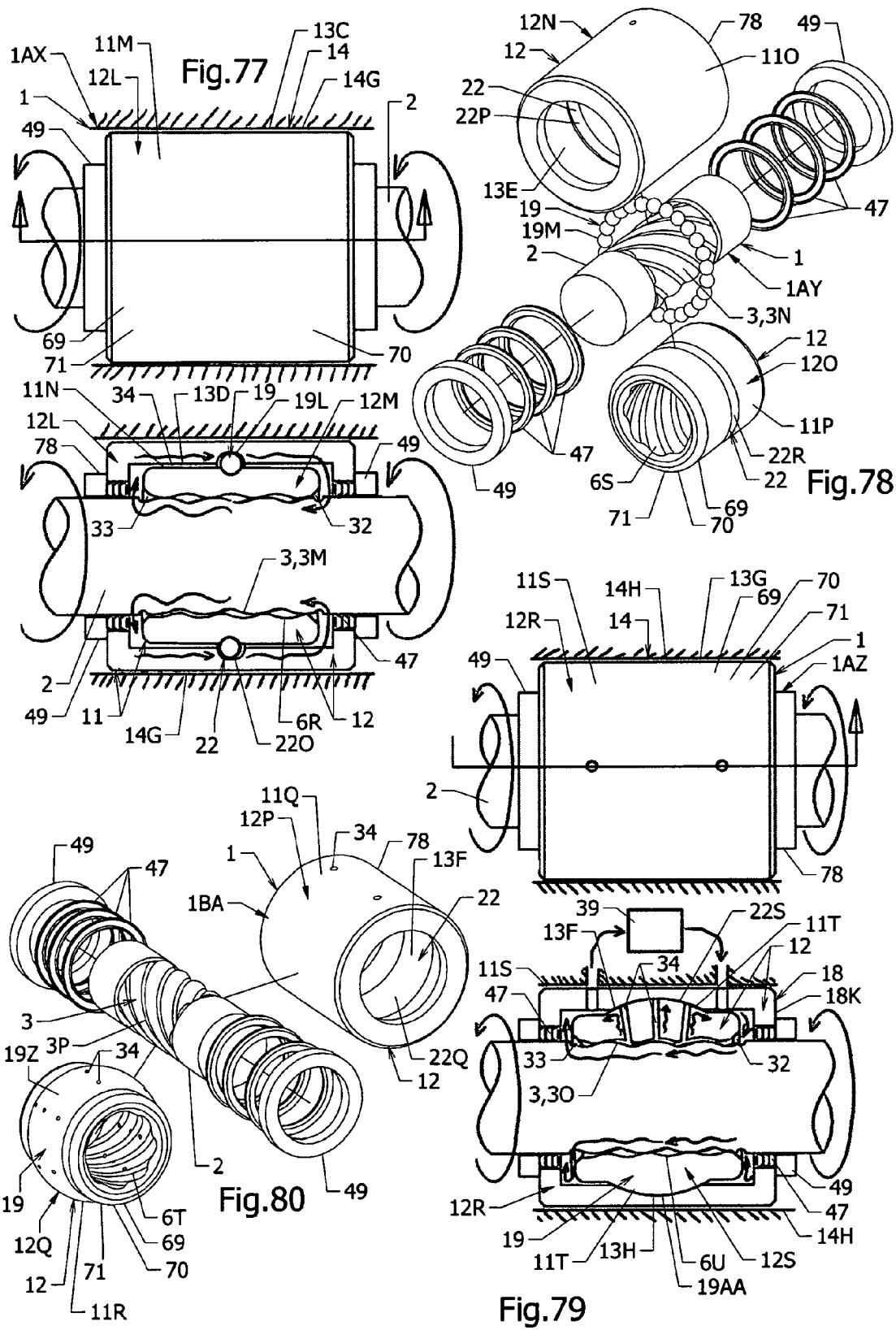

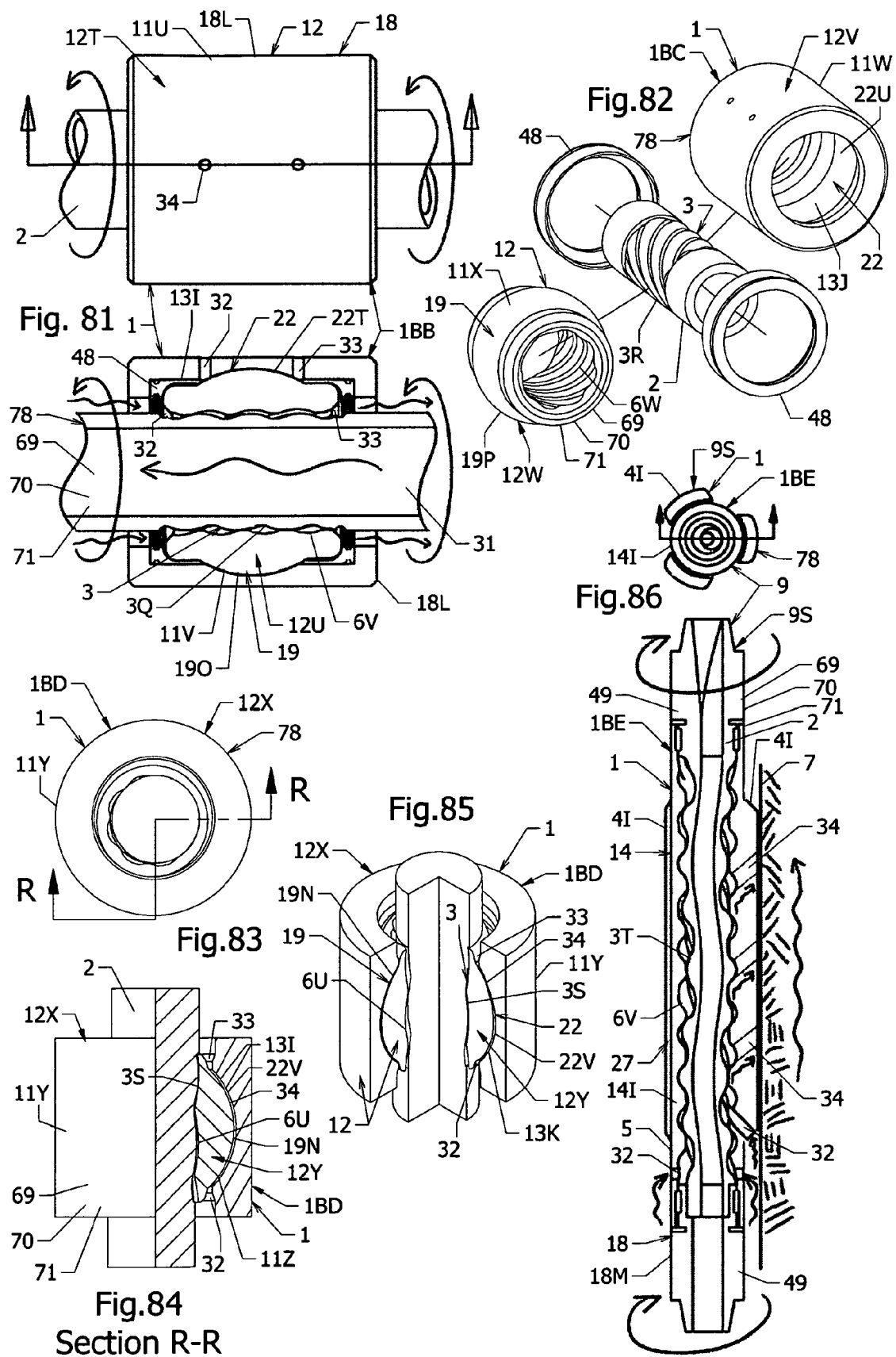

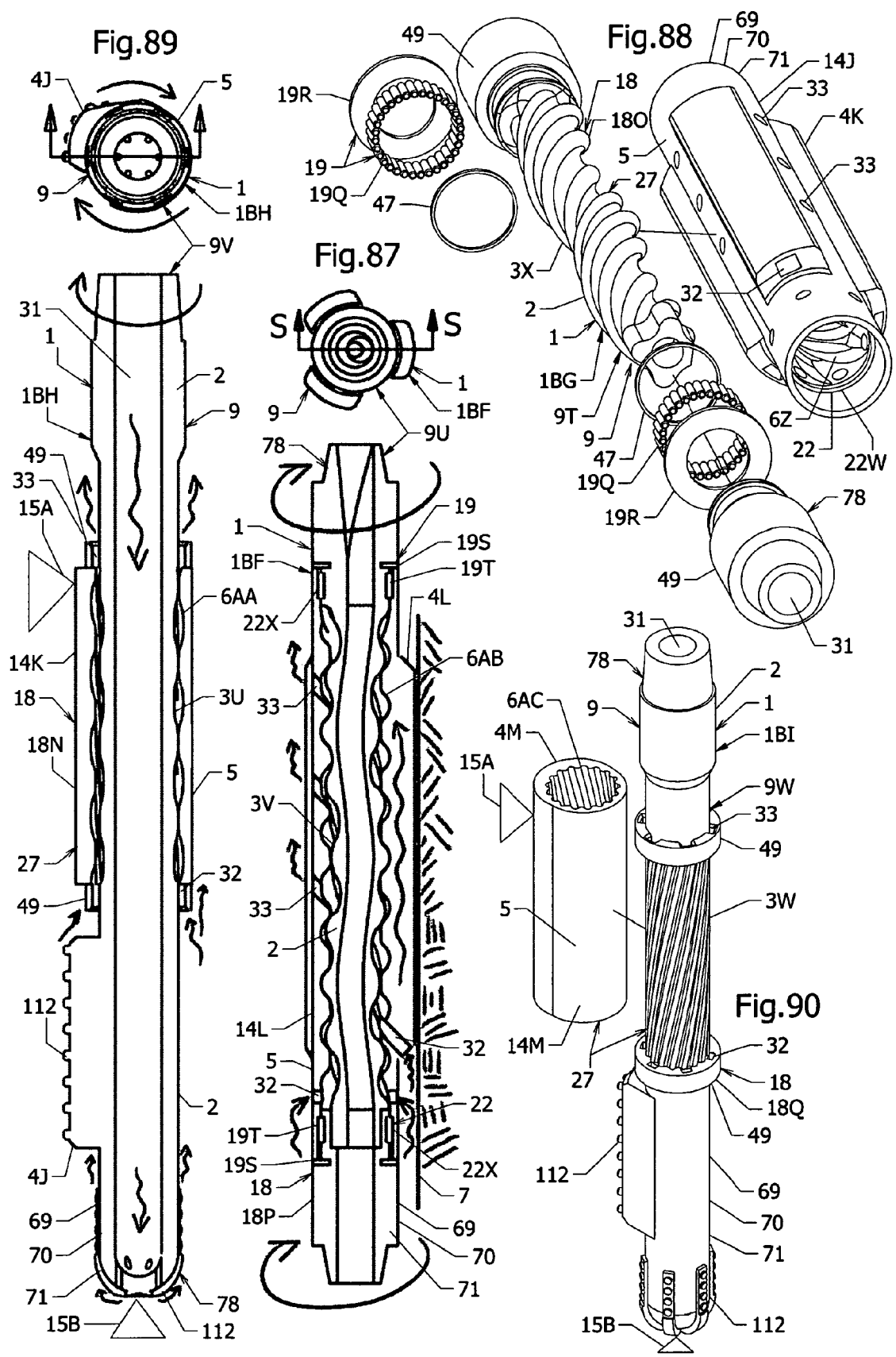

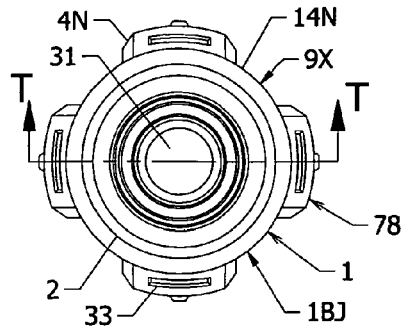
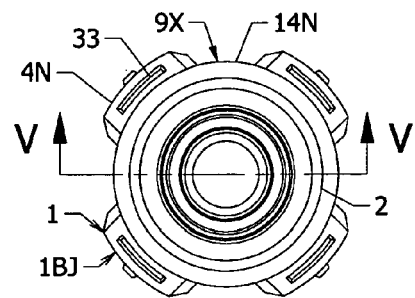
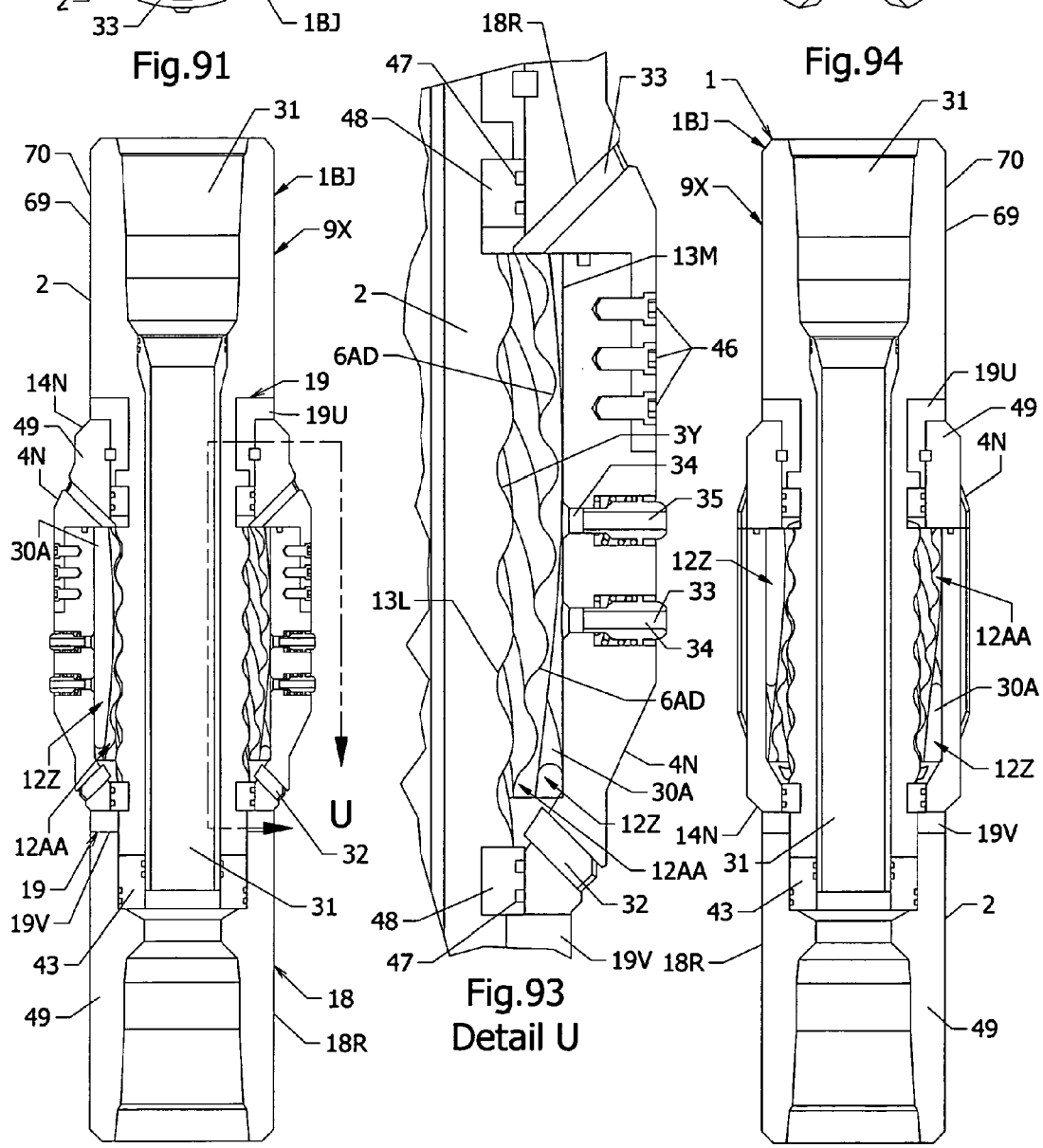
Fig. 91
Fig. 94
Fig. 93 Detail U
Fig. 92 Section T-T
Fig. 95 Section V-V

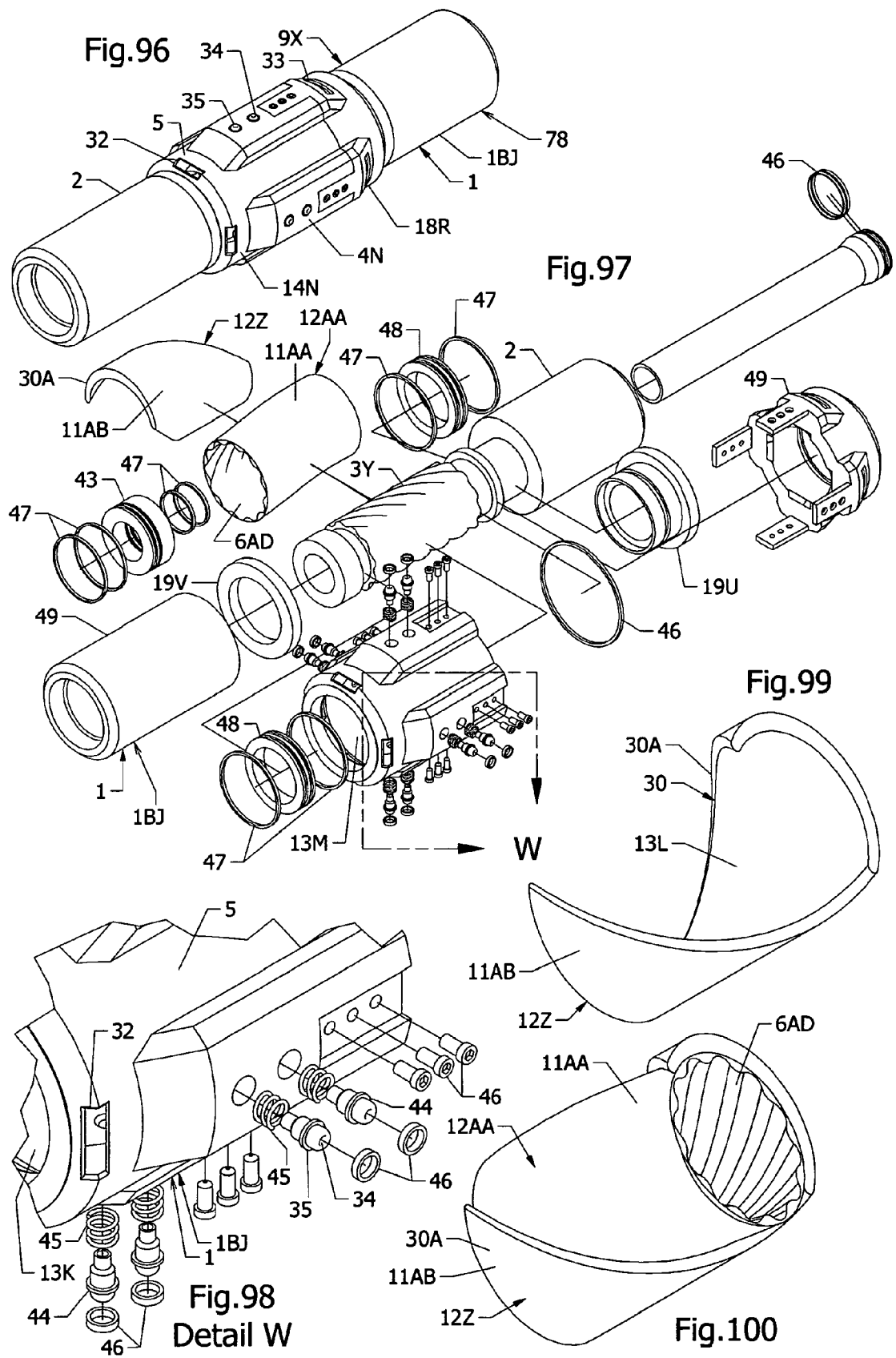

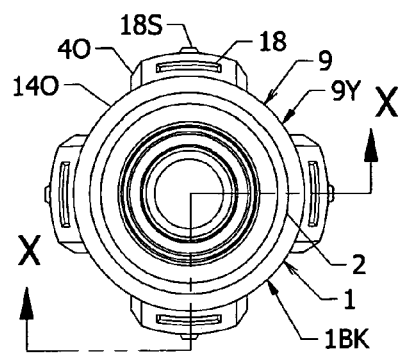
Fig.101
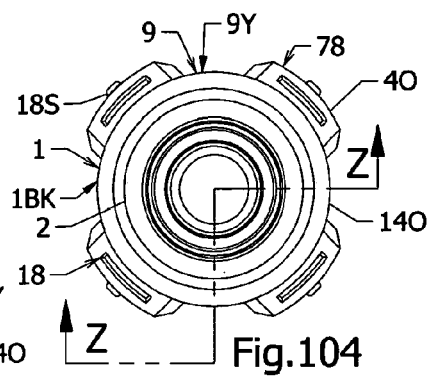
Fig.104
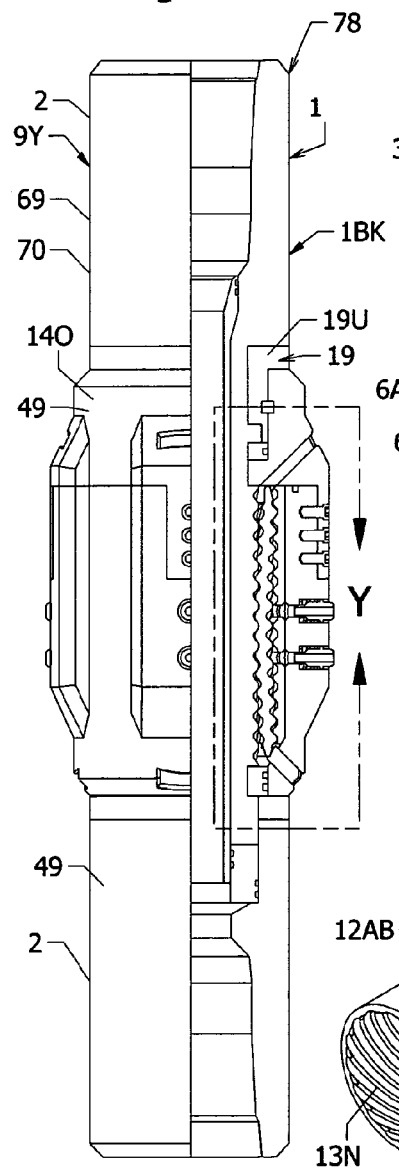
Fig.102 Section X-X
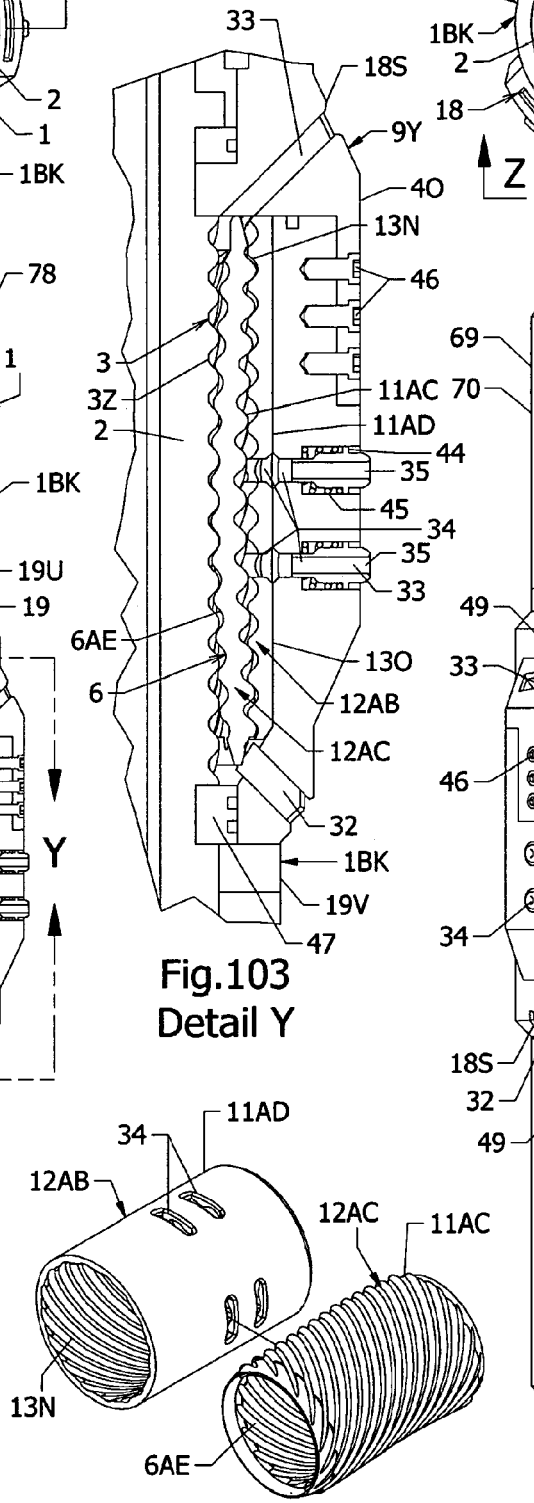
Fig.103 Detail Y
Fig.103A
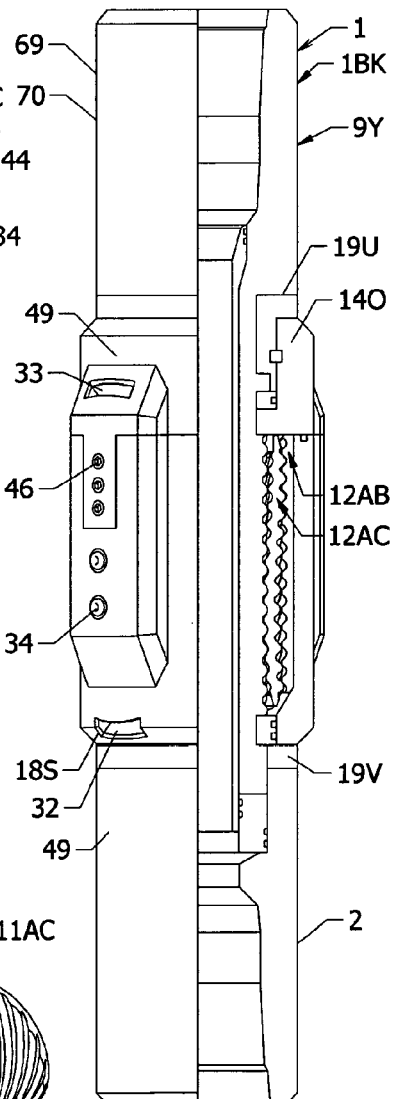
Fig.105 Section Z-Z

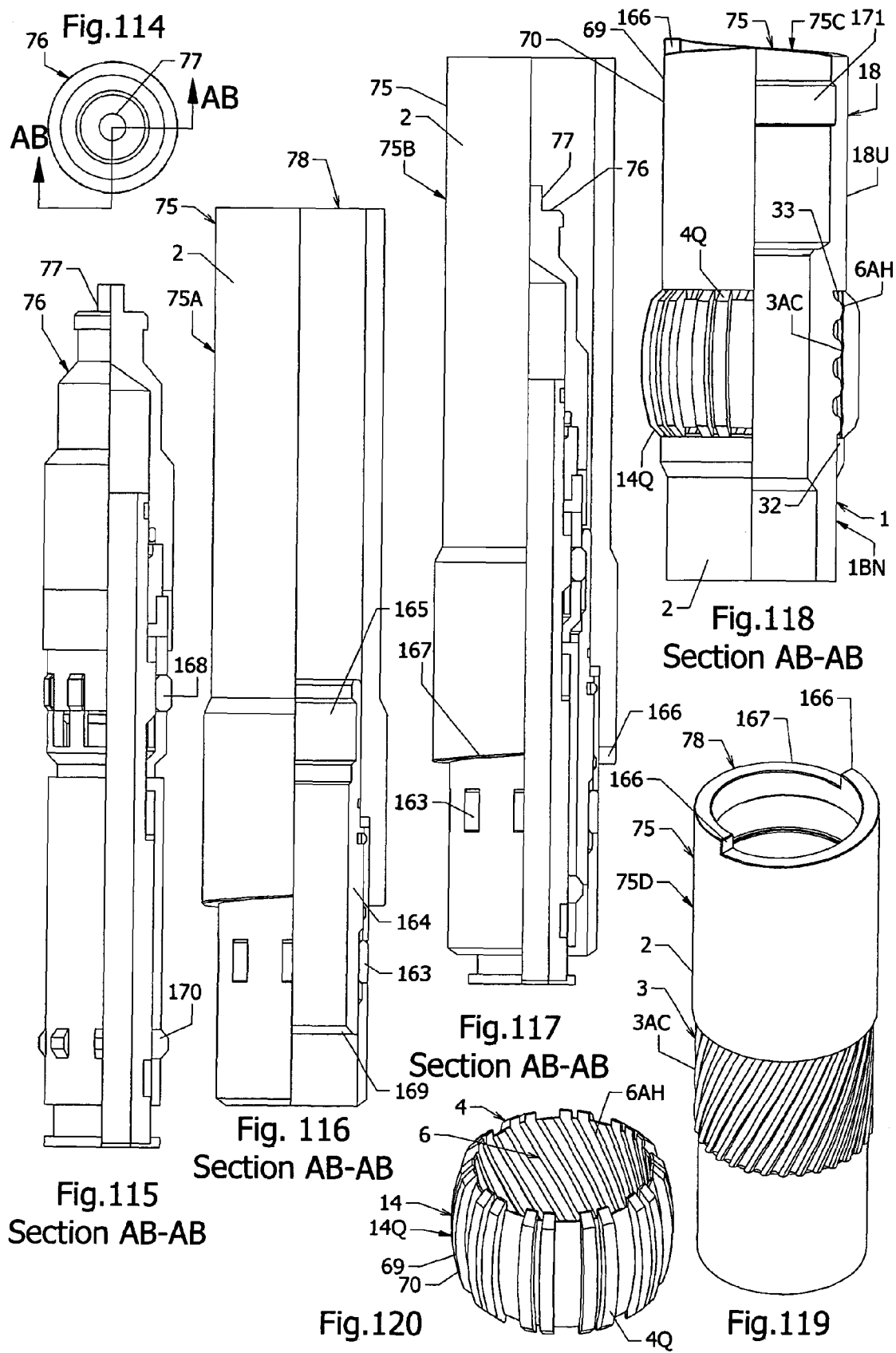

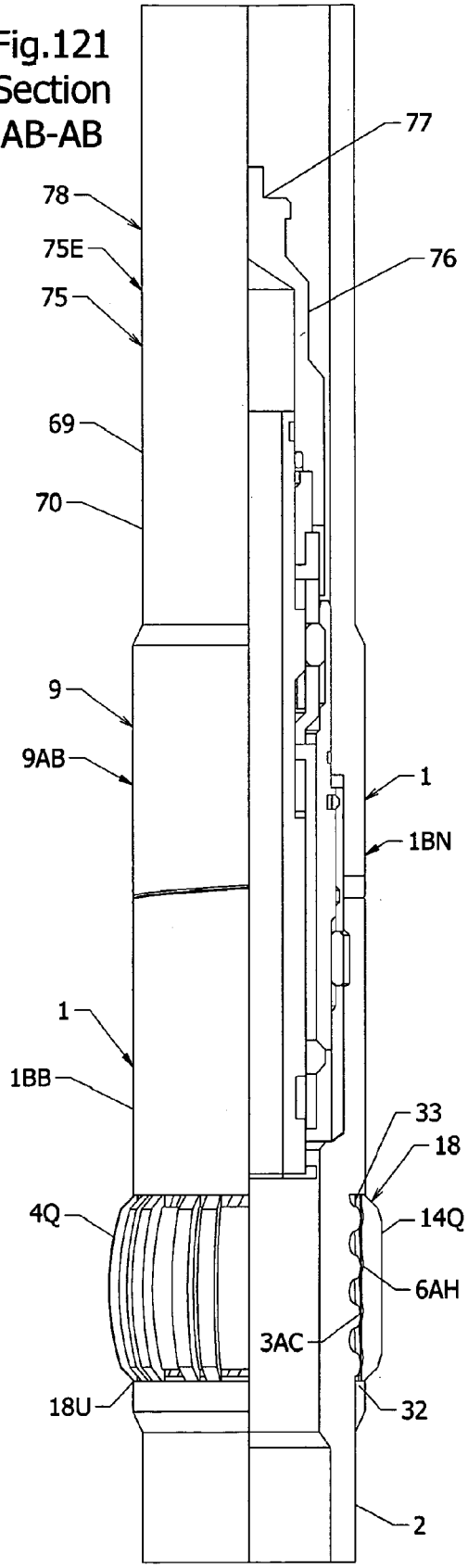
Fig.121 Section AB-AB
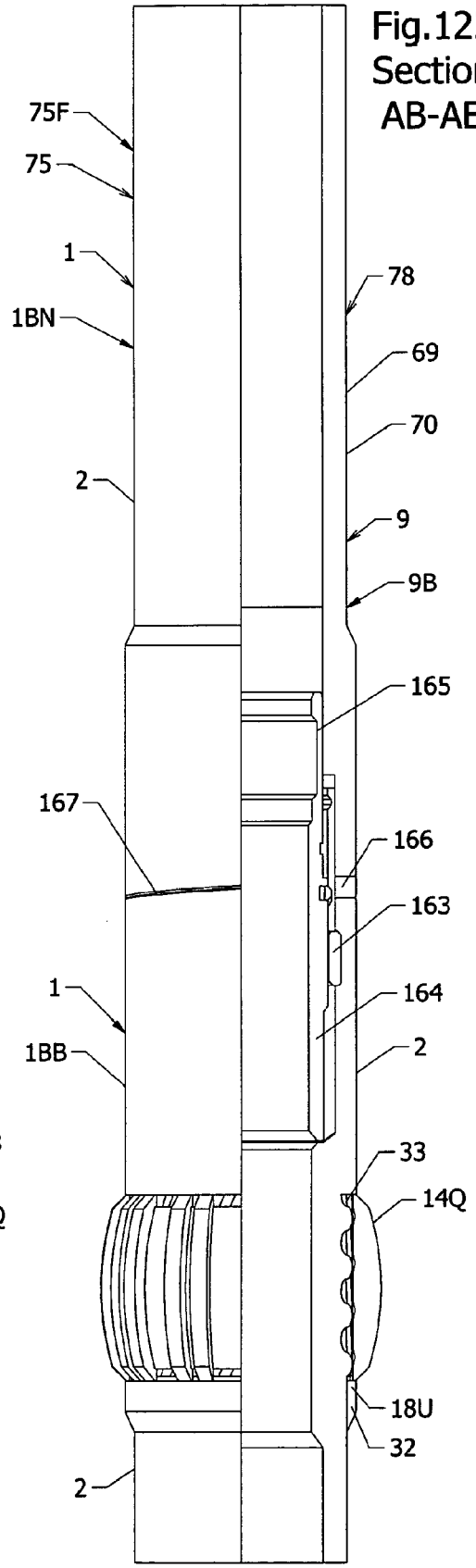
Fig.122 Section AB-AB

Fig. 127 Detail AD

Fig. 126 Section AC-AC
Fig. 129 Section AE-AE

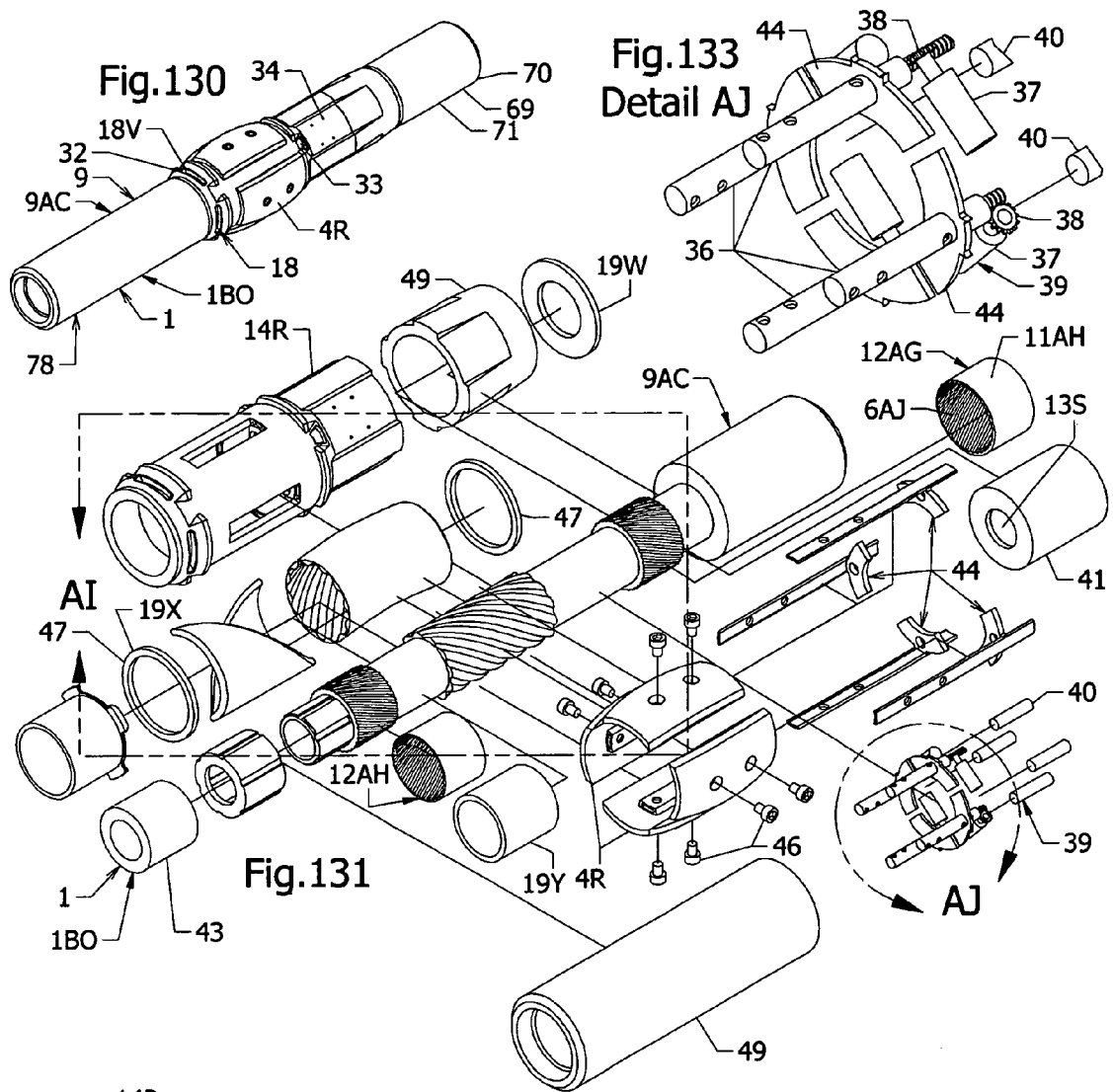
Fig.130
Fig.131
Fig.133 Detail AJ
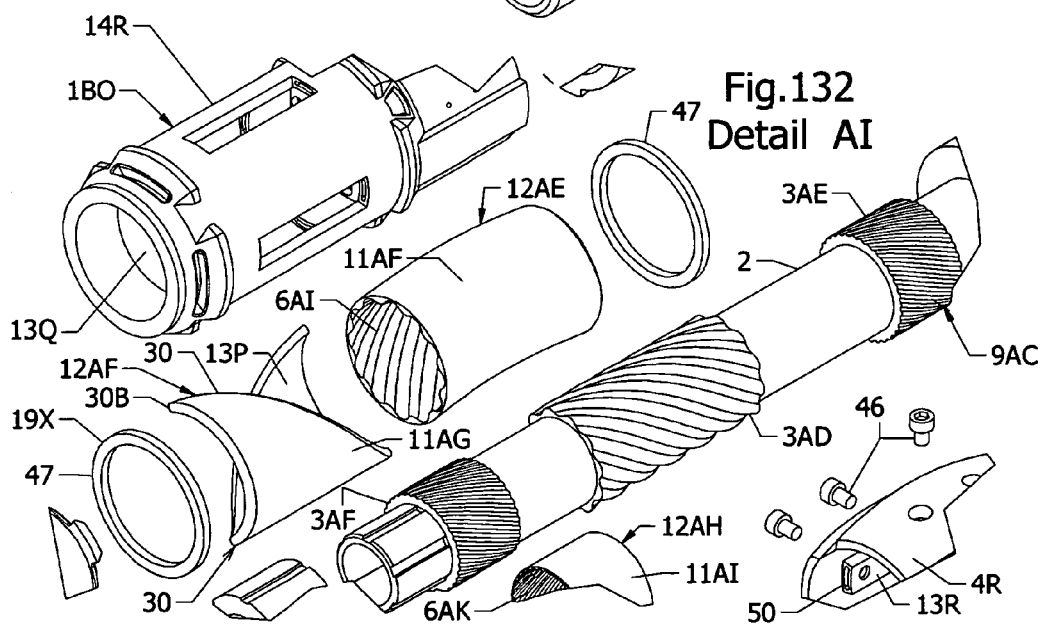
Fig.132 Detail AI

ROTARY STICK, SLIP AND VIBRATION REDUCTION DRILLING STABILIZERS WITH HYDRODYNAMIC FLUID BEARINGS AND HOMOGENIZERS

The present application is a U.S. national application that claims the benefit of patent cooperation treaty (PCT) application having PCT Application No. PCT/US2012/000580, entitled "Rotary Stick Slip And Vibration Reduction Drilling Stabilizers With Hydrodynamic Fluid Bearings And Homogenizers," filed Dec. 17, 2012, which claims priority to United Kingdom Patent Application Number GB1121741.1, entitled "Rotary Stick Slip And Vibration Reduction Drilling Stabilizers With Hydrodynamic Fluid Bearings And Homogenizers," filed Dec. 16, 2011, and United Kingdom Patent Application Number GB1121743.7, entitled "Cable Compatible Fluid Hydrodynamic and Homogenizing Bearing Rotary Steerable System For Drilling And Milling," also filed Dec. 16, 2011, all of which are incorporated herein in their entireties by reference.

FIELD

The present invention relates, generally, to systems and methods usable for providing hydrodynamic fluid bearings for boring string shafts using various helical nodal, cavity, impellor and race hydrodynamic profiles for journal, thrust and/or pivotal fluid bearing parts, with substantially stationary and substantially rotating rotary drill string stabilizer housings, and with a partial circumference, bladed or arced wall supporting a low diameter-to-length rotating boring shaft that can be susceptible to friction, stick-slip, bit whirl and harmonic resonance vibrations during boring operations, within high pressure hot subterranean environments that may vary significantly across regions and between geologic periods and epochs.

The present invention is usable within a fluid slurry environment, particularly in instances where homogenization of rock debris into said slurry is desired for hole cleaning and/or for preventing or inhibiting the propagation of strata fractures, and/or when an improved fluid bearing for dampening or minimizing rotary stick slip and/or harmonic resonance is needed.

BACKGROUND

The present invention relates, generally, to apparatus and methods for reducing rotational friction, shocks and vibrations associated with bearing a rotatable shaft (2) within a subterranean bore, usable with various inventions of the present inventor that are generally described in United Kingdom Patent Number 2465478, entitled "Apparatus And Methods For Operating A Plurality Of Wells Through A Single Bore"; United Kingdom Patent Number GB2471760B, first published under GB2471760A on 12 Jan. 2011, and PCT Patent Application GB2010/051108, both entitled "Apparatus And Methods For A Sealing Subterranean Borehole And Performing Other Cable Downhole Rotary Operations," and both filed Jul. 5, 2010; and United Kingdom Patent Number GB2475626B, entitled "Managed Pressure Conduit Assembly Systems And Methods For Using a Passageway Through Subterranean Strata," filed Dec. 23, 2010 and first published under GB2475626A on 25 May 2011, all of which are incorporated herein in their entirety by reference.

The embodiments of the present invention can be usable with rotary drilling tools for debris and drilling fluid homogenization, anti-stall, anti-vibration and directional drilling control relating to controlling weight-on-bit and/or directional orientation during drilling operations, wherein the debris homogenised into the drilling fluid is also usable as lost circulation material (LCM).

Additionally, the present invention relates, generally, to a steerable rotary drilling device and methods for directional drilling with jointed, coiled tubing and/or cable conveyed rotary drilling strings, of the present invention and inventor, wherein the debris and drilling fluid homogenization is usable to prevent or inhibit the initiation of strata fractures while the fluid dampening effective of, for example a rotor stator fluid bearing is usable to prevent or inhibit stalling and/or adverse shock or vibration of rotary drilling strings during drilling and/or directional drilling operations, for any combination of hole angle, curvature rate, and bit load.

Cable drilling assemblies of the present invention and inventor may be used as or with a downhole fluid positive displacement motor (PDM), while jointed drill pipe, and/or coiled tubing drilling assemblies may be used with a PDM and the present invention to rotate a boring drill bit.

A downhole tool that homogenizes drilling rock debris into the fluid circulation system, reacts to frictional factors and reduces the occurrence of adverse shocks, stick slip and/or vibration will increase overall drilling efficiency by: i) increasing the effective time of the downhole assembly's associated boring bit engagement with strata while drilling, thus increasing the average rate of penetration; ii) decreasing the damaging shock and vibrational forces to the downhole assembly, thereby decreasing occurrence of downhole failure; iii) increasing the pressure capacity of the circulating system with increased fluid carrying capacity through homogenization and disposal of boring bit cuttings through lost circulation material (LCM) compaction in the sidewall or screening at surface, thus increasing the penetration rate limitations imposed by drilling fluid loses and debris loading prior to removal; and iv) decreasing the time spent tripping for all strings; and v) fatigue cycles associated with cable and coiled tubing strings; thus increasing the rate of penetration and distance drilled before tripping for repairs and/or replacement.

More efficient drilling operations reduce overall required resource costs through a conventional time and cost relationship, and reducing the forces exerted on downhole tools also increases their useful life.

During drilling operations, regardless of whether rotary equipment, e.g. a top drive, is located at surface or a PDM is used downhole, it is desirable to support a rotating shaft or conduit about the axis of boring so as to effectively place weigh on bit (WOB). For complex closed loop rotary steerable systems, e.g., one or more gimbaling spherical bearings may be placed on drilling shafts to ensure the proper rotation or movement and/or orientation of the boring bit, relative to the axis. For straight hole or directionally controlled bottom hole drilling assemblies, various centralizing fulcrums or pivot points, generally comprising drilling tools contactable with the borehole sidewall, are used to align the drill string and bit with the desired axis of boring.

Generally, conventional bearings are used for the support of complex closed loops rotary steerable systems (RSS) which often suffer from significant adverse stick slip and vibration limitations that, generally, may not be significant for PDM downhole assemblies. Artisans may sometimes combine a PDM with a RSS to increase the penetration rate in hard drilling areas, but such combinations are not generally easy.

Conventional fluid bearing misalignment between rotating and associated complementary surfaces may affect fluid passage and prevent the fluid bearings from accurately supporting loads, since any such misalignment will adversely affect the gap between, e.g., the rotor and stator surfaces. Generally, fluid bearings depend upon the small gap between rotating and complementary surfaces for lubrication, wherein any misalignment is detrimental to the performance of the bearing to the point of making the bearing inoperable through the lack of lubrication. Additionally non-uniform loading on the shaft or conduit can cause a lack of circular symmetry of loading on the conduit or shaft, resulting in deflection of the ends of the shaft in the bearings which affects the fluid lubricating gap.

Conventional PDM technology uses fluid to positively displace helical lobes of a rotor within the associated helical profiles of a stator, wherein a planned deflection of the rotor within the stator occurs as the rotor rotates about the rotor's and stator's axis. Generally, within a PDM, the rotor is left free to deflect at its upper end with controlled rotation of downhole apparatuses at its lower end.

The present invention may use the defined deflection of a helical lobed rotor within the helical cavities of a stator, or vice versa, to form a fluid bearing to, for example, reduce shocks and vibration in a rotational drilling shaft or homogenize boring bit cuttings within drilling fluid slurry to facilitate removal or use as LCM.

The present invention may also use a spherical bearing or gimballing system, forming part of a helical lobe rotor and stator fluid bearing, to provide a self-aligning fluid bearing pump, which can be usable to drive downhole tools. Alternatively, a helical lobe rotor and stator may be used to automatically compensate for misalignment between the axis of a spaced bearing arrangement and a drilling tool rotational axis so as to compensate for non-uniform circular shocks and vibrations or loads placed on the drilling conduit or shaft, wherein sinusoidal, harmonic or non-uniform vibrations and deflections of the rotating drilling conduit or shaft are fluidly dampened, and wherein such fluid bearings may be applied to a various downhole apparatuses.

Hydrostatic and hydrodynamic conventional thrust and journal bearings, of the fluid or frictionless type, use a predetermined gap between moving parts with a pressurized fluid maintained within said gap or spacing between moving parts to provide rotational lubrication. Hydrostatic bearings continually supply pressurized fluid to and from the spaces between moveable or relatively movable parts. Hydrodynamic bearings supply pressurized fluid between the moving parts by the relative movement of said parts. Hydrostatic bearings are usable where there is significantly, little or no movement between any movable or relatively movable parts, whereas a high rate of relative movement between the parts is necessary for hydrodynamic bearings to pressurize and move fluid so as to maintain the gap between the parts during rotation. Various prior art exists, e.g., Sakamoto, in U.S. Pat. No. 6,837,621 B1, filed 29 Jan. 2003, teaches a hydrodynamic bearing for a submersible pump motor which is neither designed for, nor sufficiently robust for, use within a drill string. Hummes et al., in US 2009/0242276 A1, filed 25 Mar. 2009, teaches a hydrostatic fluid bearing arrangement, which pumps fluid to a bearing or conventional fluid bearing primarily for cooling, wherein the bearing and the pumping flow device are two different mechanisms and are susceptible to vibration from eccentric rotational hydrodynamic profiles. In contrast, the present invention provides a hydrodynamic bearing that combines the pump with the bearing and compensates for eccentrically rotating hydrodynamic profiles using, e.g., helical wrapping bearings.

Conventional drill string stabilizers form crude fluid bearings within the bore hole, which are not generally recognized as such by those practicing in the art of drilling, with the exception of drill pipe protectors used within the casing. Moore, et al., in WO 00/40833, filed 6 Jan. 2000 and Tverlid, in WO 2010/022755 A1, filed 29 Aug. 2008, teach the use of a drill pipe protector as a form of fluid bearing, wherein said protectors are substantially stationary sleeves with flow channels and ports that are clamped onto the smooth outer diameter of a drill pipe or comprise a sealed unit intended primarily to protect the drill pipe and casing from wear. The outside diameter of such protectors are, generally, slightly larger than the drill pipe tool joints and significantly smaller than the casing inside diameter, thus preventing any rotating impellors or hydrodynamic profiles fixed, thereto, from functioning as a hydrodynamic bearing, since such prior art relies primarily upon trapping fluid pumped through the annulus or from within the drill string with optional, rudimentary, centrifugal urging of fluid outward from the smooth rotating surface of the drill pipe.

Components of the bottom hole assembly (BHA) above the boring bit comprising, for example, drilling stabilizers, drill collars and other ancillary equipment, including the associated deployment string, are generally cylindrical and of a smaller diameter than the borehole, so as to permit drilling fluid, generally referred to as drilling mud, and boring bit cuttings debris to flow back to the surface through the annular space between the pipe string and bore hole, wherein the drilling mud reduces the drag of the crude fluid bearings formed between the stabilizers and the wall of the strata bore as the drilling assembly is rotated and urged axially.

As a result, two major elements, comprising tensioned and compressed string portions axially above and below a neutral point, respectively, may incur torsional resonance when a the drill string undergoes harmonic oscillations or shock forces during stick and slip of the drill string, while rotating between the conventional crude fluid bearing stabilizers, which may be inadequately spaced and/or under gauged relative to the bore hole's diameter, and wherein axial inclination or deviational deflection may occur. Improperly configured drill strings may incur significant inefficiencies, comprising torsional loading and harmonic oscillations of sufficient magnitude to cause drill string failure in many cases, especially within rotary coiled tubing and cable string drilling assemblies where rotation of the deployment string may be catastrophic.

Torsional resonance or stick slip for components with high torsional stiffness and modulus of elasticity characteristics, e.g. drill-collars, may also damage drill string components, e.g. boring bit polycrystalline diamond compact (PDC) cutters, through the momentum of torsional loads and/or reverse rotation of the drilling assembly comprising backlash from whirl and stick slip behaviour.

Stick-slip behaviour of a drill string may represent chaotic disturbances in normal operations and destructive torsional resonances of the rotating portion of the drill string heavy drilling loads that depend upon various factors including axial drag, axial shock loading or bit bounce, bit whirl caused by disengagement from the boring face, back-lash or backwards spin resulting from stick-slip that may result in torque shocks and vibration from bit whirl and stick-slip, buckling of rotational components and/or lateral harmonic vibration associated within unsupported portions of the drill string lacking a bore hole bearing, e.g. a stabilizer.

If a drill string is not arranged to naturally balance such destructive axial, torsional and centrifugal forces, adverse rotational forces may become self-sustaining due to the momentum of a continuously rotated mass, e.g. heavy drill collars, and associated harmonic vibrations between or about borehole bearings, whereby stopping rotation or axially withdrawing contact with the boring face may be the only means of countering said destructive forces, once they start.

Successfully avoiding adverse rotary stick-slip and/or managing drill string rotational harmonics to improve the drilling process requires balancing of the rotational driving mechanism, the rotating components, the torsional rigidity of the components and the interaction of the boring bit with the strata being drilled. While each of these factors have an effect, each factor may also affect another factor, thus causing significant complexities, like the interaction between differing rotational sinusoidal harmonics along a drill string, wherein the avoidance of adverse torsional loading and harmonic vibration is difficult because the factors are constantly changing.

With regard to related prior art, McLoughlin and Swietlik, U.S. patent application Ser. No. 12/733,480, propose confining the radial motion of a stabilizer within the borehole using a flexible joint within a drill string stabilizer, thus providing flexibility, within limitations, to the internal attitudinal motion and constraining lateral and torsional movements through the use of an improved stabilizer design that inherently falls short of forming a fluid bearing. The full extent of potentially destructive forces cannot be fully dissipated between the drill string and the sidewall because the design does not actively supply fluid lubrication between the side wall and the drill string stabilizer blade. Additionally, integration with a rotary steerable tool, rotary cable tool compatibility and fluid homogenisation with the associated benefits of debris removal and LCM generation, provided by the present invention, are not present in the teachings of McLoughlin and Swietlik.

As the frequency of harmonic vibrations associated with the rotating drill strings may vary widely across drill string configurations and geologic conditions, timely corrective action from an active hydraulic system responsive to the required active damping of the continuously changing harmonic motion is necessary. Periods of high bit generated vibration frequency and amplitude require active and responsive fluid damping of the BHA to prevent adverse harmonic and torsional rotation and, consequently, feedback to the bit which may further degrade drill string rotation. Adverse harmonic and torsional rotation can be especially problematic for rotary cable tool boring operations.

Unfortunately, despite having significant merit, the technology taught by, e.g., McLoughlin and Swietlik, the present inventor and the present invention can be difficult to deploy due to the risk tolerance of Operators and the oligopolistic nature of large service providers who, understandably, prefer using technology with the highest immediate return, thus making new technology development difficult.

Ultimately solutions to drilling and production operational problems come from field testing and development of new technology; however, well operators face a series of challenges at each stage of a well's lifecycle as they seek to balance the need to maximise economic recovery with the associated reduced net present value of produced assets and subsequent abandonment liabilities, while meeting their obligations for safe and environmentally sensitive operations. After drilling and well construction, when wells lose structural integrity, which may be defined as an apparent present or probable future loss of pressure or fluid bearing capacity and/or general operability, all or portions of a well may be shut-in for maintenance or suspension, or may require immediate plugging and abandonment, potentially leaving producible reserves within the strata that cannot justify the cost of intervention or a new well.

New technology provided by the present invention and others could be proven within unproductive wells if the problems of structure integrity could be addressed. Some of the more frequently reported structural well integrity problems comprise a lack of centralization leading to conduit erosion from thermal cycled movement, corrosion within the well conduit system from, e.g., biological organisms or H2S which forms leaks through or destroys conduits or equipment and/or causes valve failures associated with subsurface safety valves, gas lift valves, annuli valves and other such equipment. Other common well integrity issues include unexplained annulus pressure, connector failures, scale, wear of casings from drilling operations, wellhead growth or shrinkage and xmas or valve tree malfunctions or leaks at the surface or subsea. Such well integrity issues comprise areas where operators are able to, or choose to, test integrity and there are others (such as the internals of a conductor) which they cannot, or do not, test integrity and which may represent a serious risk to economic viability and the environment. Problems within various portions of a well, in particular the annuli, cannot be conventionally accessed without significant intervention or breaking of well barriers, e.g., with a drilling rig, and thus, are a significant cost and safety risk to operators that are unsuitable for conventional rig-less operations.

A primary advantage of using drilling specification rigs for well intervention is the removal of conduits and access to annuli during well intervention and abandonment, wherein the ability to access and determine the condition of the annuli casing and primary cement behind the production conduit or tubing is used to make key decisions regarding the future production and/or abandonment. If well casings are corroded or lack an outer cement sheath, remedial action, e.g. casing milling, may be taken by a drilling rig to provide a permanent barrier. Conversely, the problem may be exacerbated by conventional rig-less well abandonment when blind decisions are made without cement logging access to annuli and attempts to place cement fail, thereby placing another barrier over potentially serious and worsening well integrity issues that can represent a significant future challenge, both technically and economically, even for a drilling rig.

Various apparatuses and methods of the present inventor are usable for benchmarking, developing, testing and improving the present invention and other new technology, wherein said apparatuses and methods relate to the gathering of information that conventional rig-less operations cannot, by providing access and/or space for both measurement devices and sealing materials within unproductive wells. Once such information is gathered, still other apparatuses and methods of the present inventor are usable for benchmarking, developing, testing and improving rig-lessly placed barriers, to mill or shred conduits and casings to expose and bridge across hard impermeable strata or cap rock formations, for the placement of permanent barriers to ensure structural integrity that is necessary for proving the present invention and other new technology within unproductive wells.

In general, age is believed to be the primary cause of structural well integrity problems. The combination of erosion, corrosion and general fatigue failures associated with prolonged field life, particularly within wells exceeding their design lives, together with the poor design, installation and integrity assurance standards associated with the aging well stock is generally responsible for increased frequency of problems over time. These problems can be further exacerbated by, e.g., increasing levels of water cut, production stimulation, and gas lift later in field life.

However, the prevalent conventional consensus is that although age is undoubtedly a significant issue, if it is managed correctly it should not be a cause of structural integrity problems that may cause premature cessation of production. Additionally, fully depleting producing zones through further production prior to abandonment provides an environment of subterranean pressure depletion better suited for placing permanent barriers by lowering the propensity of lighter fluids to enter, e.g., cement during placement.

The embodiments of the present invention may be benchmarked, developed, tested and improved within an unproductive well, thus proving the technology, providing annuli that are accessible and pressure bearing conduits and well barrier elements that are selectively placed at required subterranean depths, between annuli, to allow further intervening in, maintaining, and/or abandoning portions of a well to extend the well life through, e.g., use of the present hydrodynamic fluid bearing, within a drill string, to access and to fully deplete a reservoir for further reducing the risk associated with well barrier element placement and the pollution liability from an improperly abandoned well.

The level of maintenance, intervention and workover operations necessary for well maintenance is restricted by the substantial conventional costs involved. The limited production levels of aging assets often cannot justify the conventional practice of using higher cost drilling rigs, and conventional rig-less technology is generally incapable of accessing various passageways or all annuli within the well.

Therefore, well operators generally place an emphasis on removing troublesome assets from their portfolio and seek to prevent future problems using improved designs, rather than attempting to remedy a poorly designed well, which in turn precipitates a greater focus on asset disposal, well design, installation and/or integrity assurance. Passing the problem on to others with the sale of a well does not, however, solve the issue of abandoning existing and aging wells from a liability viewpoint.

When intervention is required, risk adverse major oil and gas companies generally prefer asset disposal and replacement rather than remediation, favouring sale of aging well assets to smaller companies with lower overheads and higher risk tolerances. Smaller companies, requiring a lower profit margin to cover marginal cost, are generally eager to acquire such marginal assets, but may in future be unable to afford well abandonment, thus putting the liability back to the original owner and preventing sale or creating a false economy for the seller. Low cost reliable rig-less placements of well barrier elements to delay or perform abandonment is critical to major and small companies if aging assets are to be bought and sold and/or used for testing new technologies, to avoid such false economies. Thus, the rotary drilling rig and rig-less apparatuses and methods of the present invention are provable and usable within unproductive wells to place and verify well barrier elements for reliable abandonment and/or drilling, and hence are important to all companies operating, selling and/or buying aging wells.

Therefore, the structural integrity of producing and abandoned wells is critical because the liability of well abandonment cannot be passed on if a well ultimately leaks pollutants to surface, water tables or ocean environments, because most governments hold all previous owners of a well liable for its abandonment and environmental impacts associated with subsequent pollution. Hence the sale of a well liability does not necessarily end the risk when the asset is sold or abandoned unless the final abandonment provides permanent structural integrity.

Embodiments of the present invention are both usable and provable through benchmarking, developing, testing and improving of such new technology within unproductive wells, using rig-less well intervention and maintenance to extend the life of a well by using one aspect for placing well barrier elements, to isolate or abandon a portion of a well, and, then, operating another aspect until no further economic production exists or well integrity prevents further extraction or storage operations. Thereafter, the well may be completely and permanently abandoned for an indefinite time.

A need exists for improved stability of drilling and directional drilling assemblies for jointed and rotary coiled string operations.

A need exists for benchmarking, developing, testing and improving various embodiments of the present invention that can be usable for delaying abandonment, with low cost rig-less operations for placement of well barrier elements. This need is directed to an increased return on invested capital, for both substantially hydrocarbon and substantially water wells, through rig-less side-tracking for marginal production enhancement, suspending and/or abandoning portions of a well, to re-establish or prolong well structural integrity for aging production and storage well assets, and for preventing pollution of subterranean horizons, such as water tables, or surface and ocean environments.

A need exists for benchmarking, developing, testing and improving various embodiments of the present invention which are usable for small operating, foot-print, rig-less well barrier element, placement operations usable to control cost and/or perform operations in a limited space, e.g. electric line or slickline operations, on normally unmanned platforms, from boats over subsea wells or in environmentally sensitive area, e.g. permafrost areas, where a hostile environment and environmental impact are concerns. A related need also exists for benchmarking, developing, testing and improving various embodiments of the present invention which are usable for working within a closed pressure controlled envelope to prevent exposing both operating personnel and the environment to the risk of losing control of subterranean pressures if a well intervention kill weight fluid column is lost to, e.g., subterranean fractures.

A need exists for benchmarking, developing, testing and improving various embodiments of the present invention that are usable for avoiding the high cost of drilling rigs, with a rig-less system capable of suspending, side-tracking and/or abandoning onshore and offshore, surface and subsea, substantially hydrocarbon and substantially water wells, using published conventional best practices for placement of industry acceptable permanent abandonment well barrier elements.

A need exists for benchmarking, developing, testing and improving various embodiments of the present invention that are usable for preventing risks and removing the cost of protecting personnel and the environment from well equipment contaminated with, e.g., radioactive materials and scale, by rig-lessly placing abandonment barriers and leaving equipment downhole. A further need exists for benchmarking, developing, testing and improving new technology that is usable to rig-lessly side-track or fracture portions of a well to dispose of hazardous materials resulting from circulation of the well's fluid column during suspension, side-tracking and abandonment operations.

A need exists for benchmarking, developing, testing and improving various embodiments of the present invention that are usable for marginal production enhancement, which can be usable to offset operating costs until final abandonment occurs, including rig-lessly providing well integrity while waiting until an abandonment campaign across a plurality of wells can be used to further reduce costs.

A need exists for benchmarking, developing, testing and improving the technology of the present invention within unproductive wells to reduce the abandonment liability for operators, while meeting their obligations of structural well integrity for safe and environmentally sensitive well operations, suspension and abandonment in an economic manner, which is consistent with providing a hydrodynamic drill string bearing for exploration of new reserves to meet our world's growing demand for hydrocarbons by reducing adverse friction and vibration within drilling rig rotated, boring strings and lower cost, rig-less, side-tracking and boring strings, which can be usable to, e.g., prevent marginal recoverable reserves from being left within the strata due to higher operating overhead requirements that have made such recoverable reserves uneconomic.

Various aspects of the present invention address at least some of these needs.

SUMMARY

Embodiments of the present invention relate, generally, to an apparatus (1) and methods for reducing rotational friction, shocks and vibrations associated with bearing a rotatable shaft (2) within a subterranean bore. The apparatus (1) generally comprises a hydrodynamic bearing (1, 12), which is disposed about the rotatable shaft and within a wall (7) of a subterranean bore, wherein the hydrodynamic bearing comprises at least one periphery arced wall (4) radially extending from and arranged about the circumference of an outer wall (5) of a conduit shaft housing (14), which is disposed about at least one inner wall (6, 13) that can be adjacent to at least one associated hydrodynamic profiled wall (3). The at least one associated hydrodynamic profiled wall (3) can be rotatable by or about said rotatable shaft, and within said conduit shaft housing, to displace fluid axially along at least one other of said walls, using the rotation of the at least one associated hydrodynamic profiled wall (3), wherein frictional engagements of said fluid, the at least one associated hydrodynamic profiled wall (3), the at least one inner wall (6, 13), and the at least one periphery arced wall (4), disposed between said rotatable shaft (2) and said wall (7) of the subterranean bore, are used to anchor at least one of said walls, relative to said at least one associated hydrodynamic profiled wall (3), forming an anchored wall, to force said fluid between said at least one associated hydrodynamic profiled wall and said anchored wall, using rotation of the at least one associated hydrodynamic profiled wall relative to the anchored wall, to form a set of at least two of said walls, with fluid flow therebetween, to form a pressurized (8) cushion fluidly communicated to and from said set of at least two of said walls to, in use, lubricate and dampen said rotational shocks and vibrations through the shearing of said frictional engagements bearing rotation of said rotatable shaft between said at least two of said walls within said subterranean bore.

In an embodiment, the apparatus can include an at least one inner wall (6) that comprises the inner wall of at least one bearing sleeve (12) component, with an outer sleeve wall (11) adjacent to another said at least one inner wall (13) that is engaged with the conduit housing (14) and rotatably disposed about the shaft (2).

In addition, embodiments of the apparatus (1) can include at least one of: an inner wall (6, 13), an outer sleeve wall (11) or a periphery arced wall (4), which can comprise at least one associated hydrodynamic profile that can be rotatable by engagement with said rotatable shaft, said fluid flow, said at least two of said walls, or combinations thereof, to form or further pressurise a cushion or provide shearable frictional engagements.

The hydrodynamic profiles may comprise impellors (24), rotor lobes (25), stator cavities (26), bearing races (22) or combinations thereof (17, 18, 27, 28, 29), axially or helically oriented to said shaft's axis.

In an embodiment, the apparatus (1) can comprise rotating hydrodynamic profiles, with a motor or pumped fluid to form a pump (18) or motor (17) to displace a fluid or to rotate at least one of the walls of the bearing, respectively.

Other embodiments of the present invention include supplying fluid from at least one reservoir internally or externally to at least one passageway (31, 32, 33, 34) within or about the rotatable shaft (2), the bearing sleeve (12) and/or the conduit shaft housing (14), wherein the fluid can be returned to the reservoir externally or internally through the passageway.

Related embodiments, with at least one reservoir, may comprise a contained fluid volume reservoir within the conduit shaft housing and/or a fluid flow stream reservoir about the bearing, or combinations thereof.

Embodiments of the present invention may include a component part arrangement, with at least one one-way (35) valve and/or a plurality-of-way valve (36), to selectively control the fluid supply to and from said reservoir.

Other embodiments can include a piston (44) and/or a spring (45) component that can be usable to urge separation or coalescing of at least two walls of a hydrodynamic bearing, operation of said valves, or combinations thereof.

Still other embodiments can comprise a surface interface actuatable electrical control system (39), which can be usable to urge at least one component or wall of a hydrodynamic bearing (1), wherein said surface interface (42, 43) to said bearing interface comprises an electric cable (67R), a pulse (68) through said fluid within or about said bearing, or combinations thereof.

Other embodiments can comprise at least one journal (69), thrust (70) and/or pivotal (71) bearing component for reducing said rotational friction, shocks and vibrations associated with bearing said rotatable shaft (2), within the subterranean bore.

Still other embodiments of the apparatus (1) can include at least one of: a rotatable shaft (2), a bearing sleeve (12) and/or an inner wall (6, 13) wherein a portion of said shaft (2), said sleeve (12), and/or said inner wall (6, 13) comprises a flexible material.

Further embodiments of the apparatus (1) can comprise supporting cylindrical or ball bearing (19) component parts that can be usable between the walls and/or the rotatable shaft of a hydrodynamic fluid bearing to form a pump, or a motor to further reduce rotational friction, shocks and vibrations, or combinations thereof.

Additional embodiments of the apparatus (1) of the present invention may comprise a race (22), a strand (20) and/or a chain link (21) component part that can be usable to control the effective rotating diameter (23) of the rotatable shaft, a flexible material component part, the cylindrical or ball bearings within a hydrodynamic bearing, or combinations thereof.

Other embodiments may comprise an eccentric helical wrapping sleeve bearing (30) component part, which can be usable to dynamically control fluid supplied through said hydrodynamic bearing, the effective rotating diameter (23) of said hydrodynamic profile (3), or combinations thereof.

Still other related embodiments may have the periphery arced wall (4) axially extending from the outer wall (5) of an associated second or more shaft conduit housing, that can be proximally engaged with a first conduit shaft housing (14), to provide a frictional engagement to said subterranean bore.

Other related embodiments may comprise arrangements with fixed effective diameter (1B, 1D, 1F, 1H, 1J, 1K, 1M, 1O, 1P, 1R, 1T, 1U, 1V, 1W, 1X, 1Z, 1AA, 1AB, 1AC, 1AD, 1AF, 1AG, 1AH, 1AJ, 1AT, 1AU) or variable effective diameter (1A, 1C, 1E, 1G, 1I, 1L, 1N, 1Q, 1S, 1Y, 1AE, 1AK, 1AL, 1AM) peripheral axially or radially extending arced wall (4) bearings, within said subterranean bore's wall (7), to fix or affect the effective rotating diameter (23) of said rotatable shaft and hydrodynamic bearing arrangement.

Various other embodiments may have variable effective rotatable outer diameter (23) arrangements, between the rotatable shaft and periphery arced wall (4) bearing formed by at least one of: radially extending or axially moving at least one periphery arced wall component part, which is relative to at least one associated wall.

Still other related embodiments can include at least one of: a variable arced wall bearing or a fixed arced wall bearing arrangement for pendulum rotation of said rotatable shaft (2) about fulcrum (15A) and/or pivot (15B) bearing points (15), when axial (16A) forces, lateral (16B) forces, or combinations thereof, are applied to a component part of the bearing about the rotating shaft (2).

Various other embodiments may comprise an assembly of reusable and replaceable component parts, which can be assembled with fasteners (46) for maintenance and seals (47) for controlling the exposure of said fluid bearing component parts to fluid slurries between operations (e.g., removal and reuse operations) of said bearing and rotatable shaft, within said subterranean bore.

Still other embodiments can comprise a drilling or milling string (9) comprising a hydrodynamic fluid bearing subassembly that can be usable with a drilling or milling fluid slurry and string to form or enlarge a bore through subterranean strata or casing by circulating and using the debris laden fluid slurry to bear the rotatable shaft within the subterranean bore, wherein one or more motors within (17, 72), or at the upper end (73), of said drilling or milling string can rotate said rotatable shaft and at least one associated hydrodynamic bearing to, in use, lubricate, bear and dampen rotational shocks and vibrations associated with operational bearing of said string's rotatable shaft, during rotation of one or more cutting structure component parts, which are proximal to said string's lower end to perform said drilling or milling and removal of the debris.

Other related embodiments may comprise using the rotation of the hydrodynamic profiles to homogenize debris within a slurry to form a more fluid slurry of reduced particle size milling or boring debris, which can be usable to bear said shaft's rotation within said subterranean bore and increase the frequency of breaking and slurrifying said debris to reduce the particle size of said debris and, thus, increase the associated propensity for removal of said debris from the subterranean bore or casing, or increase an associated propensity for said debris to inhibit or prevent the propagation of strata fractures by packing said reduced particle size debris into a strata wall filter cake of said subterranean bore, said strata fractures, or combinations thereof.

In an embodiment of the present invention, the apparatus (1, 9, 12) can comprise a boring (9) string (67), which comprises at least one conduit joint that has an outer wall (5) and houses the hydrodynamic bearing (1, 12). The boring string can further comprise at least one periphery arced wall (4) and at least one additional wall, radially extending therefrom. The at least one periphery arced wall and the at least one additional wall can be arranged about a circumference of the outer wall (5) and can be axially arranged to form a directable pendulum boring string (9, 67). The directable pendulum boring string (67) can be used for operating one or more shaft engaged cutting structures, which are proximal to a lower end of said string, by using one or more motors (17, 72, 72A) to rotate said rotatable shaft and said one or more cutting structures. In this embodiment, the hydrodynamic bearing can lubricate and absorb rotational shocks and vibration, which are associated with boring by shearing said frictional engagements, to, in use, improve said rotating stabilization of the apparatus (1, 9, 12) to selectively direct and apply force to said one or more cutting structures, during the boring of the subterranean bore.

In an embodiment, the directable pendulum boring string (9, 67) can be operable as a directable motorized conduit boring piston (73), which can be placeable, retrievable and operable via a tensionable coiled string and pump pressure through the subterranean bore. Fluid pressure can be applied through and about the directable motorized conduit boring piston by one or more surface or boring piston, conduit, fluid pumps or motors.

In another embodiment of the present invention, the apparatus (1, 9, 12) can further comprise a reactive torque tractor (74) component that can be helically engaged between a housing of said motor and said wall of the subterranean bore to frictionally and axially urge the pendulum boring string with reactive torque of said one or more motors.

In still another embodiment, the apparatus (1, 9, 12) can comprise a shaft rotatable cutting structure component, which can be adapted for forming a bore, a shaft rotatable cutting structure adapted to open a bore, or combinations thereof.

The apparatus (1, 9, 12), in another embodiment of the present invention, can comprise a bore opening structure that can be radially extendable as pendulum arms from the rotatable shaft, a bi-centre cutting structure eccentrically placed and rotated on said rotatable shaft, or combinations thereof.

The pendulum boring string can be directable by varying the effective rotating diameter (23) of at least one component of the at least one periphery arced wall (4) and the at least one additional wall and said fulcrum point (15A), to vary a bit face at the pivot point (15B), thus rotatably bending the rotatable shaft at the bearing and fulcrum point to direct the pendulum boring string (67).

Embodiments of the present invention can include a control system that can be usable to selectively control the effective rotating diameter (23). By varying at least one component of the at least one periphery arced wall (4), using radial extension, radial retraction, axial movement, or combinations thereof, relative to the at least one additional wall, the one or more cutting structures can be laterally pushed, and the pendulum boring string can be selectively directed and controlled.

In addition, the control system can be usable to selectively control the fulcrum (15A), the pivot (15B), or combinations thereof, by using axial (16A) forces (16), lateral (16B) forces, or combinations thereof, which can be applied to a component of the rotatable shaft through said hydrodynamic bearing (1), which is anchorable to said subterranean bore (7) to, in use, selectively direct that pendulum boring string.

In an embodiment, the apparatus (1, 9, 12, 67) can further comprise at least one jointed rotary conduit (75) joint, which can be deployable, via a cable running tool (76), to form the at least one conduit joint of the pendulum boring string (9). In an embodiment, the at least one conduit joint of the pendulum boring string (9) can further be formed from the jointed rotary conduit (75) and the hydrodynamic bearing (1).

In another embodiment of the present invention, the apparatus (1, 9, 12, 67) can comprise at least two rotary conduit joints (75), with a securing rotary connection between the at least two rotary conduit joints. The securing rotary connection can comprise a key of a first conduit that can be inserted into an associated key receptacle of a second conduit, and the connection can be secured with engagement dogs that are locked within an associated receptacle, via said cable running tool (76). The apparatus (1) can further comprise associated wireline compatible, axial, helical orientation wrap or bearing surfaces, which can be used for mating the at least two rotary conduit joints (75).

In an embodiment of the present invention, the cable running tool can comprise a cable deployment device (76). The cable deployment device (76) can be used for running at least one rotary conduit joint by engaging the at least one conduit joint (75) during placement, orienting the key, engaging the locking dogs, locking the locking dogs, and disengaging from the at least one rotary conduit joint.

In an embodiment, the boring string can be adapted to side-track, laterally, from an existing well bore. Further, the boring string, in an embodiment of the present invention, can communicate with or through a plurality of annular passageways, wherein fluid is circulated through an inner most passageway (31) of the boring string (9, 67) and at least one of the plurality of annular passageways.

BRIEF DESCRIPTION OF THE DRAWINGS

Embodiments of the present invention are described below by way of example only, with reference to the accompanying drawings, in which:

FIG. 1 illustrates a system for forming usable space for side-tracking and the development and testing of various new technologies, apparatuses of the present inventor.

FIGS. 2 to 16 depict diagrammatic subterranean well schematics for various well types usable with various embodiments of the present invention.

FIGS. 17 to 21 illustrate various rig and rig-less arrangements usable with various wells geological sections A to D, described in FIGS. 2 to 20, which are applicable to various embodiments of the present invention.

FIGS. 22 to 32 show prior art apparatuses and methods.

FIGS. 33 to 43 depict apparatuses and methods of the present inventor usable with various embodiments of the present invention.

FIGS. 44 and 45 illustrate explosive and line tension for forming space within a subterranean well, which are usable to provide space for proving various embodiments of the present invention.

FIGS. 46 to 48 depict various drilling assemblies usable with various embodiments of the present invention.

FIGS. 49 to 53 illustrate various milling assemblies usable with various embodiments of the present invention.

FIGS. 54 to 106 depict various hydrodynamic stabilizing bearing embodiments of the present invention.

FIGS. 107 to 113 illustrate various hydrodynamic motor bearing embodiments of the present invention.

FIGS. 114 to 122 depict wireline deployable drill string conduit bearing embodiments of the present invention.

FIGS. 123 to 133 illustrate directional drilling hydrodynamic stabilizing bearing embodiments of the present invention.

Figure 29:
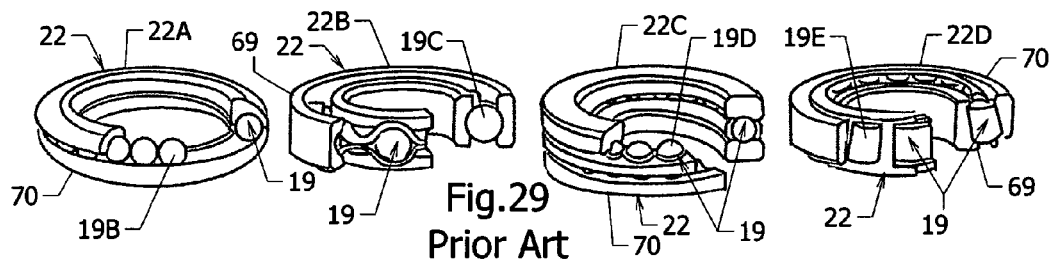

Embodiments of the present invention are described below with reference to the listed Figures.

DETAILED DESCRIPTION OF THE EMBODIMENTS

Before explaining selected embodiments of the present invention in detail, it is to be understood that the present invention is not limited to the particular embodiments described herein and that the present invention can be practiced or carried out in various ways. Moreover, it will be understood that various directions such as "upper," "lower," "bottom," "top," "left," "right," "clockwise," "counter-clockwise," and so forth may be made only with respect to explanation in conjunction with the drawings.

Referring now to FIG. 1, the Figure depicts a flow chart of a space provision system (10) example (10A), which shows the identification of wells available for abandonment (82) and consummation of an agreement (83) representing, for example, a contractual rental or sale agreement (84) between a technology (85) and abandonment liability owner (86) for space usage rights (87) and optionally infrastructure usage rights (88).

A space provision system can be usable to compress well apparatuses and debris (91) with a compression device (92) for forming a usable space for placement of an abandonment plug (89) to satisfy an abandonment liability and provide integrity for developing new technology (78), for example further space formation devices (92) to reduce the resources required for abandonment, or side-tracking drilling and milling assemblies (9) or hydrodynamic bearings (1) to for example, more effectively exploit Brownfields (79) and Greenfields (80) with less resources, to the benefit of the regional and global private and public economies (90).

Empirical measurements (93) may be taken with logging tools or a transponder may be placed in a protective shock absorbent housing (66 of FIG. 33) to provide empirical data to design, redesign, test and field prove new technology (78) in the development of Greenfield (80) and Brownfield (79) wells (57). Various technologies described in: United Kingdom Patent Numbers GB2465478B GB2471760B, GB2476381B, GB1111482.4, GB2479432B and GB2479043B; and PCT Patent Application Numbers GB2010/051108, US2011/000377 and US2011/000372, may be tested and further developed with the present space provision system. While new technology of the present invention are emphasised, virtually any downhole technology that will fit through the bore of the well (57) may be tested and field proven subject to the resources available. Hence, a space formation system can be further usable to create a market for testing and field proving the new technology, wherein said usable space becomes a tradable product.

The resource cost of a drilling rig (58A of FIG. 18) and even some rig-less operations (58C of FIG. 19) are, generally, such that a usable space for testing and field proving of downhole tools, deployable within the realistic environments provided during the abandonment of wells (57) and with significantly less resource intensive rig-less jointed pipe (58B of FIG. 17) and coiled string (58D of FIG. 20) operations, represents a significant improvement in the development of new technology and hence is marketable. For example, a company owning the usage right for the usable space formed during the abandonment may offer to test and field prove technologies in exchange for a participating ownership in such technologies or for monetary gain.

Given the relatively low capital investments required for rig-less abandonment, a space provision system requires minimalistic resources and may be used to compensate for the lack of competitive forces within the present oligopolistic service provider market, wherein abandonment represents a significant resource cost to liability owners and an opportunity for new technology companies to compete with the goliath service providers who domination the market. Alternatively, the ownership of minimalistic resources and the opportunity to test new technologies with one of said goliath service providers will force competition in a relatively uncompetitive market, when compared to the 1970's and early 1980's. In all cases, the use of fewer resources provides significant benefit to regions and our global society (90) facing peak oil and dramatic liquid hydrocarbon price increases, because said resources may be reallocated to development of the present invention for use within Brownfield (79) and Greenfield (80) developments, which are needed to limit said dramatic liquid hydrocarbon price increases associated with peak oil.

FIGS. 2 to 16 show various diagrammatic elevation views of a subterranean slice through various example wells (57) and strata types applicable to the present invention. As subterranean wells (57 of FIG. 2) have many components, simplified well schematics (e.g. 57 of FIGS. 2A and 3 to 16) are conventionally used to provide focus upon communicated aspects. Hence it is to be understood that a schematic well diagram (e.g. 57 of FIG. 2A) is equivalent to a more detailed well diagram (e.g. 57 of FIG. 2, below the section line A1-A1) and each of the wells described in FIGS. 3 to 16 are similar to FIG. 2, except where noted.

Generally, a well's (57) architecture comprises various cemented (64) and uncemented casing (56A to 56D) and strata (60A to 60M) bores (7). Casings may comprise various sizes, wherein, e.g., (56D) may represent a 7" liner, (56C) a 30" conductor, (56B) a 13⅜" casing and (56A) a 9⅝" production casing, within which an uncemented fluid filled annulus and production conduit (56E) may exist. A space formation system may use various devices within, e.g., the production casing when compressing the production conduit (56E), thus forming debris and potentially containing or covered with engaged radioactive debris, e.g. NORM or LSA scale, wherein the conduit (56E) and other associated apparatuses and debris may be compressed within the uncemented fluid annulus of the production conduit (56A) to form a usable space within the production casing (56A) for testing the present invention.

With regard to new technology (78), like the present invention, conventionally usable within Brownfield (79) and Greenfield (80) developments after being proven, it is critical to understand that said new technology (78) will be subjected to diverse pressure, temperature and the forces of the stratigraphy that are vastly different from one well to the next and which have formed over hundreds of millions of years. Consequently, the art and practice of the well construction and production industry is to rely more upon empirical data that theoretical data give the dangers of exposure to subterranean substances, pressures and temperatures, whereby geothermal water may be as dangerous as explosive hydrocarbons in various instances. Hence, the field testing and proving of new technology in similar conditions to those expected is of critical importance to practitioners. Unfortunately, the common test well for service providers is typically shallow, incomparable and generally discounted by those skilled in the art.

The described space provision system can be usable to test and field prove new technologies, like hydrodynamic bearings (1) and directable hydrodynamic bearing pendulum boring strings (9), tested within the controlled environment of a subterranean well, wherein the lower end has been made relatively safe through said space provision system abandonment to leave room within the well to test new technology in close-to-actual conditions. It is to be understood that the strata below the FIG. 2, FIG. 2A, and FIG. 3 line A1-A1 represents any of the Quaternary to Neogene period epochs, with the strata below line A2-A2 representing any of the Paleogene period Oligocene, Eocene and Paleocene epochs, while strata below A3-A3 represents, e.g., any Cretaceous, Jurassic, Triassic, Permian, Carboniferous or later period comprising late, middle and/or earlier epochs. The strata below lines B-B of FIG. 18, C-C of FIG. 19, and D-D of FIG. 20 may represent any of the lines A1-A1, A2-A2 or A3-A3 geologic period epochs.

Referring now to FIGS. 17 to 21, the Figures illustrate various elevation views of rigs (58) conventionally described as a drilling rig (58A) and rig-less (58B, 58C and 58D) arrangements above example slices through subterranean wells (57) and strata (60). Drilling rigs (58A) require the most resources to operation, with a large derrick (94) and associated hoisting equipment often capable of lifting over a million pounds, with associated large fluid pumping and storage capacity resources. While either coiled or jointed pipe conduit strings may be used on a drilling rig (58A), high strength and torque jointed conduits are generally used. In general, drilling rigs have the most rugged and robust equipment specifications, which may have orders of magnitude difference resource operational costs compared to coiled string and other rig-less arrangements. Coiled tubing rigs (58C), generally termed as "rig-less," even during drilling, require significantly less resources than drilling rigs, but considerably more than, for example, minimalistic jointed string rig-less arrangements (58B) and cable rig-less arrangements (58D). Consequently, when well abandonment and boring string operations use "rig-less" arrangements, said operations require less resources.

Drilling rigs (58A) are generally efficient for quickly boring and constructing a well into various geologic periods and epochs miles and kilometers below the earth's surface; however, such resource usage, generally, exceeds what is required for well abandonment, testing and development of new technology. Hence, using relatively low resource usage rig-less operations is relatively inefficient to, for example, construct a well (57) to 10,000-feet or 3,000 meters, whereas rig-less arrangements (58B, 58C and 58D) are more resource efficient than drilling rigs (58A) if the well is already constructed and the objective is to place a permanent abandonment plug (89) for the subsequent testing and development of new technology within regional subterranean environments similar to those where developed tools will be used. Consequently, compared to other rig-less approaches, the present space provision system may approach and potentially become the lowest resource usage system and method within the industry for abandoning wells and testing downhole tools, thus freeing resources for reallocation to new technology (78), Brownfield (79) and/or Greenfield (80) development.

Referring now to FIGS. 1, 2, 2A, 22, 23, 33, 34, 44 and 45, the Figures depict various space provision system (10) members (10D, 10E, 55, 66) and prior art (51, 52). FIGS. 22 and 23 show isometric views of a prior art shotgun (51) and shotgun shell (52) components, respectively, illustrating a shell (52) with shell casing (52A) placeable in the gun's chamber (51B). Contact of a firing pin with the primer (54) placed within the shell orifice (52B) initiates an explosion of gun powder within the shell, which is comparable to the compressive device (96) within a deployment conduit (56E, 56B or 56C), usable to fire a wad (53, 95A) functioning as a piston (95) to push various bullets, comparable to the severed lower end of a conduit (56E, 56B or 56C, respective to the upper deployment conduit ends) from the gun's barrel (51A), which is comparable to a conduit (56A, 56B or 56C, respective to the deployment conduits) within an uncemented fluid inner bore.

FIGS. 44 and 45 illustrate elevation slices through a subterranean well, showing an example space provision system (10) explosive member compression device (92) arrangement (10D) and a cable member arrangement (10E), respectively. Various patents and patent applications of the present inventor describe further usable space provision system (10) members, e.g. axial compression and/or radial compression plug and/or diaphragm piston compression devices (92) or hydraulic jar and/or explosive compression devices (92) for forming low resource cost usable subterranean spaces for the reallocation of resources that would have been used otherwise for satisfying an abandonment liability instead of developing new technology (78), like the present invention, and developing Brownfields (79) and/or Greenfields (80).

Referring now to FIG. 44, the Figure illustrates an elevation diagrammatic view of a slice through a subterranean well (57) bore (7) showing an explosive piston space provision system (10) member compression device (92) arrangement (10D). The member housing (96) is engagable to a jointed or coiled string of a rig or rig-less arrangement and contains an explosive that may be initiated by a firing head (98) to launch an piston (95) of an expandable type (95B), for example a bladder, diaphragm, or wad variety, which can be usable to compress the severed portion of the deployment conduit (56E, 56B, 56C) within the uncemented fluid annulus of the surrounding conduit (56A, 56B, 56C, respective to the deployment conduit). An orifice or one way-valve (97) can be usable to release trapped fluid below the piston (95B) compression device (92), of a jarring type (92A), as it moves within the containing conduit fluid filled annulus. The deployment conduit (56E, 56B, 56C) may be anchored with a pinning arrangement (55) to allow the explosive to sever said conduit and move it axially downward, relative to its anchored portion that is holding the member housing (96), which was placed with a joint or coiled string deployment string.

FIG. 45 depicts left and right side diagrammatic plan above elevation cross section slices through a subterranean well (57) bore (7). The Figure shows a space provision system (10) compression device (92), of a cable type (92B) arrangement (10E), before activation on the left side and after activation on the right side. The compression device (92B) is shown as deployed via a cable (67) of a conduit buckling (99) type (67AD), which is anchored (102) at its lower end and passes through a plurality of eccentric orifice (100) plates (101) spaced within a compressible uncemented conduit within a containing conduit fluid annulus Tensioning said cable can buckle said uncemented conduit by aligning the orifices (100) with the axis of the tension cable (67AD) and allowing axial compression, relative to the anchor of said buckled (99) conduit and debris formed by the orifice plate engagement with said buckled conduit. A cable compression device (92B) may be combined with, for example, an explosive device (92A) of the present invention and/or axial compression and/or radial compression plug and/or diaphragm piston compression devices (92) or hydraulic jar and/or explosive compression devices (92) of the present inventor.

Referring now to FIG. 33, the Figure shows an isometric view of shock absorbing apparatus (66) of the present inventor usable to place a transmitter within a well bore for measurements about or below components compressed by a space provision system. The transmitter may be engaged within a transmitter housing (66D), which may be placed in contact with casing (e.g. 56A-56D of FIGS. 2 and 2A) through a cover (65C) or the housing (66A). The contact may remain when the sensor is cushioned (66B) from adverse shocks and forces when, for example, compressing well components using space provision system operations.

FIG. 34 illustrates a diagrammatic elevation view of conduit pinning arrangement (55), with only a portion of the well (57) bore (7) elevation radial cross section shown below an upper right hand transverse side view elevation cross section of only the pinning shaft member's (55A, 55B, 55C) diameters, in differing left hand side and right hand pinning shaft configurations, shown in the upper right side. A flexible shaft (55A) and boring bit (55D) may be used to bore through various casing (56) conduits (56A, 56B, 56C) with the flexible shaft (55A), usable as a spine for linked pinning conduit (55C) arrangement (55) that may be combined with securing and/or stiffening partial conduit member (55B) to anchor conduits (55A, 55B and 55C) together. Such pinning arrangements are usable in, e.g., the drilling, milling and space provision operations shown in FIGS. 3 to 7.

FIGS. 2 and 2A show an elevation slice through the well and schematic views, respectively, of a well (57) with a valve tree (62) illustrating a slice through said well's subterranean portions and a wellhead (61) securing casing (56A-56C) cemented (64) below strata level (60), which may be either a ground level or mud line below sea level (63).

The above ground (60) or sea level (63) valve tree (62), as shown, may be adapted for subsea use, wherein the conventional valve tree configuration represents primary (61B) and secondary (61A) master valves usable with the production valve (62C) to flow production through the flow line (62F), as indicated by the arrow (81). If the tree cap (62E) is removed and a rig (e.g. 58D of FIG. 20) is erected above the swab valve (62D), then the master valves (62A, 62B) may be opened to access the production conduit (56D) through the safety valve (65), wherein said safety valve may be operated with a control line (65A). A conventional wellhead (61) generally uses multiple annulus valves (61A, 61B) to access annulus between the various well conduits (56A, 56B, 56C) with larger shallow annuli exposed to normally pressured formations left open or without valves (61C).

The strata (60) accessed by any well (57) bore may be generally classified by mineral and chemical composition, by the texture of the constituent particles and by the processes that formed them, which separate rocks into igneous, sedimentary, and metamorphic. Igneous rocks may comprise, e.g., granite and basalt which are particularly hard to bore through. While granite is often bored within wells, the majority of strata targeted for boring comprise sedimentary rocks formed at or near the earth's surface by deposition of either clastic sediments, organic matter, or chemical precipitates (evaporites), followed by compaction of the particulate matter and cementation during diagenesis. Sedimentary rocks may comprise, for example, mud rocks such as mudstone, shale, claystone, siltstone or sandstones and carbonate rocks such as limestone or dolomite. Metamorphic rocks are formed by subjecting any rock type (including previously formed metamorphic rock) to different temperature and pressure conditions than those in which the original rock was formed, and hence may be prevalent in many well bores.

Referring now to FIG. 3, the Figure illustrates hydrodynamic bearing (1) embodiments (1A to 1D) used after a space providing system (10) arrangement (10H), shown as a compressing device (92) comprising a slideable piston annular blockage bypass straddle (92C) of the present inventor. The compressing device (92) can be used to compress debris (91), for example scale chemically removed and hydraulically jarred into the well and strata, prior to placing an abandonment plug (89) to allow side-tracking of a well, e.g. FIG. 2A, by using a coiled pendulum drill string (67) embodiment (67A), engaged with a wire and/or cable (67AE), which comprises a boring piston (73) embodiment (73A) with a reactive torque tractor (74) that can be a directable boring string (9) embodiment (9A), which can use a motor (17L) to rotate a wireline deployable jointed string (75) embodiment (75G) and a second in-line motor (17) to rotate upper and lower cutting structures (112), usable to bore said side-track (59) embodiment (59A). The hydrodynamic bearing (1) embodiments (1A to 1D) can be placeable, retrievable and operable via said tensionable coiled string (67) and pump pressure through said previously formed bore (7), with fluid pressure applied through and about said conduit boring piston by one or more surface or conduit fluid pumps or motors. A space provision system (10) can be usable to bore a second side-track (59B) after depleting the shown side-track to optionally produce from any marginal production resources found prior to placing a final abandonment plug, to permanently isolate said side-tracks (59A, 59B).

Referring now to FIGS. 4, 5, 6 and 7, FIG. 4 shows a compression device (92) arrangement (92D) and directable hole opening boring string (9) embodiment (9B) using a hydrodynamic bearing (1) embodiment (1E), while cable compressing device (92) arrangements (92E), (92F) and (92G) are shown in FIGS. 5, 6 and 7, respectively.

FIG. 4 illustrates a diagrammatic elevation slice view through the bores and casings of a well, and the Figure depicts a hydrodynamic bearing (1) embodiment (1E) within a compression device (92) arrangement (92D) and hole opening boring (9) embodiment (9B) including a space (10B) and/or space provision system, the bearing comprising a cable (67B) deployable piston string (73) embodiment (73B), using a reactive torque tractor (74) of the present inventor, and operated with a motor (17F) to rotate the pendulum solid shafts of a milling motor (17) embodiment (17A), similar to the milling arrangement (9L) and hydrodynamic bearing (1BM) of FIG. 49 and (9AA) of FIGS. 50 to 53. Tension of the cable (67B) and the tractor (74) provide upward movement in excess of the downward fluid pressure applied to the piston string (73B). Conduits may be pinned (55) in place to prevent adverse lateral movement and to stabilize periphery arced walls (e.g. 4 of FIG. 11A or 49), which can comprise elbowed-screw extendable arms that may be radially extended to cut conduits with an associated knife and/or wheeled cutting structures (112) located on said arms, to assist and stabilize said hole opening boring assembly (9) for milling strata and/or casing. Debris (91) may be compressed into the lower end of said well by said milling of well apparatuses into smaller particles, which may be compressed downward with pressure from above.

Referring now to FIG. 5, the Figure shows a diagrammatic elevation slice view through a well's bores and casings. FIG. 5 depicts a compression device (92) arrangement (92E) that can be usable to form space (10C) for proving a hydrodynamic bearing with a tensionable cable (67C) anchored (102, 103) at both ends, with a pulley (105) at the lower end. The conduit (56E) may be pinned (55) to the surrounding conduit (56A) and tension may be applied to a cable head (77) at the upper anchor (103) using a cable connector (77A) to, for example, engage the cable head, tension the associated cables, part a coupling (106) and buckle the deployment conduit (56E) below said parted coupling using the lower end cable pulley (105) to tension the cable between the upper (103) and lower (102) anchors. Compression may occur either upward or downward depending on the arrangement of the pulley (105) at the upper or lower anchor, respectively, with associated pinning (55) and parting (55) or, for example explosive, chemical or mechanical cutting of the uncemented conduit (56E) being compressed within the surrounding conduits fluid annulus.

FIGS. 6 and 7 show diagrammatic elevation slice views through a well's bores and casings. The Figures depict compression device (92) arrangements (92F, 92G, respectively), which can be usable with a tensionable cable (67D) that can be anchored (102, 103) at both ends, with a pulley (105) at the lower end of a conduit that is also pinned (105) to a surrounding conduit (56A). The cable's tension compression devices (92) can be used for buckling (99) a well apparatus, e.g. the deployment conduit (56E) and any associated engaged apparatus or debris (91) by using the tension of the cable (67D), between the anchors (102, 103) and pulley (105), to urge the buckled conduit and debris, which can be formed by or engaged with said buckled conduit, within an uncemented space below a cemented and/or fluid-filled space (104), with tension applied to the cable head (77) and cable engagement (77A)

The compression device (92) of a cable and explosive type (92F), may comprise a housing (96A) about an explosive charge that, when fired, tensions the cable between the upper (103) and lower (102) anchors to part the lower cut or weakened conduit (106A) and compress the conduit (56A) axially upward. The cable engagement (77A) may be disconnected and the deployment conduit (56E) above the compressed portion between the anchors may be cut, which allows the compressed debris to fall downward, or be pushed by a piston compressing device.

The compressing device (92) of a cable and piston type (92G), may comprise using an inflatable diaphragm type (107) piston (95), with a deployable diameter similar to the explosive housing (96A) shown, to radially burst and axially buckle (99) the deployment conduit (56E) between the anchors (102, 103) by pulling on the pulley (105), with cable engagement (77A) and cable head (77), with the cable (67D), thus applying buckling tension between said anchors.

Referring now to FIGS. 8-10, 18, 19 and 35-37, the Figures illustrate various hydrodynamic bearing (1) embodiments (1F-1Q) that can be usable with boring arrangements for casing boring and placement with dual fluid gradient management pressure strings and chamber junctions of the present inventor. The hydrodynamic bearing (1) embodiments (1F-1Q) can be further usable with a drilling rig (58A) by using jointed strings (67G, 67J and 67K) or coiled string rigs (58C), wherein small scale empirical testing may be carried out with, for example, coiled tubing rigs (58C) by using a coiled string (67F), deployable from drum or spool (127), and space provision system. After forming space with a compression device (92) and placing one or more abandonment plugs (89), empirical testing of a chamber junction's (119) bore selector (121) access of an exit bore (121) can be carried out using a side-track (59C), wherein managed pressure slurry passageway tools (117, 118) with hydrodynamic bearings (1BP, 1BQ) may also be scaled and tested, prior to using said technologies with a drilling rig (58A) using jointed string (67G, 67J and 67K).

FIG. 8 depicts a diagrammatic elevation view of coiled string boring piston (73) embodiment (73C) or a jointed directable boring string (9) embodiment (9D) using hydrodynamic bearing (1) embodiments (1F-1J) to form a dual string arrangement, shown within a slice through a well (57) and strata (60), with a wellhead (61) supporting casing (55A, 56B, 56C) and annulus valve (61A, 61B, 61C). The single drill string (67G) may be either a jointed string for a drill rig (58A of FIG. 18) or a coiled string for a coiled tubing rig (58C of FIG. 19), and the single drill string (67G) can support an inner (67H) and an outer dual string, above a second single drill string (67L), wherein mud pulses (68) may be passed through the shaft's inner bore to the pulse actuated directable pendulum assembly (9D) with a lower motor (17G) driven cutting structures (112), which can be operated with an upper end pump (18B) usable to prevent clogging of the annular passageway with boring debris, which can cause pack-off and fracturing of the formation if pumping pressure is not lowered immediately upon encountering said said-pack-off. The inner drill string (67H) is shown engaged with housing (14B) to form a motor or pump (18A). If the upper string (67G) is a non-rotatable coiled string, an additional motor is required above the intermediate hole opening cutting structures and the additional motor can replace the pump (18B), wherein either the pump or motor may comprise a hydrodynamic bearing (1G). Additional hydrodynamic bearings (1F) are included in the outer jointed string to aid the passage of boring debris and fluid so as to further reduce the chance of packing-off and fracturing the formation. Directing the pendulum string (9D) may use the hydrodynamic bearing (1H) and a pivotal hydrodynamic bearing (1J) associated with the lower cutting structure.

Referring now to FIG. 9, the Figure shows a diagrammatic elevation view of hydrodynamic bearing (1) embodiments (1K-1O) within a coiled string (67M) boring piston (73) embodiment (73D), similar but of a smaller effective diameter than (73C) of FIG. 8, or a jointed directable boring string (9) embodiment (9E) that is also similar but of a smaller effective diameter than (9D) of FIG. 8, and wherein hydrodynamic bearings and other apparatuses are similarly of smaller diameter, for example (1F) has a larger diameter than (1K), but serves the same function in a similar manner. Similarly, motors (17H) or pumps (18C, 18D) function in a similar manner as those shown in FIG. 8. Accordingly, the boring of a well may progress from FIG. 8 to FIG. 9, if such a design is incorporated from the beginning, and wherein the empirical data that is obtained from optional testing of such new technology (78), by using a space provision system, which provides practitioners with realistic testing results so as to provide the confidence to move from a more resource intensive drilling rig (58A) to, for example, a coiled tubing rig (58C).

FIG. 10 illustrates a casing conduit string (67K) provided with hydrodynamic bearing (1) embodiments (1P), which can be usable to assist circulation and reduce the propensity for pack-off by using the bearing as a pump (18E) housing (14C), within which the conduit (67) may be rotated when, for example, circulating and rotating the casing in the hole during running or casing drilling operations.

Referring now to FIG. 18, the Figure depicts an elevation view with a removed slice through strata and the well, showing a rig (58) of a drilling nature (58A) with a derrick (94), fluid or mud pits (123), pumps (124), tubular string (67E), motor (72B), and a control room, conventionally called a dog house (125). The well comprises a Greenfield (80) development using a chamber junction (119) and simultaneous flow string chamber junction (122) new technology of the present inventor, wherein said technology is particularly useful for fracturing operations, for example shale gas fracturing.

FIG. 19 shows an elevation view of a slice through a well and strata, illustrating a hydrodynamic bearing (1) embodiment (1Q) usable as a motor (17) embodiment (17I) on a boring string (9) embodiment (9C), which can be operable with a coiled string (67F) coiled tubing rig (58C), with an injector head (126) and derrick (94), to perform a side-track (59C) exit bore (120) from a whipstock bore selector (121), above an abandonment plug (89) on a Brownfield (79) well.

Referring now to FIGS. 35 and 36, the Figures illustrate elevation views of managed pressure drilling upper (117) and lower (118) slurry passageway tools, of the present inventor, with upper and lower rotary connections adaptable for piston pendulum arrangements (73) and inclusion of hydrodynamic bearings (1BP, 1BQ), wherein fluid circulation may occur through a plurality of passageways within the strings (67N) and (67O).

Referring now to FIG. 37, the Figure shows an isometric section view through the well and strata, depicting apparatus of the present inventor that comprise a chamber junction (119), from which exit bores (120) may be bored, wherein the bore selecting feature (121 of FIG. 19) and chamber junction of FIGS. 38 and 39 may comprise new technology (78), which can be tested in, e.g., FIG. 19 with a space provision system to provide a plurality of bores for testing hydrodynamic bearing embodiments.

FIGS. 38 and 39 show a plan view with line E-E and a cross section elevation through line E-E, respectively. The Figures depict a simultaneous flow chamber junction (122) that can be usable as a dual conduit, for example (56E) and (56A), wherein this new technology (78) of the present inventor may be tested in, e.g., a multi-flow arrangement of a bore selector and removable whipstock (128) of FIGS. 11 and 11A side-track (59D), using a space provision system (10) arrangement (10F) to provide a plurality of bores for testing hydrodynamic bearing embodiments.

FIGS. 11, 11A, 12, 13, 20, 21, 46 and 106 illustrate cable compatible operations where the reduction of friction and vibration provided by hydrodynamic embodiments are particularly useful.

Referring now to FIGS. 11 and 11A, the Figures depict an elevation cross section through the well and strata, with line F and an associated magnified detail view within line F, respectively. The Figures show a pendulum piston assembly (73) embodiment (73E) with housing (14D, 14F), tractor

(74) and hydrodynamic bearing (1) embodiments (1AF) comprising a motor (17) embodiment (17J), and a hydrodynamic bearing (1) embodiment (1AG) comprising arced walls (4G, 4H) and a fluid pump (18) embodiment (18F) with a pivotal hydrodynamic bearing (1) embodiment (1AU) above a cutting structure (112), similar to FIG. 106 hydrodynamic bearing (1BL). The jointed conduit pendulum boring string (9) embodiment (9F) forms part of the piston (73E), which can be driven by a motor (17) embodiment (17K) with a tractor (74), suspendable from a cable head (77). Axial force (16) can be applied to the pendulum string (73E) by pump pressure force (73E) at the top of the cable deployable motor (17K). The reactive torque tractors (74) may also be modified with fluid bearing (1) embodiments (1AS), for example the motor (17C) of hydrodynamic bearing (1AP) of FIG. 108.

To facilitate the side-track (59) embodiment (59D) using upper and lower tubular strings (67P, 67Q), an abandonment plug (89) was placed after a space provision system (10) arrangement (10F), involving the compression of debris (91), to form a usable space for said plug (89) and the side-track (59D) whipstock (129), wherein the arrangement is usable for new technology (78) empirical testing.

Referring now to FIG. 12 and the left side of FIG. 13, the Figures illustrate elevation views of a well before and after, respectively, using a space provision system (10) arrangement (10G) for compressing apparatuses and debris (91) into the lower well portion, and placing an abandonment plug (89), to isolate the well's lower end so as to allow the proving of new technology in a Brownfield (79).

FIG. 13 depicts elevation views of left and right side wells in a Brownfield (79) development where a space provision system (10) arrangement (10G) was used on the left hand well, which was, for example, watered out or depleted, to empirically measure and test a new technology (78) pendulum boring string (9) embodiment (9G), forming part of a cable (67T) deployable piston pendulum boring string (73) embodiment (73H), by using a motorized fluid bearing (1) embodiment (1V) to drive coiled string deployable jointed conduits (67U) with a pumping hydrodynamic bearing (1) embodiment (1X), which is usable to assist in hole cleaning of boring debris from a lower end steerable hydrodynamic bearing (1) embodiment (1Y) with a cutting structure (112).

As cable (67) rotary drilling operations represent new technology (78) that is presently without empirical data, small tolerances for fluid circulation (129) and tool rotation, and for operating anti-rotation devices, fluid motors (17) and pumps (18) to bore with a cutting structure (112), may be obtained with a space provision system (10). The space provision system can be formed from an abandoned well, with minimum resources, and represents a significantly lower risk opportunity to improve, e.g., a Brownfield (79), with the development of rotary cable tool boring, to, e.g., facilitate wishbone side tracts, using the chamber junction (122 of FIGS. 38 and 39) on the FIG. 13 right side well for simultaneous flow stream wells, which can be used, e.g., in the fracturing of shale gas deposits, e.g., using conduit string (67W). The abandonment (78) of the example watered out shale gas well and subsequent side-track (59I) benefits are two fold, in that production may be gained from the side-track and/or empirical results for designing the new well on the right side of FIG. 13, to dramatically increase fracturing about a well bore, thus substantially reducing required resources to increase gas production from another similar well.

Using circulation from a sliding sleeve (130) or a perforation for fluid circulation (129) allows the jointed boring assembly (9G) and pendulum piston assembly (73H), with various hydrodynamic bearings (1) embodiments (1V, 1W, 1X, 1Y, 1Z), to be usable to minimize friction, shock and vibrational issues of boring while suspended from a cable (67T) within the tight tolerance of such small diameter applications. Empirical data may be obtained during a space provision system (10G) abandonment (89) and side-track (59I) by using only the necessary minimum resources to offset research costs so as to provide the necessary data and practical confidence, based upon operations within similar geologic, pressure and temperature conditions.

With the information learned in the left side well, the right hand well may be designed for a crossover (132) and cable pass through plug (133), similar to FIGS. 40 to 43, with a chamber junction (122) and a bore selector (128) placed within the well prior to using a jointed boring assembly (9G) and pendulum piston assembly (73I), with various hydrodynamic bearings (1V, 1W, 1X, 1Y, 1Z) to drill fishbone side-tracks (59E), (59G), (59H), and (59F) from a single main bore, to significantly increase the fracking efficiency, and to consequently increase gas production and reduce the required resources, so as to allow the reallocation of otherwise used resources to other new technology, Brownfield, Greenfield developments.

Referring now to FIG. 20, the Figure shows an elevation view of a slice through the well and strata, showing a cable rig (58D) arrangement using a coiled string (67) cable (67S) through a lubricator (130), a blow-out preventer (131), a wellhead (61) and casing (56A, 56B, 56C, 56D) to deploy a pendulum boring piston (73) embodiment (73G), with a motor (17L) and jointed directable pendulum string (9) embodiment (9H) having a hydrodynamic bearing (1) embodiment (1U) that can be usable to reduce the friction, shock and vibration associated with cable rotary tool boring.

FIG. 21 illustrates a schematic of a mud pit (123) arrangement usable with a coiled string arrangement, for example (58D) of FIG. 20 or (58C) of FIG. 19, wherein circulated fluid is returned in a pressure controlled manner and may be run through a separator (132A) to remove hydrocarbons or gases (133A), disposing of debris (91) and returning circulated fluid to a mud pit (123) or closed tank system for pumping (124) back to the boring operations. Underbalanced drilling may be accomplished in this manner using rig-less operations, to further improve both penetration rates of boring and productivity from subterranean production resources, providing another exemplary opportunity for reducing resource costs or improving production.

Referring now to FIG. 46, the Figure depicts a diagrammatic elevation cross section slice through a well bore and strata showing a Greenfield (80) application of new technology (79), using a jointed pendulum boring string (9) embodiment (9I), which is part of a piston boring assembly (73) embodiment (73F), and using a motor (17) embodiment (17M) to operate a cutting structure (112) boring bit hydrodynamic bearing (1) embodiment (1T) with arced wall (4) embodiments (4I) at its lower end.

The bearing (1T) is similar to (1BL) of FIG. 106, wherein the bit face may be oriented relative to a pivot (15B) point (15) formed by the conical inner nature of a steerable strata boring bit. The pendulum nature of the boring string (9I) about a fulcrum (15A) point (15) is controllable with radially extendable and retractable arced wall (4) stabilizer blades (4J), wherein the extent of retraction and extension may be controlled by a control system (39) with an electric line wet connect interface (42) from an electrical cable (67R) string (67) to exert lateral (16B) forces (16), with said electric line (67R) control system (39) actuated arced (4)

stabilizer blades (4J), which can be usable to alter the nature of the pendulum string (90 when axial (16A) force (16) is exerted by pump pressure above the piston string (73F) to push-the-bit. The wet connect electric line interface (42) was pumped down through inner passageway (31) of the rotor of the pump (18) embodiment (18G) of the hydrodynamic bearing (1) embodiment (1R) with a substantially stationary fixed arched blade (4) around which fluid may be pumped to assist circulation (129).

The conduit (67) embodiment (67R) comprising the various components of the bottom hole assembly (BHA) shown in FIG. 46, represents a running tool (76 of FIGS. 114-115) cable deployable conduit similar to conduit component part arrangement embodiments (75A-75) of FIGS. 116-122, wherein various conduits may have integral fluid hydrodynamic fluid bearings (1), which can be further usable with bearing embodiment (1R), to assist in, e.g., the removal of boring debris through pumping. Any hydrodynamic fluid bearing (1) can be applicable to the jointed boring (91) cable piston (73F) assembly to lubricate the BHA during boring and dampen shocks and vibrations associated with stick-slip, bit whirl and the harmonic resonances at certain rotary speeds relative to different formations, which may only be proven with empirical data, wherein the resource cost of obtaining relevant empirical data is relatively low using space provision system (10) arrangements.

FIG. 106 shows cross sectional through the strata and well, and the Figure illustrates a hydrodynamic bearing (1) embodiment (1BL) usable as a combined journal (69), thrust (70) and pivot (71) bearing using the fluid intake (32) past a hydrodynamic profile (3AA) of a housing (14P) about a shaft (2) and outer wall (5). The arced walls (4P) allow the bit face to be oriented over a pivot point (15B). relative to its fulcrum point (15A), forming a new technology (78) bearing pump (18) embodiment (18T) that can be usable to assist with boring debris removal and circulation of a jointed pendulum boring string (9Z) deployed from a jointed or coiled string arrangement.

Referring now to FIG. 13 (right hand side well) and 40-43, the Figures illustrate a managed pressure crossover (132) well apparatus, of the present inventor, which can be usable for simultaneous flow of fluids during boring or production, wherein a plurality of safety valves and multiple barriers can be operable with, e.g., an orifice plug (133) to provide the ability to shut in the well on both flow streams.

FIGS. 40 and 41 depict a plan view with line G-G and a cross section view along line G-G, respectively, while lines H and I of FIG. 41 are associated with magnified detail views within lines H and I of FIGS. 42 and 43, respectively. The manage pressure crossover (132), of the present inventor, has a plurality of safety valves (65) and associated valve control lines (65B) to control simultaneous flows comprising, e.g., axially downward (135) and axially upward (136) between an inner wall (134) and outer wall (56E) of the conduit. Between the upper (138) and lower (137) crossover passageways, an orifice plug (133) may be fitted in an associated receptacle for passage of a cable during boring operations to keep the passageways separate, so as to circulate (129) the boring fluid downward (135) onto the piston assembly and return it upward (136).

Referring now to FIGS. 16, 24, 25, 28, 46, 47 and 48, the Figures show various pendulum boring strings (67Z, 67AA, 67AB, 67AC, 67R, 67X, 67Y, respectively), whereby virtually all conventional directional strings are based upon a pendulum boring arrangement. For example a string embodiment (9M) may be converted into a packed straight hole string by placing additional axial disposed arced walls (4, e.g. fixed or variable stabilizer blades) above the two, shown in FIG. 16. For directable strings that are not packed assemblies, i.e. pendulum assemblies, boring may be controlled with axial (16A) and lateral (16B) forces (16) applied to the string (67) relative to a fulcrum (15A) or pivot (15B) reaction point (15) on the wall (7) of the bore. Push the bit directable strings (9I, 9K) and point the bit directable strings (9J, 9K) relate to using lateral forces (16B) applicable to an arched wall (4) and bending forces (16C) about the shaft (2) which may be rotated from surface (111) or using a string motor (111A) to bore through strata (60) by rotating an associated cutting structure (112).

In practice, those skilled in the art may prefer the rotating stability of a bent housing and PDM arrangement (67AA), however said skilled persons generally also prefer the controllability of a rotary steerable (67AB). The combination of a slideable PDM arrangement (67AA) and a rotary steerable is often practiced, but generally does not satisfy the needs for a compact design or, for example, may not be compatible with logging while drilling tools or transmittal of mud pulses through said PDM to control the rotary steerable (67AB). Wireline controllable (67R) push-the-bit, point-the-bit (67X), and combinations of point-the-bit and push-the-bit (67K) embodiments, of the present invention, provide significant improvement over PDM arrangements (67AA) and various other rotary steerable arrangements, including, e.g., the illustrated point-the-bit arrangement (67AB), because of the versatility provided by the jointed or coiled string deployments with compact BHA designs and shock and vibration (113) dampening (114) hydrodynamic bearings (1), which are usable with a control system (39) to apply lateral force (16A) or shaft (2) bending (16C).

Rotational shocks caused by, e.g., bit whirl and/or stick-slip and harmonic vibrations (113) caused by, e.g., the effective rotational diameter (23 of FIG. 59) of under-gauged periphery arced walls (4) or stabilizer blades (4), are often unacceptable to directable boring apparatuses (9), e.g. (67AC) of FIG. 28, and may be dampened (114) to an acceptable level (115) using the shearing of frictional engagements of a hydrodynamic bearing (1).

Referring now to FIGS. 46, 47 and 48, the Figures depict subterranean hydrodynamic bearing (1) embodiments (1S, 1AA and 1AB, respectively), which can be usable for directable boring apparatus (9) embodiments (9I, 9J, 9K, respectively) that are deployable with coiled (9I, 9K) and jointed drill pipe (9J, 9K) strings. Directable pendulum boring strings (67R, 67X, 67Y, respectively) of the present invention may be controlled with periphery arced walls (4), conventionally referred to as stabilizer blades, that may, e.g., be push-the-bit (9I, 9K) by selectively and radially extending at least a portion or associated component part of said arced walls (4) and/or point-the-bit (9J, 9K) which bends a rotating (111, 111A) shaft (2) relative to a substantially stationary arced wall (4).

FIG. 24 depicts an elevation diagrammatic view describing a positive displacement mud motor (108, PDM) and bent housing (109) string (67) arrangement (67AA), which provides, e.g., 1-3 degrees of axial offset (110) for use with a pendulum fulcrum (15A), formed by the bent housing during sliding, wherein the only rotating portion is the portion below the PDM, and wherein bit face changes are held by maintaining a stationary pendulum string on the pivot point (15B) during said sliding.

FIGS. 25 and 28 depict elevation diagrammatic views describing prior art point-the-bit (67AB, 67AC, respectively) string (67) arrangements, which are highly susceptible to the shocks of, e.g., bit whirl, stick-slip and vibration (113 of FIGS. 16 and 28). Hence, they are continually monitored to the point that it is often the case that drilling must be significantly slowed or stopped, completely, lest the rotary steerable (67AB, 67AC) may be damaged beyond repair. Additional, rotary steerables, particularly point-the-bit types, use stationary arced wall (4) stabilizers that block the removal of debris from the bore hole, wherein inclusion of a hydrodynamic bearing, of the present invention, into said prior art and conventional stationary arced wall (4) stabilizer boring strings may be used to reduce such adverse shocks, vibration and prevent pack-off by improving fluid circulation (129) with the intrinsic slurry pump or motor formable using the methods of the present invention.

Referring now to prior art FIGS. 26 to 27; FIGS. 49 to 53 showing subterranean hydrodynamic bearing (1) embodiments (1AC, 1BM) usable in milling (9) embodiment (9AA) assembly and components; FIGS. 54 to 106 and FIGS. 107 to 113 illustrating various example drilling and milling assembly (9) hydrodynamic bearing (1) embodiments and hydrodynamic bearing motor (17) embodiments, respectively; and FIGS. 114 to 122 showing coiled string deployable drill string conduit (75) embodiments that can be usable for drill pipe, drill collars or other conduit component parts within, e.g., a cable or coiled tubing drill strings and those of FIGS. 123 to 133 illustrating a directable subterranean rotary hydrodynamic bearing stabilizer embodiment for directional drilling, wherein said embodiments are also usable to, e.g., rotate, lubricate and dampen rotational shocks and vibrations associated with bearing and urging drilling or milling (9) strings (67) within subterranean strata.

Fluid usable within hydrodynamic bearings may be taken from an internal reservoir, for example a lubricating oil reservoir, or from a flow stream about the bearing (1). Various conventional single wall conduit shafts (2) supplying fluid through an internal passageway (31) with a fluid flow stream returned external to said conventional single wall conduits, or through various dual or multiwall conduits of the present inventor, for example those of FIGS. 35 and 36, which may be circulated in a variety of ways described in the cited references.

Hydrodynamic bearings (1) bear (or support) a shaft's (2) rotation (111, 111A) with a wall (7) of a bore, wherein said bore's wall may be the inner wall of a well (57) conduit (56A, 56B, 56C, 56D, 56E) or a bore through strata (60). Hydrodynamic bearings may be of a motor (17) or pump (18) type, wherein a hydrodynamic profile (3) is rotated with the associated rotation (111, 111A) of said shaft (2), adjacent to an inner wall (6), to displace fluid between walls (3, 4, 5, 6, 7, 11, 13) of the subterranean bore (7) bearing (1).

Arced walls (4), radially extending from a housing, can comprise the partial circumference of a larger rotatable effective diameter (23) to form stabilizer blades (4) axially and radially disposed about a housing (14) wall (5), which is conventionally less than or under-gauged, relative to the bore wall's (7) diameter, to allow passage and rotation. However, the under-gauge nature of conventional stabilizing arced walls (4) provide a poor bearing capability under rotation and are susceptible to friction, shocks and vibration when rotated (111, 111A) because they are under-gauged. Consequently a hydrodynamic bearing may use at least one rotatable hydrodynamic profile (3) within the inner wall (6) or an optional bearing sleeve (12) interfacing with the inner wall (13) of the housing to pump pressurized (8) fluid between various walls (3, 4, 5, 6, 7, 11, 13) to improve the stabilization capability of the shaft bearing (1), so as to dampen shocks and vibration (113 of FIGS. 16 and 28).

An optional sleeve bearing (12) and/or helical wrap bearings (30) may have an internal wall (6) and an outer wall (11) within another inner wall (13), which can be usable to balance eccentric rotation of a profile (3), improve pumping capabilities, increase fluid pressures between walls, and the associated fluid pressure against (8) the bore wall (7), wherein said pressure is usable to, at least partially, fill the under-gauged arced wall bearing the rotating shaft within a wall of the subterranean bore, and wherein the effective rotating diameter (23) is more efficient with said pressurised (8) fluid cushion.

Optional sleeve bearings (12), helical wrap bearings (30) and/or other components, including portions of the shaft (2), may be comprised of any flexible material, which can be usable to reduce friction, shocks and vibrations associated with rotation. Various embodiments are formable with shaft journal and thrust races, helical races and cavities, cylindrical bearings, taper cylindrical bearings, balls bearings, bead-like ball bearings, sometimes referred to as spherical bearings, reinforcing flexible strands and/or chain-links usable to control and/or reinforce various rotating component parts associated with a hydrodynamic bearing's (1) effective rotating diameter (23).

Various boring (9) embodiments may use various hydrodynamic bearing embodiments (1), depending on the stratigraphic environment of use and the boring needs, wherein efficiency and matching of bearings against subsurface conditions may be further improved using space provision system arrangements (10) for proving operation prior to being subjected to the ultimately intended geologic periods and epochs to be bored or otherwise used.

Directable pendulum boring strings (9), using hydrodynamic bearings (1) to better utilise or adjust bearing points (15) and string forces (16), can include using said bearing as a motor (17) or pump (18) to improve boring efficiency through the reduction of friction, shocks and vibration, with the shearable fluid frictional engagements between various walls (3, 4, 5, 6, 7, 11, 13).

Hydrodynamic bearing embodiments (1) may have substantially stationary housings (14) and associated arced walls (4) or rotatable housings (14) and arced walls (4) depending on inclusion and configuration of a control system (39), which can be interfaced with, e.g., electric line (42) or fluid pulse (68) control interfaces (43). Any form of electric line interface (42) or mud pulse system (43) may be used with any control system (39) placeable within a hydrodynamic bearing (1).

Directable boring assemblies (9), with substantially stationary housings may selectively control effective rotating diameter (23) and fulcrum (15A) and/or pivot (15B) bending points (15) using axially and laterally movable arced walls (4), with pistons (44) controlled (39) with electrical actuation systems and powered by electric line, or in-line fluid turbines for example, and/or powered by fluid pressure that is generated by various hydrodynamic profiles (3, 6, 11, 13) displacing fluid directed by any downhole one-way (35) or plurality-of-way (36), for example 3 way, valves.

Directable boring assemblies (9), with substantially rotating housings and axially and/or transversely movable arced walls, may be controlled by substantially stationary helical wrap bearings (30), by, for example, being rotated in an opposite direction to a shaft's (2) and arced wall (4) rotation, to provide pressure to various rotated valves (35, 36) and pistons (44), while preventing fluid pressure communication to others to, in use, pressure said valve (35, 36), pistons (44) and arched walls (4) in a desired orientation.

For both substantially stationary and substantially rotating housings (14) and arced walls (4), any control system (39) may be used to vary pressure (8) exerted through various intake (32), pressure discharge (33) orifices, pressure discharges (34) and/or various valves (35, 36) and springs (45), e.g. in real time using wireline (42) or mud-pulse (43) interfaces to selectively interface with and direct said directable boring assemblies (9).

Various hydrodynamic profiles may be used to generate power for a control system and/or pressurize shearable fluid lubricant pumping (18) and/or motor (17) arrangements using turbines or lobes (25) and stator cavities (26) or impellors (24), or cylindrical or ball bearings (19) and bearing races (22) to form the associated rotor and stator (27), or impellor and wall (28), or ball bearing (29) motor (17) or pump (17) arrangements.

Any downhole drill string component, including electrical motor (37), electric generator (41), gear (38), piston (44), valve (35, 36), battery, control systems (39), supplemental journal (69), thrust (70) or pivotal (71, spherical) bearings and/or interfaces (42, 43) may be present within any embodiment of the present invention for controlling a hydrodynamic bearing (1) and/or directable boring string (9). Additionally, any form of fastener (46), seal (47), sealing bearings (48), or service break covers (49) are usable to repair and/or replace said downhole components.

Referring now to FIGS. 14, 15 and 47, the Figures depict elevation views of a cross section through strata and a breakout view in FIGS. 14 and 15 showing the internals, of a point-the-bit rotary steerable and directable pendulum (9) embodiment (9J), with a hydrodynamic bearing (1) embodiment (1AA) functioning as a pump (18). The pump embodiment (18H) shown is usable to pump and slurrify debris into lost circulation material sized particles for embedding within fractures (139) and filter cake (140), as shown in FIG. 14, to inhibit the initiation and propagation of fractures. FIG. 47 shows the string (9J) and directable fluid bearing (1AT) outwith the subterranean strata, while FIG. 15 illustrates the assembly (9J) in a drilling straight configuration, while FIG. 14 shows the shaft (2) with fluid passageway (31) and a portion of the pendulum assembly (9J) deflected by, for example, a helical wrap bearing (30) at the fulcrum (15A) point to orient the bit face at the pivot (15B) point. The arrangement provides significant advantage over Halliburton rotary steerable system Patent Application US2007/0235227 A1 published 11 Oct. 2007, which is included herein in its entirety by reference and also described by prior art FIG. 28, because in practice, within the field experience of the present inventor, said apparatus exhibits a tendency to pack-off around its large non-rotating stabilizer, thus causing strata fracturing (139 of FIG. 15) and mud losses in various geologic formations, where drilling parameters must be adjusted to suboptimal levels to accommodate said fracturing. Additionally, the Halliburton rotary system often exhibits adverse stick slip, bit whirl and harmonic resonance vibration tendencies in various formations during boring, wherein said pack-off tendencies and adverse bit stick-slip, whirl and harmonic vibration may be significantly reduced with the inclusion of a hydrodynamic bearing of the present invention.

FIGS. 26, 27 and 49 illustrate plan diagrammatic views of: prior art rotor node (25) and stator cavity (26) combinations (27); prior art rotor rotation within a stator cavity; and a motor (17) embodiment (17B); respectively, wherein rotor cavity rotation about a helical nodal shaft forms the motor (17). FIG. 26 describes the relation of N-1 one nodes within an N cavity stator, where N is the number of helical cavities. FIG. 27, describes that when a rotor rotates within a stator cavity, the centre of the rotor and associated nodes form an effective rotating diameter, wherein the rotor axis rotates around the stator axis. The milling boring string (9) embodiment (9L) of a motor (17B) hydrodynamic bearing embodiment (1AC) of FIG. 49 shows that a mill's cutting structures (112), which define a profile (4A), may be rotated (111A) around a shaft (2) to perform, for example, hole opening boring operations within a bore (7) by pumping fluid between the nodal profile (3, 3A) and the rotating cavity profile (6, 6A). For multi-milling arm arrangements, similar to that shown in FIG. 4, more than one bearing (1AC) may be rotated about a central shaft using the arrangement of FIGS. 50 to 53.

Referring now to FIG. 50, the Figure shows an elevation cross section slice view of a milling string (9AA of FIGS. 51 to 53) motor (17E) arrangement, which can pivotally deflect to engage successive larger bores (7), at ever increasing effective rotating diameters (23A), to mill conduits (56E, 56D, 56A, 57B, 56C) within the strata (60).

FIGS. 51, 52 and 53 illustrate a plan view with line AA-AA, an elevation cross section along line AA-AA, and an isometric section projection along line AA-AA, respectively. The Figures show a fluid bearing (1) embodiment (1BM) with and outer wall (11AE) bearing sleeve (12AD) journal (69) bearing, with an upper end pivotal (71) bearing, wherein fluid enters (32) between profiles (3AB) and (6AG) to rotate the sleeve (12) about the shaft (2) forming a motor (17) embodiment (17E).

Figure 30:
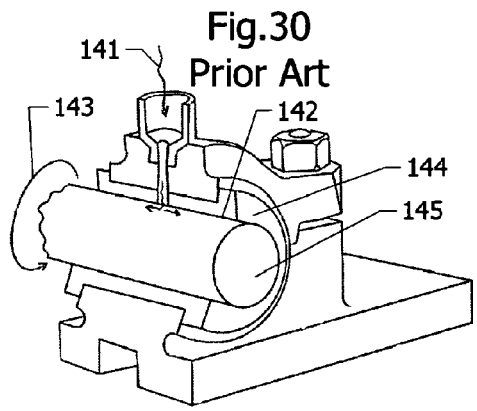
Figure 31:
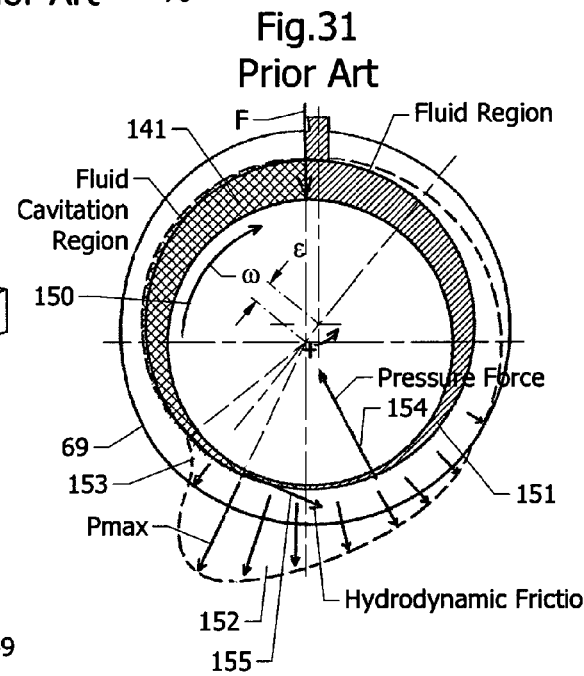
Figure 32:
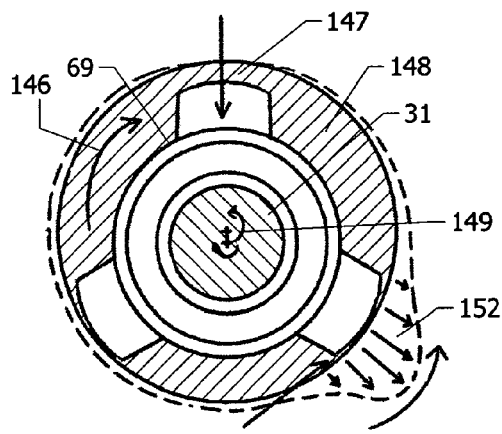

Referring now to FIGS. 29, 30, 31 and 32, wherein FIG. 29 shows isometric views of conventional bicycle thrust (19B), ball journal (19C), caged ball bearing thrust (19C) and tapered roller journal and thrust (19D, 19E) type bearings, with associated bearing races (22A, 22B, 22C 22D, respectively) and with breakouts showing bearings (19) and races (22). FIG. 30 illustrates an isometric view of a conventional hydrodynamic bearing housing (144) and shaft (145), with stable rotation (143) and a fluid oil flow (141) within tight tolerances (142), and FIG. 31 depicts a cross section slice of a diagram showing how a conventional hydrodynamic journal bearing (69) functions. FIG. 32 shows the conventional drilling shaft stabilizer depicted as a crude journal (69) fluid (148) bearing with large tolerances (147) and relatively unstable rotation (146) of the stabilizer axis around the axis of the bore, which may often lead to adverse friction, shocks and vibrations within a boring string.

Referring now to FIGS. 31 and 32, the Figures show transverse axis cross sections, wherein FIG. 31 is an exaggerated representation, for the purpose of explanation, reproduced from a presentation by Dr. Dmitri Kopeliovich, describing a conventional hydrodynamic (1) journal bearing (69), e.g. those used within engines, which are operated with hydrodynamic lubrication, wherein the bearing surface is separated from the journal surface by a lubricant film generated by the journal bearing rotation.

Hydrodynamic journal bearing rotation ($\omega$) causes pumping of the lubricant (141), which may for example be oil, that flows around the bearing in the rotation direction (150). Concentric rotation relative to the bearing occurs with no contact force applied to the journal, wherein radial force (F) applied to the journal displaces it from concentric rotation to form a converging gap between the bearing and journal surfaces.

Conventional pumping action of the journal forces the oil to squeeze through the wedge shaped gap (151), of the eccentric (⌀) journal within the bearing, generating a pressure (152), which increases to a maximum (Pmax) prior to reaching the fluid suction side of the bearing. On the suction side of the eccentric journal pump the pressure falls to the cavitation pressure (153).

The pumping pressure creates a supporting force (154) separating the journal from the bearing surface, wherein the force of fluid pressure and the hydrodynamic friction force (155) counterbalance the external load placed on the bearing, with the final position (⊘) determined by the equilibrium between the forces.

In the hydrodynamic regime, the journal may eccentrically rotate within the bearing at the boundary, wherein removal of the hydrodynamic pressure force through rotation leaves the fluid pressure force and applied force, thus causing journal eccentric rotation about the bearing axis opposite to axial journal rotation.

For conventional oil fluid bearings, various solutions to theoretical equations may be used to describe the fluid pressure distribution and fluid bearing of a hydrodynamic fluid bearing as a function of journal speed, bearing geometry, fluid clearance and fluid viscosity; however, for the subterranean drill string examples, comprising a borehole bearing with significantly under gauged (147) stabilizer journal bearings within a fluid slurry comprising drilling mud and rock debris, such equations are orders-of-magnitude approximations at best.

The fundamental purpose of the journal and/or thrust portion of a bearing is to reduce friction associated with rotating and/or thrusting a rotating shaft or conduit engagement. For drill strings the stabilizer journal within the bore hole bearing forms a crude hydrodynamic fluid bearing, wherein the coefficient of friction associated with rotation and the associated fluid slurry used to remove rock debris from the borehole may be reduced by improving the fluid dynamics of a stabilizer bearing and homogenizing the fluid slurry to improve its rheological fluid flow properties so as to improve bearing rotation, the cleaning of the bore hole and pressure strengthening of the strata wall of the borehole.

Figure 54:
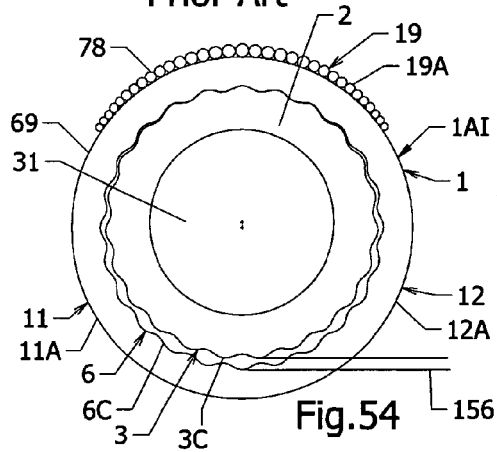

Referring now to FIG. 54, the Figure illustrates a transverse axis cross section of a journal (69) type hydrodynamic (1) embodiment (1AI) with a sleeve (12A) rotating eccentrically around a conduit (31) shaft (2), wherein nodes and cavities of the profiles cause a gap (156) between profiles (3C and 6C) and associated axial centres. The gap, associated with the axial offset of the outer wall (11A), may be filled with gradated ball bearings (19A) to balance the eccentric rotation within a housing placed concentrically to the rotated shaft, in a similar manner to a helical wrap bearing (e.g. 30 of FIG. 99).

Figure 55:
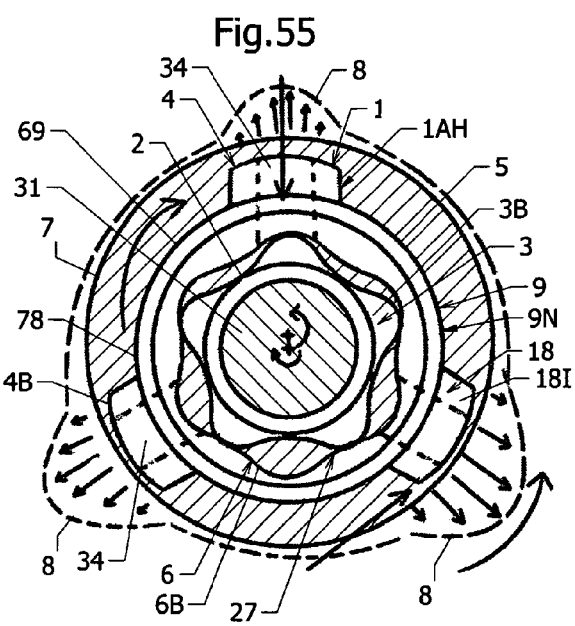

FIG. 55 depicts a transverse axis cross section journal (69) hydrodynamic bearing (1) embodiment (1AH) with a rotor stator pump (18) embodiment (18I) that jets a separating cushion fluid pressure (8) through discharge ports between an arced wall (4) embodiment (4B) and the bore wall (7), wherein the profile (3B) is rotatable relative to the associated profile (6B) to pump (18I) a pressurized (8) shearable fluid cushion separation from the subterranean bore wall (7) is usable to reduce friction and dampen shocks and vibration associated with rotating the staff (2) of, e.g., a boring string (9N).

Referring now to FIGS. 56 and 57, the Figures show a transverse axis cross and isometric cross section with a breakout, respectively, showing an impellor profile (3D) of a journal (69) hydrodynamic bearing (1) embodiment (1AJ), which also acts as a thrust bearing (70) due to the hydrodynamic profile (3) on arced wall (4C), wherein an impellor profile (3D) and stator wall (6D) pump (18J) fluid through high pressure discharge (34) ports between arced walls (4) and the bore wall (7), thus stabilizing rotation by centralizing the boring string (9) embodiment (90) and shaft (2) within the bore using a fluid cushion discharged (34) under the arched wall (4).

FIG. 58 shows a transverse axis cross section of a journal (69) hydrodynamic bearing (1) embodiment (1AK) with radial extendable and retractable arced wall (4) component parts (4D), which, for a substantially stationary housing (14), may be adjusted to push-the-bit cutting structure of the boring string (9). The boring embodiment (9P) housing can be configured to be substantially rotating, with fluid pump pressure from rotating the rotor profile (3E) within the stator profile (6E), to orient the pressure cushions (8) with, e.g., an oriented helical wrap (30), wherein rotating ports (34) expel pressurized fluid and radial arced walls (4D) as they pass the desired orientation to provide a cushion (8).

Referring now to FIG. 123, the Figure illustrates an axially transverse section across nine (9) different positions of an axial or radially extendable and retractable arced wall (4E) arrangement usable as a journal (69), thrust (70) and/or pivotal (71) bearing depending upon the configuration of the hydrodynamic fluid bearing (1) embodiment (1AL), whereby, in a manner similar to embodiment (1AK) of FIG. 58, a directable fluid bearing may be oriented in any axial direction depending on the effective radial extension of the arced wall (4) and/or its axial displacement of the arced wall (4) relative to a fulcrum point (15A of FIG. 124) and the directable pendulum boring string (9) embodiment (9Q or 9R of FIG. 124).

FIG. 124 depicts left, middle and right schematic views of radially or axially extendable and retractable arced (4) stabilizer walls (4F) usable to point-the-bit or push-the-bit within a directable pendulum string (9) embodiment (9R). The left schematic shows a pump (18) and 3-way valve (36) valve arrangement configured to move pistons (44) associated with upper and lower arced walls (4F) causing a change in effective diameter along the axis and an associated moment (157) or bending force along the axis, which is usable against a fulcrum point (15A), wherein a counter clockwise axial angular deflection (160) in the pendulum boring string (9) embodiment (9R) is enacted. Within the middle 3-way valve (36) configuration, equal pressure is placed on both side of the piston (44) by the pump (18) to place the arced walls (4F) in an offsetting or neutral moment (158) position and the string (9R) is urged to progress axially (162). With the right side schematic the 3-way valve (36) is set to provide an different moment (159) opposite to the left side moment (157) causing a clockwise axial angular deflection (161) of the boring string.

With four controllable arced walls (4F), the boring string (9R) may be directed as described in FIG. 123. If radial extendable and retractable arced stabilizer blade walls are used, instead of the shown axially displaceable walls (4F), the piston may comprise the arced walls themselves with the degree of pressure applied to the pistons radial extension and retraction controlled with, for example, relief or variable pressure valves, wherein the arrangement can be controllable as described in FIG. 123.

FIG. 59 shows an embodiment (1A0) of a bearing (1) having left (23A), middle (23B) and right (23C) hand effective rotating diameters (23) of, for example under gauged fluid bearing arced stabilizer blade walls (4) or a sleeve bearing (12) about a shaft profile (3), wherein the frequency of rotation increases from the left to the right to demonstrate that the crude hydrodynamic stabilizer bearing of conventional drill strings, as described in FIG. 32, does not prevent effective rotation as is evident on the right hand side, until adverse subterranean conditions are encountered or the drilling parameters are incorrect with stick slip, bit whirl and harmonic resonance causing averse rotation. However, it is also easy to see, from the effective rotating diameter shown on the right hand side, that the application of a pressurized fluid cushion could greatly increase the efficiency of rotation and dampen adverse shocks and vibrations through the immediate shearing of fluid followed by a quick re-establishment of the pressurized cushion (8) using a rotated hydrodynamic profile therein. It is also easy to see why the present invention is a significant improvement over prior art, because the pumping of fluid to supply a fluid pressure cushion (8), provided by the present invention, will always be more effective than the limited trapped volume or internal flex joint taught in US Patent Application US2011/0120772 A1 when the instant tool encounters the bore's wall. By providing a continuous pressurized fluid cushion (8) through rotation of a hydrodynamic profile, a stabilizer does not need to encounter the bore's wall, as is the case in the instant on tool of US2011/0120772 A1, hence the lack of physical contact between the stabilizer and the bore's wall will always result in more efficient rotation of the shaft, whereby the present invention represents a significant improvement over US Patent Application US2011/0120772 A1.

Referring now to FIGS. 60 and 61, the Figures illustrate a plan view with line J-J and a cross section along line J-J, of a hydrodynamic fluid bearing (1) embodiment (1AN), with associated profiled walls (3F, 6F) and curved outer walls (11B) allowing thrust bearing (70) fluid engagement between the outer wall (11) and a wall (13) containing the sleeve (12B) using, e.g., a hydrodynamic fluid pumping arrangement similar to FIG. 81.

FIGS. 107, 108 and 109 illustrate an axial transverse view with a quarter section of the sleeve embodiment (12C) removed, an associated isometric view with detail line K, and an associated magnified plan view within line K, respectively. The hydrodynamic bearing (1) embodiment (1AP) and profiles (3G, 6G) may be usable as a motor (17C) or bearing, similar to U.S. Pat. No. 3,367,201, which is included herein in its entirety by reference, which returns ball bearings (19F) displaced by fluid down a helical race to rotate a sleeve (12C) and substantially bearing flush outer wall (11C) within a recessed race so that the sleeve may be engaged with, for example an intermediate hole opener cutting structure like that shown in FIGS. 8 and 9, wherein the sleeve may rotate on the same axis as the shaft to produce an effective external rotating cutting structure, which could also be combined with, e.g., bearing (1BL) of FIG. 106, or the eccentric housing (14M) of FIG. 90. A ball bearing fluid pump or motor (17C) may be used in any way that a normal fluid pump or motor is used, wherein either the housing or shaft will rotate, depending on which is anchored, and wherein within certain tight tolerance rotary cable tool applications, such fluid pumps or motors would be advantageous over the conventional rotor stator pump/motor.

Referring now to FIG. 110, the Figure illustrates an axial transverse section of a embodiment (1AQ) of a bearing (1), with ball bearings extending from the outer wall (11C) of the sleeve (12D), which can be used to either engage an associated race profiles (3H, 6H, 6I) of races (22I, 22J, 22E (shown in FIG. 109), 22F (shown in FIG. 109), 22G (shown in FIG. 109)), which may be varied, for coincidental rotation of the wall of the race, or the ball may contact a flat or spherical wall to provide a hydrodynamic bearing that may be functional as a pump or motor. Additionally, if the sleeve's outer diameter bearing races (22H) and corresponding surfaces are spherical such that the ball bearing's (19G) is spherical, it may be used as a thrust bearing (70).

Referring now to FIGS. 62 to 76, the Figures illustrate various embodiments of sleeve (12), strands (20) and ball bearings (19) usable with, e.g., bicycle type chain links to form other sleeve embodiments and/or to reinforce, e.g., elastomeric sleeves with steel belting similar to automobile elastomeric tyres or tires.

Referring now to FIGS. 62, 63 and 64, the Figures show a plan view with cross section line L-L, an elevation cross section along line L-L, and an isometric exploded view of the assembly, respectively, of a hydrodynamic bearing (1) assembly embodiment (1AR), which comprises a journal (69) type bearing comprising a sleeve (12) embodiment (12G) between a shaft (2) and external bearing sleeve (12) embodiment (12H), with profile (3J) and associated inner (6N, 6O) and outer (13A profiled walls also usable with outer sleeve (11) embodiments (11G, 11H).

FIGS. 65, 66 and 67 illustrate a plan view, isometric view with detail line M, and a magnified detail view within line M, respectively, of multiple single diameter (20A) strands (20) spiral cage hydrodynamic bearing sleeve (12) embodiment (12E) or outer sleeve (11) embodiment (11E) with wall (6K).

Referring now to FIGS. 68, 69 and 70, the Figures depict a plan view, isometric view with detail line N, and a magnified detail view within line N, of a double diameter (20B, 20C) strand (20) spiral cage hydrodynamic sleeve bearing (12) embodiment (12F) or outer sleeve (11) embodiment (11F) with wall (6L).

FIGS. 71 and 72 show an isometric view with detail line O and a magnified detail view within line O, of a ball bearing (19) embodiment (19M) having bearings (19H) and strand (20) embodiment (20D), spiral cage hydrodynamic sleeve bearing (12) embodiment (12I), and/or outer sleeve (11) embodiment (11I) with wall (6M).

Referring now to FIGS. 73, 74 and 75, the Figures illustrate an isometric view of a ball bearing (19) embodiment (19J), an isometric view of a strand (20) embodiment (20E) with detail line P, and a magnified view within line P, respectively, showing component parts forming a ball bearing and strand component parts, usable with the strands of FIGS. 71-72 and FIG. 76.

Referring now to FIG. 76, the Figure shows a plan view of a hydrodynamic bearing (1) embodiment (1AV), having embodiments (12K, 12J) of inner and outer sleeves, respectively, using ball bearing strand (20) embodiments (20F) engaged with chain links and ball bearings (19K) and associated races (22N, 22M) further engagable with races in the shaft (2) to form rotor nodes (3K, 6P, 11J) within a stator cavity profile (13B) outer sleeve (11) embodiment (11K), wherein the discontinuity between strands ball bearings and bicycle type chain links, is usable for slurrifying boring debris passing through the bearing arrangement.

FIGS. 111, 112 and 113 illustrate a plan view with cross section line Q-Q, an elevation cross section view along line Q-Q and an isometric of the shaft (2) and ball bearings of FIGS. 111 and 112, respectively, and the Figures show a motor (17) embodiment (17D) of a hydrodynamic bearing (1) embodiment (1AW), wherein the sleeve (12) embodiment (12L) comprises a profile (3L) and wall (6Q) with helical channels, within their walls, for ball bearing (19) embodiments (19O that can be pumpable along the axis of the profile (3L) races (22K) and returnable axially external to the sleeve (11L) and internal race (22L), via associated races in a containing sleeve to, in use, drive the shaft (2).

Referring now to FIGS. 77 to 85, the Figures depict various embodiments of a hydrodynamic bearing (1) for using a hydrodynamic profile (3) to circulate a lubricating fluid within seals (47, 48), service covers (49) and for housing (4) around the bearings (1, 19), inner surfaces (6, 13) and races (22, 220), through intake (32), discharge (33) and high pressure (34) ports, to reduce friction, shocks and vibrations when rotating the shaft (2) within the bearing (1). Additionally, the arrangement of bearings and, e.g., spherical surfaces and high pressure lubricating ports are all variables depending on the proportions of the shaft bearing and its intended purpose, wherein the shaft may be solid or contain an inner passageway.

FIG. 77 shows a diagrammatic plan view with a section line above an elevation cross section view, along the section line in the plan view, depicting a journal (69), thrust (70) and pivotal (71) type hydrodynamic bearing (1) embodiment (1AX) with outer (11M) sleeve (12L, 12M) with wall (13C, 13D) profiled walls (3, 3M, 6R) engaged within an intermediate bearing (19L) within a housing (14G).

Referring now to FIG. 78, the Figure illustrates an exploded isometric view of a journal (69), thrust (70) and pivotal (71) type hydrodynamic bearing (1) embodiment (1AY), comparable to the bearing arrangement of FIG. 77, with outer (11P) sleeves (110, 120, 12N) including wall (13E) profiled walls (3, 3N, 6S) that can be engaged with intermediate bearings (19M) and races (22R).

FIG. 79 depicts a diagrammatic plan view with a section line above an elevation cross section view, along the section line in the plan view, showing a journal (69), thrust (70) and pivotal (71) type hydrodynamic bearing (1) embodiment (1AZ), with outer (11S, 12R) and inner (11T, 12S) sleeves, with profiled walls (30, 6U) and a ball bearing (19AA) wall (13G, 13H) that can be engaged with a race (22S) within a housing (14H), which can be usable as a pump (18K) with an external reservoir or control system (39).

Referring now to FIG. 80, the Figure shows an exploded isometric view of a journal (69), thrust (70) and pivotal (71) type hydrodynamic bearing (1) embodiment (1BA), comparable to the bearing arrangement of FIG. 79, with outer (11Q, 12P) and inner (11R, 12Q) sleeves, with profiled walls (3P, 6T) and a ball bearing (19Z) wall (13F) and race (22Q), with fluid ports (34).

FIG. 81 illustrates a diagrammatic plan view with a section line above an elevation cross section view, along the section line in the plan view, depicting a journal (69), thrust (70) and pivotal (71) type hydrodynamic bearing (1) embodiment (1BB), shown with shaft (2) inner passageway (31) fluid flow, with outer (11U, 12T) and inner (11V, 12U) sleeves including profiled walls (3Q, 6V) and a ball bearing (190) wall (13I) and race (22T), with ports (32, 33, 34) for fluid cushioning, to define a pump (18L).

Referring now to FIG. 82, the Figure depicts an exploded isometric view of a journal (69), thrust (70) and pivotal (71) type hydrodynamic bearing (1) embodiment (IBC), comparable to the bearing arrangement of FIG. 81, with outer (11W, 12V) and inner (11X, 12W) sleeves, with profiled walls (3R, 6W) and a ball bearing (19P) wall (13J) and race (22U) with seals (48).

FIGS. 83, 84 and 85 show a plan view with section line R-R, an elevation cross section view along line R-R, and an isometric projection view with the portion of line R-R removed, respectively, showing a hydrodynamic spherical bearing (1) embodiment (1BD), with a sleeve (11Y, 12X, 11Z) with profiled walls (3S, 6U) and a ball bearing (19N) wall (131) and race (22V).

Referring now to FIGS. 86 to 90, the Figures illustrate hydrodynamic bearings (1) usable with, e.g., coiled string slim hole rotary cable tool boring piston (73) operations. Any suitable downhole conventional bearings (19) and seals (47) may be used to supplement a hydrodynamic bearing (1) and hydrodynamic profiles may be arranged to allow rotation of sleeves (12) in an opposite direction to piston string (73) shaft rotation below the top most driving motor to provide additional anti-rotation forces to anti-rotation devices and reactive torque screw tractors of the present inventor. Additionally, bi-centre bit rotation within the tight tolerances of cable tool boring operations may be improved significantly with said anti-rotation and/or pressurized cushion dampening of the natural stick-slip and whirl tendencies when using bi-centre bit cutting structures (112). The ability to use bi-centre bits effectively may represent a significant improvement for rotary cable tool operations, because control of circulating and directional drilling tolerances about a rotating shaft (2) may be improved with the present. Additionally, the variation of intake and discharge ports for pumping may vary depending on the needs of boring.

FIG. 86 depicts a diagrammatic plan view with a section line above an elevation view through the plan view's section line, showing a journal (69), thrust (70) and pivotal (71) type hydrodynamic bearing (1) embodiment (1BE) with a flexible shaft, wherein a rigid shaft can be usable with a helical wrap bearing (30 of FIGS. 99 and 132) within the housing (14I) as a component part of a boring string (9) embodiment (9S) with a housing (4I) usable as a pump (18M), via profiles (3T, 6V) to discharge fluid through ports (34) against the bore (7).

Referring now to FIG. 87, the Figure shows a diagrammatic plan view with a section line above an elevation view through the plan view's section line, depicting a journal (69), thrust (70) and pivotal (71) type hydrodynamic bearing (1) embodiment (1BH) usable as boring string (9) embodiment (9U), wherein the flexible shaft and housing mating hydrodynamic profiles (3V, 6AB) are usable with bearings (19S, 19T) with races (22X) as a pump (18) embodiment (18P), from fluid intake (32) to fluid discharge (33), through ports (32, 33) in and between the arced wall (4L) engagement with the bore (7).

FIG. 88 illustrates an isometric exploded view of a hydrodynamic bearing (1) embodiment (1BG) of journal (69), thrust (70) and pivotal (71) bearing type, comparable with the bearing of FIG. 87, which can be usable as a boring string (9) component embodiment (9T), wherein a flexible helical nodal shaft (2) is used. Alternatively a rigid shaft is usable with a helical wrap bearing (30 of FIGS. 99 and 132). Similar to FIG. 87, intakes (32) within the arced wall (4K) are pumped (180), via profiled (3X, 6Z) walls, to discharges (33) in the housing (14J), wherein rotational (19Q) and thrust (19R) bearings are usable with races (22W).

Referring now to FIG. 89, the Figure depicts a diagrammatic plan view with a section line above an elevation cross section view through the plan view's section line, showing a journal (69), thrust (70) and pivotal (71) type hydrodynamic bearing (1) embodiment (1BH), also using as a boring string (9) component embodiment (9V) comprising a housing (14K) with a single arched wall (4J) cutting structure (112) that can be usable as an eccentric hole opener to provide bi-centre boring, with a hydrodynamic bearing (similar to 1BI of FIG. 90) usable as a pump (18N) with profiled (3U, 6AA) walls and within the pivot point (15A) formed by the housing (14K) and cutting structure (112)

pivot point (15B) that bear and pilot the eccentric arced wall (4J) eccentric opening of the wall of the subterranean bore, during the cutting structure (112) operation.

FIG. 90 shows an isometric exploded view of a journal (69), thrust (70) and pivotal (71) type hydrodynamic bearing (1) embodiment (1BI), which can be usable as a boring string (9) embodiment (9W), illustrating a bi-centre arrangement comparable to that of FIG. 89, wherein the eccentric cutting structure enlarges the hole and the housing (14M) arced wall (4M) profile (6AC), forming an anchor relative to the lower rotating eccentric mill to form a pivot point (15A) acting with the profile (3W), which can be rotated by the shaft (2) to form a pump (18Q) and stabilizing bearing.

Referring now to FIGS. 91 to 100, the Figures illustrate a hydrodynamic bearing (1) embodiment (1BJ) that can be usable as a fixed arced wall (4) or stabiliser for a boring string (9) embodiment (9X), with sleeves (12Z, 12AA) and profiles (3Y, 6AD) within a wall (13M) forming a pump (18R) and thrust bearings (19U, 19V).

FIGS. 91, 92 and 93 depict a plan view with section line T-T, an elevation cross section view along line T-T with detail line U, and a magnified view within line U, respectively, of a journal (69) and thrust (70) type hydrodynamic bearing (1BJ).

FIGS. 94 and 95 illustrate a plan view of FIG. 91 rotated 45 degrees with section line V-V above an elevation cross section view along line V-V, showing hydrodynamic bearing (1BJ) of FIG. 91.

Referring now to FIGS. 96, 97 and 98, the Figures depict an isometric view, an isometric exploded view with detail line W and a magnified detail view within line W of comprising one-way valve and fastening components of the hydrodynamic bearing, as shown in FIG. 91. Breakout component parts (49) and fasteners (46) can be usable to connect various components for maintenance purposes. With regard to fluidly bearing the apparatus within a bore's walls, pistons (44), with high pressure ports (34) through their axis, may be held outward by springs (45) to engage the wall of the subterranean bore so as to maintain a higher pressure by requiring the compression of the spring with pump-off pressure, thus forming a one-way valve (35). Additionally as the bearings rotation becomes eccentric springs cause pistons to extend in the larger tolerance separation and contract in the smaller tolerance separation, before the majority of the arced wall contacts the bore, to further increase pressure and attempt to correct the rotational eccentricity. Fluid slurry is also pumped between the intake (32) and discharge (33) ports via the shaft's (2) rotation of the hydrodynamic profiles (3Y and 6AD) to provide a pressurized fluid cushion within the housing (14N) when the arced wall (4N) is engaged and anchored to the subterranean bore relative to said shaft's rotation, while the helical wrap bearing (30) engagement to the outer sleeve (11AA, 11AB) is used to supply fluid to the one way valve (35) pistons (44).

Referring now to FIGS. 99 and 100, the Figures illustrate isometric views of the helical wrap bearing (30A) with wall (13L) and the bearing sleeve (12) and helical wrap bearing (30) embodiment (12Z, 30A) arrangements, respectively. Depending on the type of hydrodynamic fluid bearing, a helical wrap (30) may be used to directionally control pressure (8) orientation, wherein a control system, such as the electric line system of FIG. 46, may be used to continually orient a helical wrap sleeve relative to rotating arced stabilizer blade walls to actuate pistons similar to the shown one-way valves (35) by covering high pressure ports (34) in some non-rotating orientations while leaving other non-rotating orientations open to said high pressure ports (34). Additionally the profile between the shaft and sleeves may be arrange to cause rotation opposite to said staff's rotations, so as to reduce the need to continuously change the orientation of the helical wrap sleeve (30) when maintaining an orientation.

FIGS. 101, 102 and 103 illustrate a plan view with section line X-X, an elevation cross section view along line X-X with detail line Y, and a magnified detail view within line Y, respectively. The Figures show a journal (69) and thrust (70) hydrodynamic bearing (12) embodiment (1BK) that can be usable as a boring string (9) component embodiment (9Y) stabiliser. The bearing (1BK) with housing (140) is similar to bearing (1BJ) of FIG. 91, except for the pumping (18S) sleeve (11AC, 11AD, 12AB and 12AC) and profiled (3Z, 6AE, 13N, 11AC) and wall (11AD, 13O) arrangement, wherein the sleeve 12AC has tapered ends to provide for eccentric rotation about the axis of the bearing sleeve (12AB) with high pressure ports (34) that can be usable to interface with the one-way valve (35) pistons (44) in the arced walls (40). Preferable embodiments may have the ability to change between various types of sleeves, as demonstrated in FIGS. 91 to 100 and 101 to 105, to accommodate varying downhole conditions, fluid homogenization, and fluid bearing needs. For example the various sleeves of FIGS. 62 to 76 may be used with various comparable embodiments similar to those of FIGS. 91 and 101.

FIG. 103A shows and exploded view of bearing sleeves (12AB, 12AC) of the hydrodynamic bearing (1BK) of FIG. 101 with high pressure ports (34).

Referring now to FIGS. 104 and 105, the Figures illustrate a plan view rotated 45 degrees from FIG. 101 with section line Z-Z and an elevation view along line Z-Z of the hydrodynamic bearing (1BK) of FIG. 101.

Referring now to FIGS. 114 to 122, the Figures depict cable deployable drill string (9) embodiment (9AB) conduit (75) embodiments (75A-75F) component parts and a hydrodynamic bearing (1) embodiment (1BU) that can be usable with a coiled string engagable running tool. The system is usable with a conventional type running tool (76) deployed from a cable head (77) and can be engagable to the lower end of a rotary connectors receptacle (165), via engagement dogs (168) and lower dogs (170) supporting a profile (169) of a movable sleeve (165), for operating associated dogs (163) engagable with an associated receptacle (171) of the upper end of the rotary connection. The running tool is usable to deploy a conduit (75) joint through a lubricator and BOP to engage a previously placed conduit with an upward looking helical profile (167), wherein engaging the two profiles and jarring down on the running tool can rotate the connections until the keys (166) meet. Thereafter, the dogs (163) can be deployed into the receptacle (171) and locked in place by the locking sleeve (164), which moves down and only releases the running tool after shearing associated pins and guaranteeing the rotary connection has made up properly. The locking design may be similar to, e.g., a Baker Surlok system and running tool, described in U.S. Pat. No. 4,823,872, which is included herein in its entirety by reference.

FIGS. 114 and 115 show a plan view with section line AB-AB and an elevation cross section view through line AB-AB of a running tool (76) with a cable head (77) engagement similar to, e.g., conventional "GS" type running tools for various completion components such as plugs.

Referring now to FIGS. 116 and 117, the Figures illustrate elevation views with a quarter section removed of the lower end of a cable deployable drill string conduit (75) embodiment (75A), and an embodiment (75B) of the conduit of FIG. 116 with the running tool engaged, respectively.

Referring now to FIGS. 118, 119 and 120, the Figures show an elevation view with a quarter section removed of the upper end of a cable tool deployable conduit (75) embodiment (75C), an isometric view of only the conduit portion of the conduit in FIG. 118, and an isometric view of the profile housing (14) embodiment (14Q) of the conduit (75C) in FIG. 118, respectively. The rotating profile (3AC) within the associated profile (6AH), held relatively stationary by the arched walls, (4Q) is usable as a hydrodynamic bearing and pump (18U) to urge fluid within the housing (14Q).

FIGS. 121 and 122 illustrates upper and lower cable conveyable and engagable conduit (75) embodiments (75E) with a running tool (76) and the embodiment (75F) once the running tool is removed, respectively. The hydrodynamic bearing (1) embodiment (1BU) comprises a rotatable housing (14Q), which may remain substantially stationary when engaged to the bore's wall during conduit (75) rotation to provide a pressurised fluid cushion and to pump (18U) fluid past the tight tolerances of the conduits rotary connection.

Figures 125, 128:
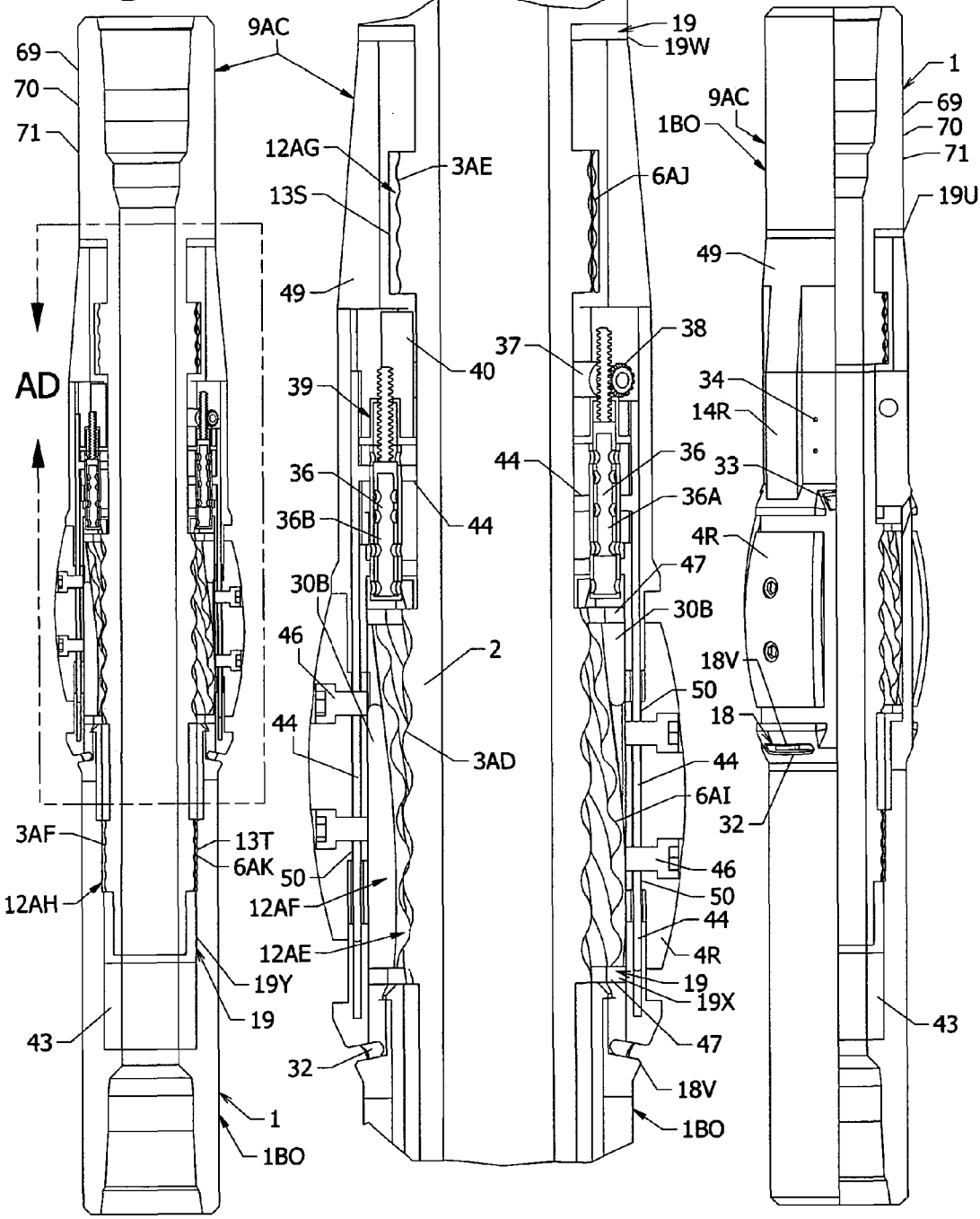

FIGS. 125 to 133 show a directable hydrodynamic bearing (1) embodiment (1BO) that can be usable as a rotary steerable or directable pendulum string (9) embodiment (9AC) and fluid pump (18V) operable with sleeves (12AE, 12AF, 30B), wherein the effective rotating diameter and arced walls (4R) are controllable with a mud pulse control system. Referring now to FIGS. 125, 126 and 127, the Figures illustrate a plan view with section line AC-AC, an elevation cross section view along line AC-AC with a detail line AD, and a magnified detail view within line AD, respectively, of a journal (69), thrust (70) and pivotal (71) hydrodynamic bearing (1) embodiment (1BO). The left side arced wall (4R) of FIG. 127 has been shifted upward by the control system (39) by using fluid pressure from the profiles (3AD) and (6AI), flowable through an embodiment (36A) of a valve (36) while the arced wall mechanisms may be cushioned and lubricated by the pumping action of the helical wraps (30B) rotation.

Referring now to FIGS. 128 and 129, the Figures show a plan view of FIG. 125 rotated 45 degrees with section line AE-AE and an elevation cross section view along line AE-AE, depicting the directable hydrodynamic bearing (1BO) of FIG. 125.

FIGS. 130, 131, 132 and 133 illustrate an isometric view, exploded isometric view with detail lines AI an AJ, a magnified view within detail line AI and a magnified detail view with line AJ, respectively, of the hydrodynamic bearing of FIG. 125. Arced walls (4) are engaged through the housing (14R) to the pistons (44) with fasteners (44). A mud pulse receiver (43) is usable to interface with surface through the fluid column within the subterranean bore. A thrust hydrodynamic bearing sleeve (12AH) is also present to provide better rotational stability.

The shaft (2) has profiles (3AE, 3AF) that can be operable with associated profiles (6AJ, 6AK, 13S, 13T) that can be usable for pressurizing fluid and operating an electrical generator assembly (41), usable to top up batteries (40). Various seals (47) and bearings (19X) comprise components of the assembly which may be repaired and/or replaced between uses. A flexible sleeve bearing (12AE) interfaces with a helical wrap bearing (30B), wherein the inner wall (13P) rotates about the flexible sleeve outer walls (11AF, 11AG) to displace fluid form a fluid cushion and lubricate the detachable arced wall (4R) stabiliser blades. The shaft profile (3AD) can be usable with the associated sleeve (12AE) profile (6AI) to pump fluid from the intake (32) the fluid discharge (33) for homogenization or slurrification of the fluids and operation of the pistons (44) engaged with the arced walls (4). Various hydrodynamic bearing sleeves may be used in place of (12AG) and (12AH, 11AI), for example the bearings of FIGS. 107 to 110 and FIGS. 77 to 85.

A control system (39) with pistons (44) can be operated by, e.g., worm gears (38), electric motors (37) and batteries (40) to move plurality-of-way valves, e.g., 3-way valves (36). The pistons move associated piston rods that can be engaged through (50) arced wall's (4R) inner wall (13R) with fasteners (46), using pressure generated by the hydrodynamic bearing. The frictional engagements between profiles (3AD, 6AI, 11AF, 13P, 3AF, 6AK, 3AE, 6AJ) and the rounded arced walls (4R) engagement with the fulcrum of point, at the bore's wall, are all shearable and immediately re-establishable frictional engagements that can be usable to lubricate and cushion shocks and vibrations associated with operating the bearing (1BO), by using similar logic to the schematics of FIGS. 123 and 124.

While various embodiments of the present invention have been described with emphasis, it should be understood that within the scope of the appended claims, the present invention might be practiced other than as specifically described herein.

Reference numerals have been incorporated in the claims purely to assist understanding during prosecution.

The embodiments of the invention in which an exclusive property or privilege is claimed are defined as follows:

1. An apparatus (1) for reducing rotational friction, shocks and vibrations associated with bearing a rotatable shaft (2) within a subterranean bore, comprising:
   a hydrodynamic bearing (1, 12) disposed about said rotatable shaft and within a wall (7) of said subterranean bore, wherein said hydrodynamic bearing comprises at least one periphery arced wall (4) radially extending from and arranged about a circumference of an outer wall (5) of a conduit shaft housing (14) which is disposed about at least one inner wall (6, 13) adjacent to at least one associated hydrodynamic profiled wall (3) that is rotatable by or about said rotatable shaft and within said conduit shaft housing to displace fluid axially along at least one other of said walls using rotation of said said at least one associated hydrodynamic profiled wall (3),
   wherein frictional engagements of said fluid, said at least one associated hydrodynamic profiled wall (3), said at least one inner wall (6, 13) and said at least one periphery arced wall (4), disposed between said rotatable shaft (2) and said wall (7) of said subterranean bore, are used to anchor at least one of said walls relative to said at least one associated hydrodynamic profiled wall (3), forming an anchored wall relative to said rotation of said at least one associated hydrodynamic profiled wall by said rotatable shaft, to force said fluid between said at least one associated hydrodynamic profiled wall and said anchored wall, to form a set of at least two of said walls with fluid flow between said at least two of said walls, to form a pressurized (8) cushion bearing fluidly communicated to and from said at least two of said walls to, in use, lubricate and dampen said rotational shocks and vibrations using said pressurized cushion bearing and a shearing of said frictional engagements that bear rotation of said rotatable shaft between said at least two of said walls within said subterranean bore.

2. The apparatus according to claim 1, wherein said at least one inner wall (6) comprises an inner component part of at least one bearing sleeve (12) having an outer sleeve wall (11) adjacent to at least one other of said inner walls (13) engaged with said conduit shaft housing (14) and rotatably disposed about said rotatable shaft (2).

3. The apparatus according to claim 2, wherein at least one of: said at least one inner wall (6, 13), said outer sleeve wall (11) or said at least one periphery arced wall (4), further comprises at least one associated hydrodynamic profile rotatable by engagement with at least one of: said rotatable shaft, said fluid flow, or said at least two of said walls, to further pressurize said cushion bearing or provide another shearable frictional engagement.

4. The apparatus according to claim 3, further comprising at least one of: impellors (24), rotor lobes (25), stator cavities (26), or bearing races (22), axially or helically oriented to an axis of said rotatable shaft.

5. The apparatus according to claim 4, further comprising a motor (17) or a pump (18) for rotating said at least one associated hydrodynamic profile to rotate at least one of said walls or displace said fluid, respectively.

6. The apparatus according to claim 2, wherein at least one of said bearing sleeve (12), or said conduit shaft housing (14), is in fluid communication with at least one reservoir for receiving fluid internally therefrom and returning fluid externally thereto, or with at least one passageway (31, 32, 33, 34) within or about said rotatable shaft (2) for receiving fluid externally therefrom and returning fluid internally thereto.

7. The apparatus according to claim 6, further comprising at least one of: a contained fluid volume reservoir within said conduit shaft housing (14), or a fluid flow stream reservoir about said at least one bearing sleeve (12).

8. The apparatus according to claim 6, further comprising a component part arrangement with at least one of: a one-way (35) valve or a plurality-of-way valve (36), to selectively control said fluid supply to and from said at least one reservoir.

9. The apparatus according to claim 8, further comprising at least one of: a piston (44) or a spring (45) usable to urge separation or coalescing of at least two of said walls, or a piston (44) or a spring (45) usable to operate said at least one of: a one-way (35) valve or a plurality-of-way valve (36).

10. The apparatus according to claim 2, wherein at least a portion of at least one of: said rotatable shaft (2), said at least one bearing sleeve (12), or said at least one inner wall (6, 13), comprises a flexible material.

11. The apparatus according to claim 10, further comprising at least one of: a race (22), a strand (20) or a chain link (21) for controlling an effective rotating diameter (23) of at least one of: said rotatable shaft, flexible material component parts, cylindrical component parts, or ball bearing component parts.

12. The apparatus according to claim 11, further comprising an eccentric helical wrapping sleeve bearing (30) component part usable to dynamically control fluid supplied through said hydrodynamic bearing, the effective rotating diameter (23), or said hydrodynamic bearing and said effective rotating diameter (23).

13. The apparatus according to claim 11, wherein said at least one periphery arced wall (4) comprises a fixed diameter or an axially or radially variable effective diameter bearing within said wall (7) of said subterranean bore to fix or affect the effective rotating diameter (23) of said rotatable shaft.

14. The apparatus according to claim 13, wherein said effective rotating diameter (23) between said rotatable shaft and said at least one periphery arced wall (4) is formed by radially extending a component part, axially moving a component part, or radially extending and axially moving a component part, of said at least one periphery arced wall relative to said rotatable shaft.

15. The apparatus according to claim 14, further comprising at least one of: a variable arced wall bearing or a fixed arced wall bearing, arranged for pendulum rotation of said rotatable shaft (2) about a fulcrum (15A) or a pivot (15B) in response to axial (16A) forces (16), lateral (16B) forces (16), or axial (16A) and lateral (16B) forces (16) applied to a component part of said hydrodynamic bearing about said rotatable shaft (2).

16. The apparatus according to claim 1, further comprising a component part surface interface actuatable electrical control system (39) usable to urge at least one of said walls or said hydrodynamic bearing (1), wherein said component part surface interface (42, 43) comprises at least one of: an electric cable (67R), or a pulse (68) through fluid within or about said hydrodynamic bearing.

17. The apparatus according to claim 1, further comprising at least one bearing component part comprising at least one of: a journal part (69), a thrust part (70), or a pivotal part (71), to reduce rotational friction, shocks and vibrations associated with bearing said rotatable shaft (2) within said subterranean bore.

18. The apparatus according to claim 1, further comprising cylindrical or ball bearing (19) component parts usable between at least one of: said walls or said rotatable shaft, to form a pump or a motor to reduce said rotational friction, shocks and vibrations, or said rotational friction and shocks and vibrations.

19. The apparatus according to claim 1, wherein said at least one periphery arced wall (4) extends axially from the outer wall (5) of an associated second or more shaft conduit housing proximally engaged with said conduit shaft housing (14), to provide said frictional engagements to said subterranean bore.

20. The apparatus according to claim 1, wherein the apparatus comprises an assembly of reusable and replaceable component parts assembled with fasteners (46) for maintenance and seals (47) for controlling exposure of fluid bearing component parts to fluid slurries between removal and reuse of said hydrodynamic bearing and said rotatable shaft within said subterranean bore.

21. The apparatus according to claim 1, further comprising a drilling or milling string (9) comprising a hydrodynamic fluid bearing subassembly usable with a drilling or milling fluid slurry to form or enlarge a bore through subterranean strata or casing by circulating and using debris laden fluid slurry to bear said rotatable shaft within said subterranean bore, wherein one or more motors within (17, 72) or at an upper end (73) of said drilling or milling string rotate said rotatable shaft and at least one associated hydrodynamic profile to, in use, lubricate, bear and dampen rotational shocks and vibrations associated with operational bearing of said rotatable shaft during rotation of one or more cutting structure component parts proximal to a lower end of said drilling or milling string to perform said drilling or milling and remove said debris.

22. The apparatus according to claim 21, wherein rotation of said at least one hydrodynamic profile homogenizes said debris within said slurry to form a more fluid slurry of reduced particle size milling or boring debris to, in use, bear rotation of said rotatable shaft within said subterranean bore and increase a frequency of breaking and slurrifying said debris to reduce a particle size of said debris and increase an associated propensity for removal of said debris from said subterranean bore or casing, or increase an associated propensity for said debris to inhibit or prevent propagation of strata fractures by packing said reduced particle size debris into a strata wall filter cake of said subterranean bore, said strata fractures, or said subterranean bore and said strata fractures.

23. The apparatus (1, 9, 12) according to claim 1, further comprising:
a boring (9) string (67) with at least one conduit joint having said outer wall (5) and housing said hydrodynamic bearing (1, 12), wherein said boring string comprises said at least one periphery arced wall (4) and at least one additional wall radially extending therefrom, and wherein said at least one periphery arced wall and said at least one additional wall are arranged about a circumference of the outer wall (5), and
wherein said at least one periphery arced wall and said at least one additional wall are axially arranged to form a directable pendulum boring string (9, 67) for operating one or more shaft engaged cutting structures proximal to a lower end of said boring string using one or more motors (17, 72) to rotate said rotatable shaft and said one or more cutting structures, wherein said hydrodynamic bearing lubricates and absorbs rotational shocks and vibration associated with boring by shearing said frictional engagements to, in use, improve rotating stabilization of said apparatus to selectively direct and apply force to said one or more cutting structures during said boring of said subterranean bore.

24. The apparatus according to claim 23, wherein said directable pendulum boring string (9, 67) is operable as a directable motorized conduit boring piston (73) that is placeable, retrievable and operable via a tensionable coiled string and pumps pressure through said subterranean bore with fluid pressure applied through and about said directable motorized conduit boring piston by one or more surface or boring piston conduit engageable fluid pumps or motors.

25. The apparatus according to claim 23, further comprising a reactive torque tractor (74) component helically engaged between a housing of said motor and said wall of said subterranean bore to frictionally and axially urge said pendulum boring string with reactive torque of said one or more motors.

26. The apparatus according to claim 23, further comprising a shaft rotatable cutting structure component adapted for forming a bore, a shaft rotatable cutting structure adapted to open a bore, or a shaft rotatable cutting structure component adapted for forming and opening a bore.

27. The apparatus according to claim 26, further comprising at least one of: a bore opening structure radially extendable as pendulum arms from said rotatable shaft, or a bi-centre cutting structure eccentrically placed and rotated on said rotatable shaft.

28. The apparatus according to claim 23, wherein said pendulum boring string is directable by varying an effective rotating diameter (23) of at least one component of said at least one periphery arced wall (4) and said at least one additional wall and a fulcrum point (15A), to vary a bit face at a pivot point (15B) thus rotatably bending said rotatable shaft at said hydrodynamic bearing and said fulcrum point to direct said pendulum boring string (9, 67).

29. The apparatus according to claim 28, wherein a control system is usable to selectively control said effective rotating diameter (23) by varying at least one component of said at least one periphery arced wall (4) using at least one of: radial extension, radial retraction, or axial movement, relative to said at least one additional wall to laterally push said one or more cutting structures and selectively direct said pendulum boring string.

30. The apparatus according to claim 28, wherein a control system is usable to selectively control said fulcrum (15A), said pivot (15B), or combinations thereof, using axial (16A) forces (16), lateral (16B) forces, or axial (16A) forces (16) and lateral (16B) forces (16), applied to a component of said rotatable shaft through said hydrodynamic bearing (1) anchorable to said subterranean bore (7) to, in use, selectively direct said pendulum boring string.

31. The apparatus according to claim 23, further comprising at least one jointed rotary conduit (75) joint deployable via a cable running tool (76) to form said at least one conduit joint of said pendulum boring string (9, 67).

32. The apparatus according to claim 31, wherein said jointed rotary conduit (75) and said hydrodynamic bearing (1) form said at least one conduit joint of said pendulum boring string (9, 67).

33. The apparatus according to claim 31, comprising at least two rotary conduit joints (75) with a securing rotary connection between said at least two rotary conduit joints, said securing rotary connection comprising a key of a first conduit inserted into an associated key receptacle of a second conduit and secured with engagement dogs locked within an associated receptacle via said cable running tool (76).

34. The apparatus according to claim 33, further comprising an associated wireline compatible axial helical orientation wrap or surfaces of the hydrodynamic bearing to mate said at least two rotary conduit joints (75).

35. The apparatus according to claim 33, wherein said cable running tool comprises a cable deployment device (76) for running at least one rotary conduit joint by engaging said at least one rotary conduit joint (75) during placement, orienting said key, engaging said locking dogs, locking said locking dogs and disengaging from said at least one rotary conduit joint.

36. The apparatus according to claim 23, wherein said boring string is adapted to side-track laterally from an existing well bore.

37. The apparatus of claim 23, wherein said boring string communicates with or through a plurality of annular passageways, wherein said fluid is circulated through an inner most passageway (31) of said boring string (9) and at least one of said plurality of annular passageways.

38. A method for reducing rotational friction, shocks and vibrations associated with bearing a rotatable shaft (2) within a subterranean bore, comprising the steps of:
providing a hydrodynamic bearing (1, 12) disposed about said rotatable shaft and within a wall (7) of said subterranean bore, wherein said hydrodynamic bearing comprises at least one periphery arced wall (4) radially extending from and arranged about a circumference of an outer wall (5) of a conduit shaft housing (14) which is disposed about at least one inner wall (6, 13) adjacent to at least one associated hydrodynamic profiled wall (3) rotatable by or about said rotatable shaft and within said conduit shaft housing to displace fluid axially along at least one other of said walls using rotation of said at least one associated hydrodynamic profiled wall (3),
wherein frictional engagements of said fluid, said at least one associated hydrodynamic profiled wall (3), said at least one inner wall (6, 13) or said at least one periphery arced wall (4), engaged with and disposed between said rotatable shaft (2) and said wall (7) of said subterranean bore, are used to anchor at least one of said walls relative to said at least one associated hydrodynamic profiled wall (3), forming an anchored wall, relative to said rotation of said at least one associated hydrodynamic profiled wall by said rotatable shaft, to force said fluid between said at least one associated hydrodynamic profiled wall and said anchored wall, to form a set of at least two of said walls with fluid flow between said at least two of said walls; and rotating said rotatable shaft to form a pressurized (8) cushion bearing fluidly communicated to and from said at least two of said walls to, in use, lubricate and dampen said rotational shocks and vibrations using said pressurized cushion bearing and a shearing of said frictional engagements between said at least two of said walls bearing said rotating shaft within said subterranean bore.

39. The method according to claim 38, wherein said at least one inner wall (6) comprises an inner component part of at least one bearing sleeve (12) having an outer sleeve wall (11) adjacent to at least one other of said inner walls (13) engaged with said conduit shaft housing (14) and rotatably disposed about said rotatable shaft (2).

40. The method according to claim 39, further comprising the step of providing said at least one inner wall (6, 13), said outer sleeve wall (11) or said at least one periphery arced wall (4) with at least one associated hydrodynamic profile rotatable by engagement with at least one of: said rotatable shaft, said fluid flow, or said at least two of said walls, to further pressurize said cushion bearing or provide a further shearable frictional engagement.

41. The method according to claim 39, further comprising the steps of providing fluid internally from at least one reservoir internally or externally to at least one passageway (31, 32, 33, 34) within or about at least one of: said rotatable shaft (2), said at least one bearing sleeve (12), or said conduit shaft housing (14), and returning said fluid externally to said at least one reservoir or internally to said at least one passageway, respectively.

42. The method according to claim 41, wherein the step of providing said fluid comprises providing a contained fluid volume reservoir within said conduit shaft housing.

43. The method according to claim 41, further comprising the step of providing at least one of: a one-way (35) valve or a plurality-of-way valve (36), to selectively control said fluid supply to and from said at least one reservoir.

44. The method according to claim 39, wherein at least one of a component portion of said rotatable shaft (2), a component portion of said at least one bearing sleeve (12), or a component portion of said at least one inner wall (6, 13), comprises a flexible material.

45. The method according to claim 44, further comprising the step of providing supporting cylindrical or ball bearing (19) component parts usable between said walls, said rotatable shaft, or said walls and said rotatable shaft, to form a pump or a motor to reduce said rotational friction, shocks and vibrations, or said rotational friction and shocks and vibrations.

46. The method according to claim 44, further comprising the step of providing at least one of: a race (22), a strand (20) or a chain link (21) to control an effective rotating diameter (23) of at least one of: said rotatable shaft, flexible material component parts, or cylindrical or ball bearing component parts.

47. The method according to claim 46, further comprising the step of providing an eccentric helical wrapping sleeve bearing (30) component part usable to dynamically control fluid supplied through said hydrodynamic bearing, through the effective rotating diameter (23), or through said hydrodynamic bearing and said effective rotating diameter (23).

48. The method according to claim 38, further comprising the step of providing at least one of: impellors (24), rotor lobes (25), stator cavities (26), or bearing races (22), axially or helically oriented to an axis of said rotatable shaft.

49. The method according to claim 48, further comprising the step of rotating said at least one associated hydrodynamic profile with a motor or pumped fluid to form a pump (18) or motor (17) to displace said fluid or rotate at least one of said walls, respectively.

50. The method according to claim 38, further comprising the step of providing at least one of: a piston (44) or a spring (45) usable to separate said at least two of said walls or a piston (44) or a spring (45) usable to operate said at least one of: a one-way (35) valve or a plurality-of-way valve (36).

51. The method according to claim 38, further comprising the step of operating said hydrodynamic bearing by urging at least one component part of said walls or said hydrodynamic bearing with another component part having a surface interface (42, 43) actuated electrical control system (39) comprising an electric cable (67R) interface, a pulse (68) through fluid within or about said surface interface, or an electric cable (67R) interface and a pulse (68) through fluid within or about said surface interface.

52. The method according to claim 38, further comprising the step of forming said hydrodynamic bearing with at least one of: a journal part (69), a thrust part (70), or a pivotal part (71), to further reduce said rotational friction, shocks and vibrations, or said rotational friction and shocks and vibrations associated with bearing said rotating shaft (2) within said subterranean bore.

53. The method according to claim 38, further comprising the step of providing said at least one periphery arced wall (4) axially extending from the outer wall (5) of an associated second or more shaft conduit housing proximally engaged with said conduit shaft housing (14), to provide said frictional engagements to said subterranean bore.

54. The method according to claim 38, further comprising the step of providing said at least one periphery arced wall (4) with fixed diameter or variable diameter component parts to fix or affect an effective rotating diameter (23) of said rotatable shaft.

55. The method according to claim 54, wherein the step of forming said variable effective rotating diameter (23) between said rotatable shaft and said at least one periphery arced wall bearing against said wall of said subterranean bore comprises radially extending a component part, axially moving a component part, or radially extending and axially moving a component part, of said at least one periphery arced wall relative to said rotatable shaft.

56. The method according to claim 55, further comprising the step of providing at least one of: a variable or fixed bearing arranged for pendulum rotation of said rotatable shaft (2) about a fulcrum (15A) or a pivot (15B) in response to axial (16A) forces (16), lateral (16B) forces (16), or axial (16A) and lateral (16B) forces (16) applied to a component part of said hydrodynamic bearing about said rotatable shaft (2).

57. The method according to claim 38, wherein the step of providing the hydrodynamic bearing comprises providing an apparatus assembly of reusable and replaceable component parts assembled with fasteners (46) for maintenance and seals (47) for controlling exposure of fluid bearing component parts to fluid slurries between removal and reuse of said hydrodynamic bearing and said rotatable shaft within said subterranean bore.

58. The method according to claim 38, further comprising the step of providing a drilling or milling string (9) hydrodynamic fluid bearing subassembly usable with a drilling or milling fluid slurry to form or enlarge a bore through subterranean strata or casing by circulating and using debris laden fluid slurry to bear said rotatable shaft within said subterranean bore, wherein one or more motors within or at an upper end of said drilling or milling string rotate said rotatable shaft and an associated hydrodynamic profile to, in use, lubricate, bear and dampen rotational shocks and vibrations associated with operational bearing of said rotatable shaft during rotation of one or more cutting structure component parts proximal to a lower end of said string to perform said drilling or milling and remove said debris.

59. The method according to claim 58, further comprising the step of using rotation of said associated hydrodynamic profile to homogenize said debris within said slurry to form a more fluid slurry of reduced particle size milling or boring debris to, in use, bear rotation of said rotatable shaft within said subterranean bore and increase a frequency of breaking and slurrifying said debris to reduce a particle size and increase an associated propensity for removal of debris from said subterranean bore or casing, or increase use of said debris and an associated propensity for inhibiting or preventing the propagation of strata fractures by packing said reduced particle size debris into a strata wall filter cake of said subterranean bore, said strata fractures, or said subterranean bore and said strata fractures.

60. The method according to claim 38, wherein the step of providing the hydrodynamic bearing comprises:
providing a boring (9) string (67) with at least one conduit that houses said hydrodynamic bearing (1, 12), wherein said housing comprises at least one conduit joint with said at least one periphery arced wall (4) and at least one additional wall radially extending from and arranged about the circumference of said outer wall (5); and
axially arranging said at least one periphery arced wall and said at least one additional wall along said at least one conduit to form a directable pendulum boring string (9, 67) for operating one or more shaft engaged cutting structures proximal to a lower end of said boring string using one or more motors (17, 72) to rotate said rotatable shaft and one or more cutting structures, wherein said hydrodynamic bearing lubricates and absorbs rotational shocks and vibration associated with said boring by shearing said frictional engagements to, in use, improve said rotating stabilization to selectively direct and apply force to said cutting structures during said boring.

61. The method according to claim 60, comprising operating said directable pendulum boring string (9, 67) as a directable motorized conduit boring piston (73), placeable, retrievable and operable via a tensionable coiled string and pump pressure through said subterranean bore with fluid pressure applied through and about said directable motorized conduit boring piston by one or more surface or boring piston conduit engageable fluid pumps or motors.

62. The method according to claim 60, further comprising using a reactive torque tractor (74) component helically engaged between a housing of said one or more motors and said wall of said subterranean bore to frictionally and axially urge said pendulum boring string with reactive torque of said one or more motors.

63. The method according to claim 60, further comprising forming or opening a bore using a shaft rotatable cutting structure.

64. The method according to claim 63, further comprising at least one of the following steps:
extending said shaft rotatable cutting structure radially as pendulum arms from said rotatable shaft; or
providing a bi-centre cutting structure eccentrically placed and rotated on said rotatable shaft.

65. The method according to claim 60, further comprising selectively applying axial force (16) to said pendulum boring string to vary an effective rotating diameter (23) of said at least one periphery arced walls (4) and a fulcrum point (15A) to vary a bit face at a pivot point (15B), thus rotatably bending said rotatable shaft at said hydrodynamic bearing and said fulcrum point to direct said pendulum boring string (9, 67).

66. The method according to claim 65, further comprising using a control system to selectively control said effective rotating diameter (23) by varying at least one component of said at least one periphery arced wall (4) by using at least one of: radial extension, radial retraction, or axial movement, relative to said at least one additional wall to laterally push said one or more cutting structures and selectively direct said pendulum boring string.

67. The method according to claim 65, further comprising using a control system to selectively control said fulcrum (15A), pivot (15B), or said fulcrum (15A) and pivot (15B) using axial (16A) forces (16), lateral (16B) forces, or axial (16A) forces (16) and lateral (16B) forces (16), applied to a component of said rotatable shaft through said hydrodynamic bearing (1) anchorable to said subterranean bore (7) to, in use, selectively direct said pendulum boring string.

68. The method according to claim 60, further comprising deploying at least one jointed rotary conduit (75) via a cable running tool (76) to form said at least one conduit joint of said pendulum boring string (9, 67).

69. The method according to claim 68, further comprising forming said at least one conduit joint by assembling said at least one jointed rotary conduit (75) and said hydrodynamic bearing (1).

70. The method according to claim 68, further comprising providing at least two rotary conduit joints (75) with a securing rotary connection between said at least two rotary conduit joints, said rotary connection comprising a key of a first conduit inserted into an associated key receptacle of a second conduit and secured with engagement dogs locked within an associated receptacle via said cable running tool (76).

71. The method according to claim 70, further comprising using an associated wireline compatible axial helical orientation wrap or a surface of the hydrodynamic bearing to mate said at least two rotary conduit joints (75).

72. The method according to claim 70, further comprising running at least one jointed rotary conduit using a cable deployment device (76) by engaging said at least one jointed rotary conduit (75) during placement, orienting said key, engaging said locking dogs, locking said locking dogs and disengaging from said at least one jointed rotary conduit.

73. The method according to claim 60, further comprising side-tracking laterally from an existing well bore.

74. The method according to claim 60, further comprising boring with or through a plurality of annular passageways, wherein said fluid is circulated through an inner most passageway (31) of said boring string (9, 67) and at least one of said plurality of annular passageways.

\* \* \* \* \*